(12) United States Patent
Shigeta

(10) Patent No.: US 7,079,129 B2
(45) Date of Patent: Jul. 18, 2006

(54) IMAGE PROCESSING DEVICE

(75) Inventor: Kazuyuki Shigeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/948,343

(22) Filed: Sep. 24, 2004

(65) Prior Publication Data

US 2005/0078101 A1    Apr. 14, 2005

Related U.S. Application Data

(62) Division of application No. 09/493,270, filed on Jan. 28, 2000, now Pat. No. 6,831,634.

(30) Foreign Application Priority Data

Jan. 29, 1999  (JP)  ................................ 11-022751
Nov. 1, 1999   (JP)  ................................ 11-310785

(51) Int. Cl.
*G09G 5/00* (2006.01)
(52) U.S. Cl. .................. 345/213; 345/98; 358/450
(58) Field of Classification Search ............... 345/204, 345/213, 211, 214, 98, 99, 9, 115, 100; 348/564, 348/563, 588; 358/448, 450
See application file for complete search history.

(56) References Cited

U.S. PATENT DOCUMENTS

| 5,260,905 A | 11/1993 | Mori | 365/230.05 |
|---|---|---|---|
| 5,298,905 A | 3/1994 | Dahl | 342/54 |
| 5,389,975 A | 2/1995 | Maeshima et al. | 348/556 |
| 5,398,078 A | 3/1995 | Masuda et al. | |
| 5,473,415 A | 12/1995 | Hayashi et al. | 355/208 |
| 5,576,769 A | 11/1996 | Lendaro | 348/511 |
| 5,731,799 A | 3/1998 | Kee et al. | 345/113 |
| 5,767,865 A | 6/1998 | Inoue et al. | 345/519 |
| 5,812,210 A | 9/1998 | Arai et al. | 348/555 |
| 5,828,402 A * | 10/1998 | Collings | 725/28 |

(Continued)

FOREIGN PATENT DOCUMENTS

EP    0 523 299 A1    1/1993

(Continued)

*Primary Examiner*—Richard Hjerpe
*Assistant Examiner*—Abbas Abdulselam
(74) *Attorney, Agent, or Firm*—Fitzpatrick, Cella, Harper & Scinto

(57) ABSTRACT

An inexpensive and simple circuit for improving the quality of a dynamic image, with appropriate, flexible dynamic image qualities processing, even with plural input signal sources. A memory unit has a region for storing images of at least one screen, and a memory control unit for writing image data to the memory unit on the basis of a first clock and a first image synchronizing signal and for outputting image data read out from the memory unit on the basis of a second clock and a second image synchronizing signal. A clock generating unit provides the second clock, and a synchronizing control unit inputs the second clock and outputs the second image synchronizing signal. The synchronizing control unit generates one signal asynchronous to the first image synchronizing signal, by dividing the second clock, and another that is and synchronized with the first synchronizing signal, by using the second clock, and selects one of the signals it has produced to be output as the second image synchronizing signal. In a case of multiple input signals, then such fourth image synchronizing signals equal in number to the input signals are produced.

4 Claims, 30 Drawing Sheets

U.S. PATENT DOCUMENTS

| | | | |
|---|---|---|---|
| 5,990,968 A | 11/1999 | Naka et al. | 348/537 |
| 6,049,360 A | 4/2000 | Yanai et al. | 348/584 |
| RE37,222 E * | 6/2001 | Yonemitsu et al. | 375/240.16 |
| 6,246,432 B1 * | 6/2001 | Takami et al. | 348/65 |
| 6,430,363 B1 | 8/2002 | Sasaki et al. | 386/112 |
| 6,483,249 B1 | 11/2002 | Ito et al. | 315/169.3 |
| 6,789,210 B1 | 9/2004 | Satoh et al. | 713/501 |

FOREIGN PATENT DOCUMENTS

| | | | |
|---|---|---|---|
| EP | 0 714 203 A2 | | 5/1996 |
| EP | 0 729 273 A2 | | 8/1996 |
| EP | 0 875 882 A2 | | 11/1998 |
| JP | 08-137427 | * | 5/1996 |
| JP | 09-182743 | * | 7/1997 |
| WO | WO 98/48571 | | 10/1998 |

* cited by examiner

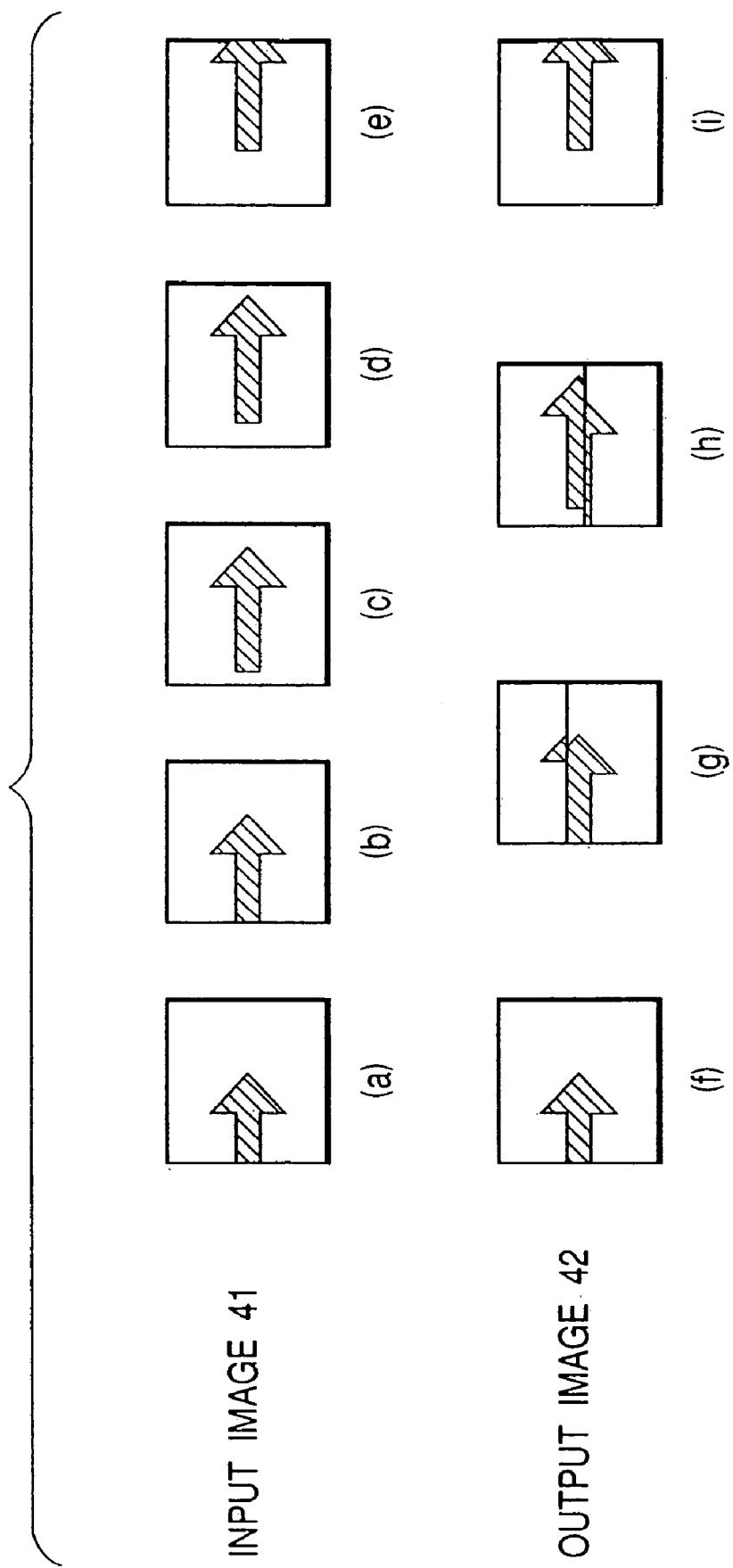

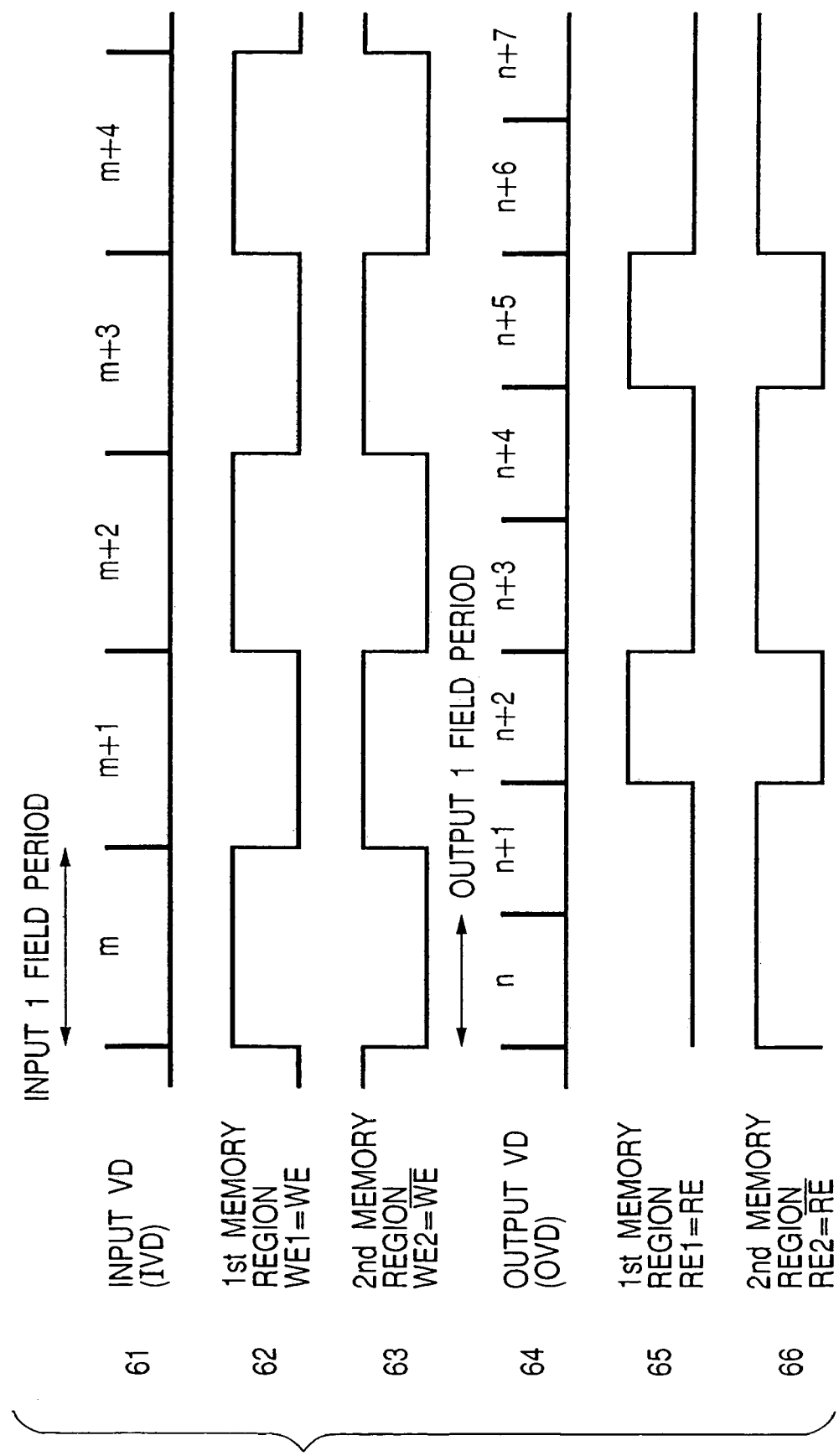

FIG. 14
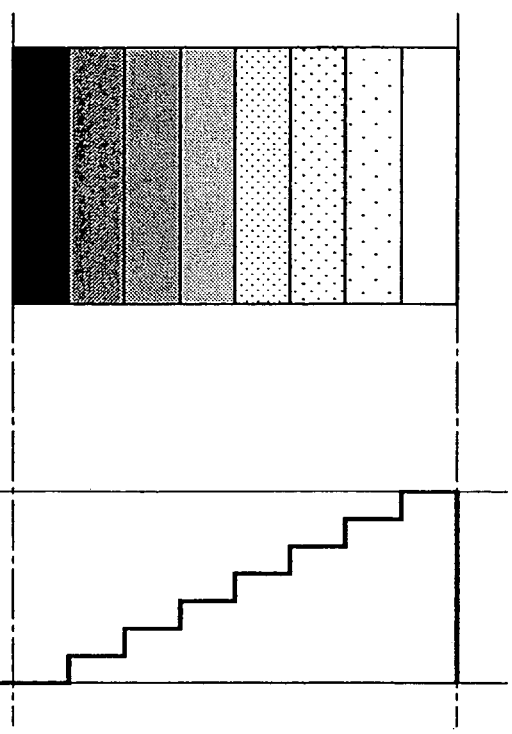
14-1 GRAY SCALE IMAGE
14-2 SIGNAL LEVEL
14-3 HORIZONTAL SYNCHRONIZING SIGNAL
FIG. 15
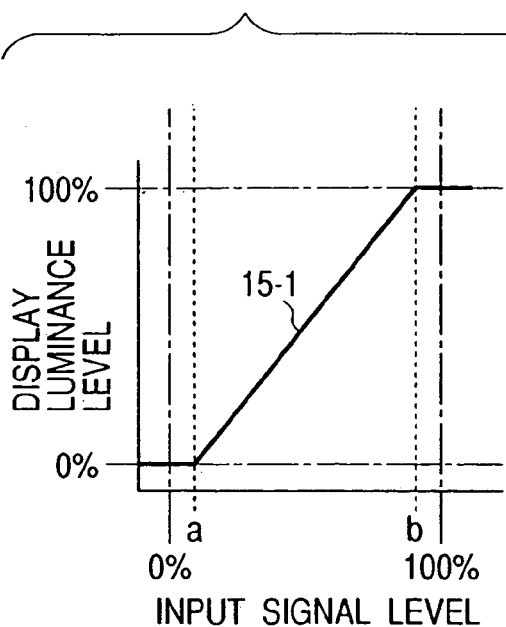
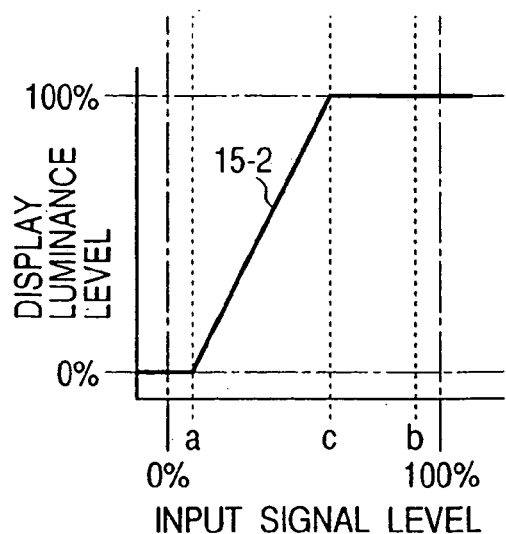

US 7,079,129 B2

IMAGE PROCESSING DEVICE

CROSS REFERENCE TO RELATED APPLICATION

This application is a division of application Ser. No. 09/493,270, filed Jan. 28, 2000 now U.S. Pat. No. 6,831,634, the entire contents of which are hereby incorporated herein by reference.

BACKGROUND OF THE INVENTION

1. Field of the Invention

The present invention relates to an image processing device for converting image signals having various formats to image signals in a desired format or for synthesizing the image signals.

2. Related Background Art

The development of multimedia in recent years provides occasions in which images in various image signal formats are displayed on a display screen. Particularly, while a display of a TV set had once been quite different from that of a personal computer (PC), a TV capable of displaying PC images and a PC display to which TV signals can be entered have appeared due to an advancement of their unification. In addition, due to an appearance of video sources in new digital formats such as a digital television or MPEG or due to an advancement of three-dimensional graphics, motion picture is more frequently displayed also on PC displays.

FIG. 6 shows a block diagram of the conventional display. In this drawing, there are shown an analog image signal input terminal 1-1, a horizontal synchronizing signal (IHD) input terminal for input signals 1-2, a vertical synchronizing signal (IVD) input terminal for input signals 1-3, an AD converter 2 for converting analog image signals inputted to the input terminal 1-1 to n-bit digital signals, an input system image processing unit 3, a memory control unit 4, a memory unit for storing image data 5, an output system image processing unit 6, an image display unit 7, data buses 20-1, 20-2, 20-3, and 20-4 for transmitting n-bit digital signals to respective units, a control bus 21 comprising memory control lines and address lines, and a memory data bus 22.

Reference numeral 8 designates a phase locked loop (PLL) circuit and reference character ICK designates an input system clock synchronized with an input IHD. Further, there are shown an oscillator circuit 12 which generates output system clocks OCK, an H-counter and V-counter circuit 11 which generates output system horizontal synchronizing signals OHD and vertical synchronizing signals OVD based on the output system clock OCK, a microcomputer (μCOM) unit 9, and m control buses for controlling respective units 19.

Digital image signals are subjected to image quality adjustment, image reducing conversion, or other processing in the input system image processing unit 3 before being stored in the memory unit 5 and then transferred to the memory control unit 4. The memory control unit 4 stores image data into the memory unit 5 at a timing corresponding to an input synchronizing signal (IHD, IVD) and an input system clock ICK and transfers the image data from the memory unit 5 to the readout output system image processing unit 6 at a timing corresponding to a horizontal synchronizing signal OHD and a vertical synchronizing signal OVD. The image processing unit 6 adjusts image qualities and converts images with enlargement. Accordingly, input images having various input system formats are converted to image signals having a format appropriate for the image display unit 7 via the memory.

Furthermore recently in a wide-screen display device such as a wide-screen television, a plasma display, a rear projection-type TV, or a front projection-type projector, there has been an increase of situations in which various video sources such as films, televisions, home videos, presentations, TV conferences, and displays of various materials are used in offices or houses. In addition among these types of displays, there is a display having a multi-screen display function of displaying a plurality of images from different input sources on a single screen with the screen divided.

FIG. 13 shows as an example of a display conventionally used in this situation a block diagram of an image processing unit of an image display device having one system for an input of digital computer image signals and the other system for two-system PC inputs which are analog computer image signal inputs, in which outputs of a frame memory are controlled for synchronization so as to perform a multi-screen display having two screens in a single-system image display unit.

In FIG. 13, there is shown an input terminal 1-1a for q-bit digital computer image signals (IDATA1) of a first system (PC1). While intrinsically a description should be made for three systems of red, blue, and green (RGB), only one system is used here for a simple description of a configuration (the same shall apply hereinafter). There are also shown an input horizontal synchronizing signal (IHD1) input terminal 1-1b, an input vertical synchronizing signal (IVD1) input terminal 1-1c, an image signal clock (ICK1) input terminal 1-1d, and a DDC (DDC1) input-output terminal 1-1e, data buses 20-1a-1 and 20-1a-2 for transmitting q-bit digital image signals to respective units. In addition, there are shown IHD1, IVD1, ICK1, and DDC1 signal lines 20-1b, 20-1c, 20-1d, and 20-1e, respectively.

DDC is a standard for communication means for computers to recognize or control displays recommended by a standardizing organization, a Video Electronic Standard Association (VESA).

There are also shown an input terminal 1-2a for analog computer image signals (IDATA2) of a second system (PC2), an input horizontal synchronizing signal (IHD2) input terminal 1-2b, an input vertical synchronizing signal (IVD2) input terminal 1-2c, and a DDC (DDC2) input-output terminal 1-2e.

An AD converter 2 converts an analog image signal (IDATA2) to an n-bit digital signal. A PLL circuit 8 generates input system clocks (ICK2) in a PC2 side synchronized with horizontal synchronizing signals (IHD2) inputted from the terminal 1-2b.

Reference numeral 20-2a-0 designates an analog signal line and reference numerals 20-2a-1 and 20-2a-2 designate n-bit digital signal lines. Reference numerals 20-2b, 20-2c, 20-2d, and 20-2e designate signal lines for IHD2, IVD2, ICK2, and DDC2, respectively.

There are also shown a PC1 input system image processing unit 3-1, a memory control unit 4 for a control of storing image signals inputted from the two-system input image processing units in a memory once and synthesizing images and outputting them to an output system image processing unit so as to output them on a multi-screen, frame memories (memory A, memory B) 5-1 and 5-2 corresponding to input systems PC1 and PC2, respectively, control buses 21-1 and 21-2 for the memory A and the memory B, respectively, and data buses 22-1 and 22-2 for the memory A and memory B, respectively.

A microcomputer unit 9 controls a system and microcomputer buses (MB) 19-1 and 19-2 comprise control lines from a microcomputer to respective units and data lines.

An oscillator circuit 12 generates output system clocks (OCK).

A H-counter and V-counter unit 11 counts output system clocks (OCK) and generates horizontal synchronizing signals (OHD) and vertical synchronizing signals (OVD) of the output system.

Additionally there are shown an output system image processing unit 6 and an image display unit 7 such as a plasma display and a CRT.

Reference characters 1-f, 1-g, 1-h, 1-i, and 1-j designate an input terminal of an image display unit for image display digital data (ODATA), an input terminal of an image display unit for output horizontal synchronizing signals (OHD), an input terminal of an image display unit for output vertical synchronizing signals (OVD), an input terminal of an image display unit for output image signal clock (OCK), and an input terminal of an image display unit for microcomputer buses (MB), respectively.

Furthermore, 20-f-1, 20-f-2, and 20-f3 are signal lines for k-bit ODATA and 20-g-1 and 20-g-2 are signal lines for OHD. 20-h-1 and 20-h-2 are signals lines of OVD and 20-i-1 and 20-i-2 are signal lines for OCK.

Digital image signals inputted from the image input terminal 1-1a are stored into the memory unit A designated by 5-1 after being subjected to an image quality adjustment, reducing conversion, and other processing in the input system image processing unit 1 designated by 3-1 and then transferred to the memory control unit 4.

Analog image signals inputted from the image input terminal 1-2a are synchronized to clocks generated by the PLL circuit 8 and then converted to digital data by the AD converter 2. Digital image signals obtained by this process are stored into the memory unit B designated by 5-2 after being subjected to an image quality adjustment, image reducing conversion, and other processing in the input system image processing unit 2 designated by 3-2 and then transferred to the memory control unit 4.

The memory control unit 4 stores image data into the memory unit A designated by 5-1 at a timing corresponding to the input synchronizing signals (IHD1, IVD1) and the input system clock ICK1 on the basis of the signals made of processed IDATA1 and stores signals converted from IDATA2 to digital signals as image data into the memory unit B designated by 5-2 at a timing corresponding to the input synchronizing signals (IHD2, IVD2) and the input system clock ICK2. Furthermore, it reads out the both image data from the memory units 5-1 and 5-2 at a timing matching a size of a predetermined image synchronized with the output system clock OCK, the horizontal synchronizing signal OHD, and the vertical synchronizing signal OVD and a relationship of a display position and then transfers the data to the output system image unit 6. The image processing unit 6 adjusts the image quality or converts images with enlargement or the like. Accordingly, input images in various input system formats are converted to image signals in a format suitable for the image display unit 7 via the memory and the image data inputted from two inputs is synchronized onto a single screen for a multi-screen display.

Referring to FIG. 7, there is shown an example of operation timings at which image signals are input with (1) VGA (horizontal 640 pixels×vertical 480 pixels) 100 Hz and (2) SVGA (horizontal 800 pixels×vertical 600 pixels) 60 Hz as input signals (input signals in FIG. 6 or PC1 input or PC2 input in FIG. 13) when a resolution of the image display unit 7 is XGA (horizontal 1024 pixels×vertical 768 pixels) and the display vertical frequency is 75 Hz on the displays shown in FIGS. 6 and 13. For a description of FIG. 7, the operation of the PC1 input system is the same as for the PC2 input system relating to the device in FIG. 13 and therefore they are considered to be identical in description.

In FIG. 7, reference numerals 30, 31, and 32 designate a vertical synchronizing signal IVD (IVD, IVD1 or IVD2), a horizontal synchronizing signal IHD (IHD, IHD1 or IHD2), and a clock ICK (ICK, ICK1 or ICK2) of an input system for an input of VGA 100 Hz, respectively. One period of IVD is 1/100 sec and is equivalent to a period of (480+α1) pieces of IHD including α1 for a blanking period. One period of IHD is equivalent to a period of (640+β1) CLKs of ICK including β1 for a blanking period.

Reference numerals 33, 34, and 35 designate IVD (IVD, IVD1 or IVD2), IHD (IHD, IHD1 or IHD2), and ICK (ICK, ICK1 or ICK2) for an input of SVGA 60 Hz, respectively. One period of IVD is 1/60 sec and is equivalent to a period of (600+α2) pieces of IHD including α2 for a blanking period. One period of IHD is equivalent to a period of (800+β2) CLKs of ICK including β2 for a blanking period.

Reference numerals 36, 37, and 38 designate a vertical synchronizing signal OVD, a horizontal synchronizing signal OHD, and a clock OCK of the output system for an output of XGA 75 Hz, respectively. One period of OVD is 1/75 sec and is equivalent to a period of (768+α3) pieces of OHD including α3 for a blanking period. One period of OHD is equivalent to a period of (1024+β3) CLKs of OCK including β3 for a blanking period.

In this manner, the horizontal synchronizing signals, the vertical synchronizing signals, and input clocks of the input system have different periods according to resolutions. In the device shown in FIG. 6, the microcomputer unit 9 discriminates resolutions and formats from each other on the basis of the IHD, IVD, or the like and sets a dividing frequency ratio of the PLL circuit 8 to generate ICKs corresponding to each format. On the other hand, the output system operates with OHD and OVD generated at a certain counter value in the counter circuit 11 from the output clock OCK asynchronously with input system signals. In this manner, input system and output system vertical frequencies, in other words, screen update frequencies (frame rates) are converted.

In the device shown in FIG. 13, for the input system 1 (PC1 input), the input signal processing system is operated synchronously with IHD1, IVD1, and ICK1 and image data is recorded into the memory A. For the input system 2 (PC1 input), the microcomputer unit 9 first judges resolutions and formats on the basis of information transmitted with the IHD2, IVD2, or DDC2 and then makes ICK2 corresponding to each format to be generated by means of the PLL circuit 8. Next, the input signal processing system is operated synchronously with IHD2, IVD2, and ICK2 to record images into the memory B.

On the other hand, the output system is asynchronous with signals of the input system; OHD and OVD are generated at a certain counter value in the counter circuit from the output clock OCK and images of two systems are read out at a timing 2 synchronous with OCK, OHD, and OVD from the memory A and the memory B and synthesized before being transmitted to the output system image processing unit and the image display unit. As described above, a resolution is converted in addition to a conversion of a vertical frequency, in other words, a screen update frequency (frame rate) for the input system and the output system.

In this frame rate conversion, however, there is a problem of an image quality deterioration of dynamic images as shown in a specific example in FIG. 8. Also in a description of FIG. 8, the same phenomenon occurs relating to FIG. 13 because of the same operation between the PC1 input system and the PC2 input system. A description will be made here giving an example with a ratio of 5 to 4 as an input vertical frequency to an output vertical frequency (for example, 100 Hz to 80 Hz). In FIG. 8, there are shown five (a to e) continuous frame images 41 to be input and four (f to 1) continuous frame images 42 to be outputted to the display for the same period. Arrows indicate dynamic images moving from left to right on the screen.

Since an image for a screen is written into and read out from the same memory region, there is no change on the screen when a screen rewriting timing is accidentally close to a readout timing like (a) and (f) or (e) and (i), while a previous image is switched to the next one in a middle of reading out the screen like (g) or (h) causing a deviated view of the moving image in the upper or lower part of the screen when the screen is rewritten during the image is read out. This is called "frame tear", which is a phenomenon of an image degradation in displaying a dynamic image. The same phenomenon occurs if the output vertical frequency is higher than the input vertical frequency to be contrary.

While this phenomenon is remarkable when a geometric object relatively large in comparison with the screen is translated horizontally, it is not so much conspicuous for a natural image and still images are frequently used in the conventional PCs with word processing, spread sheet processing, or plotting, and therefore the phenomenon has not been a serious problem. As described above, however, recently dynamic images are frequently displayed even on PCs and there has been an increase of screens on which geometrical graphics are moving, thereby causing higher requests for dynamic images.

As a countermeasure for the above problem, there is a double buffering method. In this method, not a memory region for a single image but memory regions for two images are prepared and these memory regions are alternately switched to each other for every screen in the write operation, and the memory region selecting operation is controlled so that scanning of the memory region under the readout operation is always ahead of scanning of the memory region for the write operation so as to avoid passing by an image in the readout operation.

For example, when data having the number of pixels of XGA (1024×768) is stored, input images of even-numbered fields such as fields m, m+2, m+4 and the like are stored into a first memory region at addresses 00000h to BFFFFh and input images of odd-numbered fields such as fields m+1, m+3, m+5 and the like are stored into a second memory region at addresses C0000h to 17FFFFh as shown in a memory map in FIG. 9. FIG. 10 shows a timing chart of the memory write and readout operations for the storage. Reference numerals 61 and 64 indicate an input vertical synchronizing signal (IVD) and an output vertical synchronizing signal (OVD), respectively. This description is also common to the PC1 input and the PC2 input relating to FIG. 13, and therefore it is assumed that IVD indicates IVD1 or IVD2 (or both) and that the first memory region and the second memory region are provided to the memory A or the memory B (or both), respectively.

Whenever the IVD 61 is entered, an input field is updated like m, m+1, m+2 and the like. Whenever the OVD 64 is entered, an output field is updated like n, n+1, n+2 and the like. Reference numerals 62, 63, 65, and 66 designate a signal indicating an execution of a write operation to the first memory region (WE1), a signal indicating an execution of a write operation to the second memory region (WE2), a signal indicating an execution of a readout operation from the first memory region (RE1), and a signal indicating an execution of a readout operation from the second memory region (RE2), respectively. They are shown here with active High.

In the write operation as described above, data is written into the first and second memory regions alternately between even-numbered input fields and odd-numbered input fields, but data is read out with selecting a field whose data is not displayed in the midst of the write operation. In this description, a vertical frequency of the output side is higher than that of the input side, and therefore the operation is controlled in such a way that data in the second memory region is read out if data of an input field is written into the first memory region when its output VD becomes High and that data in the first memory region is read out if data is written into the second memory region in order to prevent the passing by phenomenon. If the vertical frequency of the output side is relatively low, a control is required to prevent the passing-by phenomenon with considering a relationship between an input VD (IVD) and an output VD (OVD). In any case, as a timing for reading out data from the first memory and the second memory, memory regions are switched to each other in such a way that scanning of the memory region from which data is read out always precedes scanning for the write operation into the memory region according to input and output frequencies and a relationship between synchronizing signals.

In this double buffering method, however, the following problem on dynamic images as described below.

In the double buffering, the other memory region is selected so as not to display a memory region currently under the write operation. Therefore, for example, if there is a display showing continuous motions of a person who is rotating his arm as shown by input screens 71(*a*) to (*d*) in FIG. 11, it is possible to occur "frame duplication" in which the same image continues in two fields as shown in 72(*e*) and (*f*) among outputs whose frame rates have been converted like 72(*e*) to (*i*) or "frame omission" in which an equivalent field is missing like 82(*c*) among outputs whose frame rates have been converted like 82(*e*) to (*g*) if there is a display as shown by input screens 81(*a*) to (*d*) in FIG. 12.

As a method of improving a dynamic image quality different from the double buffering, there is a method of synchronizing the input vertical frequency to the output vertical frequency. For an XGA (1024×768 pixels) display unit, input signals of 50 Ha such as VGA (640×480) or SVGA (800×600) are converted to XGA of 50 Hz before displaying if the signals of 50 Hz are entered or input signals of 100 Hz are converted to XGA of 100 Hz before displaying if the signals of 100 Hz are entered in this method.

In these cases, a cycle time of the write operation and that of the readout operation to and from the memory matches each other, and therefore there is no problem on motions. If an input signal source has a low frequency such as 50 Hz, however, there is a problem on image qualities since the frequency is further reduced to a half in the same polarity for a device which displays a screen with an inverted polarity for each field like a liquid crystal display and therefore a screen rewrite cycle time is elongated, thereby causing a flickering phenomenon in which an entire view of the screen flickers. Furthermore, for a high frequency such as 100 Hz, a small number of pixels in VGA or the like, even if the speed is not so high in VGA, requires a speed of output approx. 2.6 times as high as a speed of an input when the number of the pixels in VGA is converted to one in XGA for the output, by which there is such a problem that an operation speed of the entire output system must be increased. For example, a clock rate of about 65 MHz for 60 Hz in XGA requires about 108 MHz for 100 Hz in XGA, thereby 100 MHz is exceeded. To solve this problem, a circuit configuration needs to be modified by adopting components having high operation speeds, developing new components, or dividing an operation system to reduce the speed, which leads to an increase of a cost or an expansion of a circuit scale.

In addition to the above problems, there are problems caused by two or more input systems. As shown by an example in FIG. 13, the input systems run synchronously with respective input signals, and therefore PC1 inputs are basically asynchronous with the PC2 inputs, while the output system outputs synthesized images from two systems at the same timing on a single screen, by which the input vertical frequency can be synchronized with the output vertical frequency for one system, but the synchronization cannot be applied to both systems simultaneously. This problem becomes serious for a use of multi-screen in which respective dynamic image qualities are important in further increased input systems.

Furthermore, for a plurality of image inputs, there occurs such a problem that a color, a brightness, a contrast or the like can be optimized so as to be suitable only for a single input system which is characteristic of a multi-screen in various image quality characteristics or that an optimization requires an increase of a circuit scale, in the same manner as for the image qualities of dynamic images.

Problems are described here relating to a gradation of an image quality such as a contrast, a brightness, or gamma characteristics of an image by giving an example of the circuit in FIG. 13.

Referring to FIG. 14, there is shown a gray scale signal for gradations horizontally changing in eight steps as one of video signals entered into the image processing device as shown in FIG. 13. There are shown a display screen in a gray scale in 14-1 and a signal for this display screen in 14-2. In 14-2, an abscissa axis corresponds to a time for a horizontal scanning period and an ordinate axis corresponds to a signal level. Reference numeral 14-3 indicates a horizontal synchronizing signal of an input signal for the display screen. In this example, the screen varies in eight gradations equally from 0% to 100% in a horizontal period.

In FIG. 15, there is shown a luminance characteristic of the display screen corresponding to the input signal in the image display unit 7 in FIG. 13. This characteristic is a transmission characteristic of light to an input voltage for a transmission LCD, for example, or a reflectance characteristic of light to an input voltage for a reflective device. Its appropriate characteristic depends upon the image display unit 7 in FIG. 13. It will be described here by giving two types of characteristics as in 15-1 and 15-2. In 15-1 and 15-2, the abscissa axis corresponds to an input signal level of the image display unit and the ordinate axis corresponds to a display luminance level with A, B, and C indicating input signal levels, respectively.

It is assumed here that input signals having different signal levels like 16-1A and 16-1B as shown in FIG. 16 have been inputted to the inputs IDATA1 and IDATA2 of the PC1 and PC2 systems in FIG. 13, respectively.

Furthermore, FIG. 16 shows display luminance levels 16-4 and 16-4B of signals in two systems for a use of an image display unit having the characteristic shown in 15-1 in FIG. 15. As shown by 16-4A and 16-4B, an input signal having the same number of gradations generates an image having a luminance level from 0% to 100% almost completely though there are collapsed parts of white 100% and black 0% in 16-4B of IDATA2 and on the other hand a whitish image due to a shift of black to a white side up to about 60% in 16-4A. Accordingly, when two images are displayed on an identical display simultaneously, there appears a mixed image made of two images having different black levels and different contrasts, by which the image display becomes very hard to see.

At this point, if each of the input system image processing unit 1(3-1) and the input system image processing unit 2(3-2) in FIG. 13 includes an auto-gain-control (AGC) circuit, a correction is made for signals having a DC level and an amplitude different from those of the input signals. If the image display unit is replaced with a display unit having the characteristic shown in 15-2 of FIG. 15, however, signals are not corrected for a change of the characteristic.

FIGS. 17 and 18 show input signals and luminance levels for characteristics of the display unit as shown by 15-1 and 15-2 in FIG. 15. In FIGS. 17 and 18, there are shown input signals 16-1A and 16-1B inputted to the inputs IDATA1 and IDATA2 of the two systems, signals levels 16-2A and 16-2B after passing the AGC circuit in the input system image processing unit 1(3-1) and the input system image processing unit 2(3-2), and luminance levels 16-4A and 16-4B of the display unit when these signals are entered. As shown by 16-4A and 16-4B in FIG. 17, the display has gradations from 0% to 100% due to a function of the AGC in the input-output characteristic of 15-1.

As shown by 16-4A and 16-4B in FIG. 18, however, the display has gradations only from 0% to 60% in the input-output characteristic of 15-2, thereby causing a whitish collapsed image in some gradations in the white side.

To cope with this replacement of the characteristics of the image display unit, the output system image processing unit 6 in FIG. 13 may have a correction characteristic for the characteristics of the image display unit. Referring to FIG. 19, there are shown input signals and luminance levels for the characteristic of the display unit of 15-2 in FIG. 15. There are shown input signals 16-1A and 16-1B inputted to the inputs IDATA1 and IDATA2 of the two systems, signals levels 16-2A and 16-2B after passing the AGC circuit in the input system image processing unit 1(3-1) and the input system image processing unit 2(3-2), signal levels 16-3A and 16-3B after passing the output system image processing unit, and luminance levels 16-4A and 16-4B of the display unit when these signals are entered.

By providing the correction characteristic for input signals to the in put system image processing unit for each signal and the correction characteristic for the display unit to the output system image processing unit in this manner, it becomes possible to obtain a multi-screen display which is not so much affected by a difference between input signal levels or by uneven characteristics of the display units. As correction characteristics, there are a brightness, a contrast, a gamma characteristic, and a white balance caused by a difference between color systems thereof.

Providing correction characteristics for image signals in both of the input system and the output system in this manner, however, leads to a need for preparing a plurality of similar circuits, thereby causing an enlargement of a circuit scale and an increase of the number of adjustment items which may cause an increase of a cost. It is a problem particularly in a configuration having a lot of inputs.

Furthermore, this configuration causes a degradation of an image since the image passes digital processing systems twice or more times for characteristics correction. FIG. 20 shows a conceptional diagram of assistance in explaining the degradation. In FIG. 20, the x axis indicates an input signal level and the y axis indicates an signal level of an output signal. This diagram shows an input-output characteristics of (4) $y=[x^2]*[x^{1/2}] \cong x$ in an 8-bit 256-phase digital processing system for (1) input-output characteristics of $y=x$ after passing (2) a table having characteristic 1 of $y=x^2$ and (3) a table having characteristic 2 of $y=x^{1/2}$. While (4) should match (1) intrinsically, an operation error occurs whenever an output is standardized to 8 bits in each phase of passing operations for the characteristic 1 in (2) and the characteristic 2 in (3) and a bit error becomes large for y to x in a range of 0 to 50 or so in (4) after the synchronization.

If the above is applied to a conventional example, it is equivalent to giving a characteristic conversion like (2) in the input system and giving a characteristic conversion like (3) in the output system. In this case, gray-scale level of the black level of an output image is deteriorated, thereby causing a degradation of an image quality such as a pseudo-outline in the image.

Although there is a method of increasing an operational bit count to prevent this phenomenon, it causes an increase of a cost or an enlargement of a processing system.

As described above, there has been conventionally a problem of an increase of a cost due to an enlargement of a scale in a configuration in which characteristics of different input images are converted to the same display characteristics for a change of characteristics of a display unit in a multi-screen display in which images from a plurality of input signal sources are displayed in the same display unit. In addition, a circuit has a serious bit error in the circuit configuration, which leads to a problem of a degradation of an image quality. Therefore, a brightness, a contrast, gray-scale level, colors or the like cannot be easily unified among respective input systems.

If an AGC circuit is included in the input image processing device, a dynamic range of signals can be assured, but signals are automatically corrected and therefore signal levels which should be displayed originally are also corrected, which causes a problem that an intention of a signal transmission side is ignored.

SUMMARY OF THE INVENTION

Therefore it is a first object of the present invention to provide an image processing device which has an inexpensive and simple circuit configuration with qualities of dynamic images improved, and additionally for a plurality of input signal sources, to provide a image processing device which can perform appropriate processing flexibly for dynamic image qualities.

It is a second object of the present invention to provide an image processing device for a multi-screen display for displaying input images from a plurality of input signal sources on an identical screen, wherein processing appropriate for dynamic image qualities is flexibly performed to cope with a difference between formats of input signals from respective input systems or to meet features of display contents and characteristics of an image display unit.

It is a third object of the present invention to provide an image processing device which can display a multi-screen on an identical screen with image quality characteristics such as a brightness, a contrast, gray-scale level, colors or the like of respective input systems easily unified and optimized to an entire system so as to cope with a change of characteristics of a display unit, a difference between characteristics of respective input signal sources, and features of display contents of input signals.

According to a first aspect of the present invention which achieves the first object, an image processing device comprises a memory unit having a memory region for storing images of at least one screens, a memory control unit for performing an input system operation to write image data to the memory unit on the basis of a first clock and a first image synchronizing signal and for performing an output system operation to output image data read out from the memory unit on the basis of a second clock and a second image synchronizing signal, a clock generating unit for generating the second clock, and a synchronizing control unit for inputting the second clock and for outputting the second image synchronizing signal, wherein the synchronizing control unit generates a third image synchronizing signal asynchronous to the first image synchronizing signal by dividing the second clock and a fourth image synchronizing signal with being synchronized to the first image synchronizing signal by using the second clock and selects one of the third image synchronizing signal and the fourth image synchronizing signal to output it as the second image synchronizing signal. The third image synchronizing signal or the fourth image synchronizing signal is selected according to a vertical frequency of the first image synchronizing signal or a purpose for a use of the output image, for example.

The present invention is also applicable to an image processing device further comprising a plurality of input system signal processing units, wherein image signals inputted thereto are synthesized appropriately for a display. In this case, as the fourth image synchronizing signal synchronous with the first image synchronizing signal, a plurality of fourth image synchronizing signals are generated synchronously with a plurality of first image synchronizing signals, respectively, and then one image synchronizing signal is selected out of the generated plurality of fourth image synchronizing signals and the third image synchronizing signal asynchronous with the first image synchronizing signals, so that the selected signal is output as the second image synchronizing signal. In this selection, the image synchronizing signal to be the second image synchronizing signal may be selected by one out of the third image synchronizing signal and the fourth image synchronizing signals according to an appropriate vertical frequency among those of the plurality of first image synchronizing signals, a purpose for a use of the output image, presence or absence of a dynamic image or proportion thereof in signals inputted to the plurality of input system signal processing units. Furthermore, it is preferable that the device has a configuration in which means for outputting a request for setting or re-setting an input image signal to signal sources for inputting signals to the plurality of input system signal processing units so as to output a request for a synchronization with the second image synchronizing signal to an arbitrary input signal source asynchronous with the second image synchronizing signal output after being selected out of the third image synchronizing signal and the fourth image synchronizing signals.

The first aspect of the present invention is applicable to all types of the image processing devices performing a digital image processing including image displays such as CRT or other transmission or reflective displays, liquid crystal displays (LCD), plasma displays (PDP), and electric-charge emission type displays, CCD or CMOS two-dimensional phototaking elements, and capture boards of video signals.

According to a second aspect of the present invention which achieves the second object, an image processing device comprises at least one signal input units to which video signals of a plurality of systems are inputted, a memory unit having a memory region for storing images of at least one screens, at least one image display signal output units, image processing means for synthesizing the video signals of the plurality of systems on the memory unit to output the synthesized signal to the signal output units, and control means for controlling the image processing means, wherein the control means select a preferential video signal on the basis of image characteristic information of the video signals of the plurality of systems and at least one arrangement conditions on the screen in the image display unit of the images based on the video signals of the plurality of systems and change the operation of the image processing means to an operation appropriate for the preferential system video signal. In this aspect of the invention, it is also possible to add characteristic information of the image display unit connected to the signal output unit to the selecting conditions for the preferential video signal so as to change the operation of the image processing means to an operation appropriate for the preferential system video signal and the image display unit. In addition, the control means may have communication means for outputting a request of changing image characteristics to at least one video signals of the plurality of systems to be inputted so as to make a request of changing the operation of the image processing means to an operation appropriate for the preferential system video signal and of changing the image characteristics to those appropriate for the operation of the image processing means for at least one system video signals other than the preferential system video signal.

The optimized operation of the image processing means is, for example, for an update cycle time of the display screen of the display unit. The image characteristic information referred to for selecting the preferential input video signal with the control means is, for example, an update cycle time of an input image, information used for judging a dynamic image or a still image, and use or type information. In addition, it is also possible to optimize a resolution, a gamma correction, a color correction, and brightness and contrast corrections for a display unit by referring to a resolution of an input image, gamma characteristic information, color information, and brightness and contrast information.

According to a third aspect of the present invention which achieves the third object, an image processing device comprises an input system image processing unit for adjusting image qualities of a plurality of input systems, a memory unit having a memory region for storing images of at least one screens, a memory control unit for performing a write or readout operation of image data to or from the memory unit and for outputting a synthesized signal on a single screen from images of the plurality of input systems, an output system image processing unit for adjusting an image quality of the synthesized signal and for outputting it as an image display output, and an image quality control unit for controlling the input system image processing unit and the output system image processing unit and for outputting an image display signal, wherein the image quality control unit, having correction characteristics for the images of the plurality of input systems and a correction characteristic for a display characteristic of the image display unit connected to the image quality control unit, selects one of the correction characteristics for the images of the plurality of input system and converts it to a correction characteristic synthesized with a correction characteristic for the display characteristic of the image display unit for batch-processing in the output system image processing unit.

In the second and third aspects, the present invention is applicable to all types of image processing devices performing processing for displaying a plurality of input images including image display devices which can display a plurality of input images such as CRT or other transmission or reflection type displays, liquid crystal displays (LCD), plasma displays (PDP), and electric-charge emission type displays and their image signal processing circuits, computer graphic processing circuits, and set-top boxes which receive signals distributed from digital TV systems or the IEEE 1394.

BRIEF DESCRIPTION OF THE DRAWINGS

FIG. 8 is an explanatory diagram of a problem in a dynamic image in the conventional example shown in FIG. 6;

FIG. 10 is a timing chart illustrating an operation of the image processing device in double buffering;

FIG. 14 is a diagram of assistance in explaining a problem related to gray-scale level of an image quality in the second conventional example;

FIG. 15 is a diagram of assistance in explaining a problem related to gray-scale level of an image quality in the second conventional example;

DETAILED DESCRIPTION OF THE PREFERRED EMBODIMENTS

Embodiments of the present invention will be described below by using the accompanying drawings.

FIRST EMBODIMENT

Figure 1:
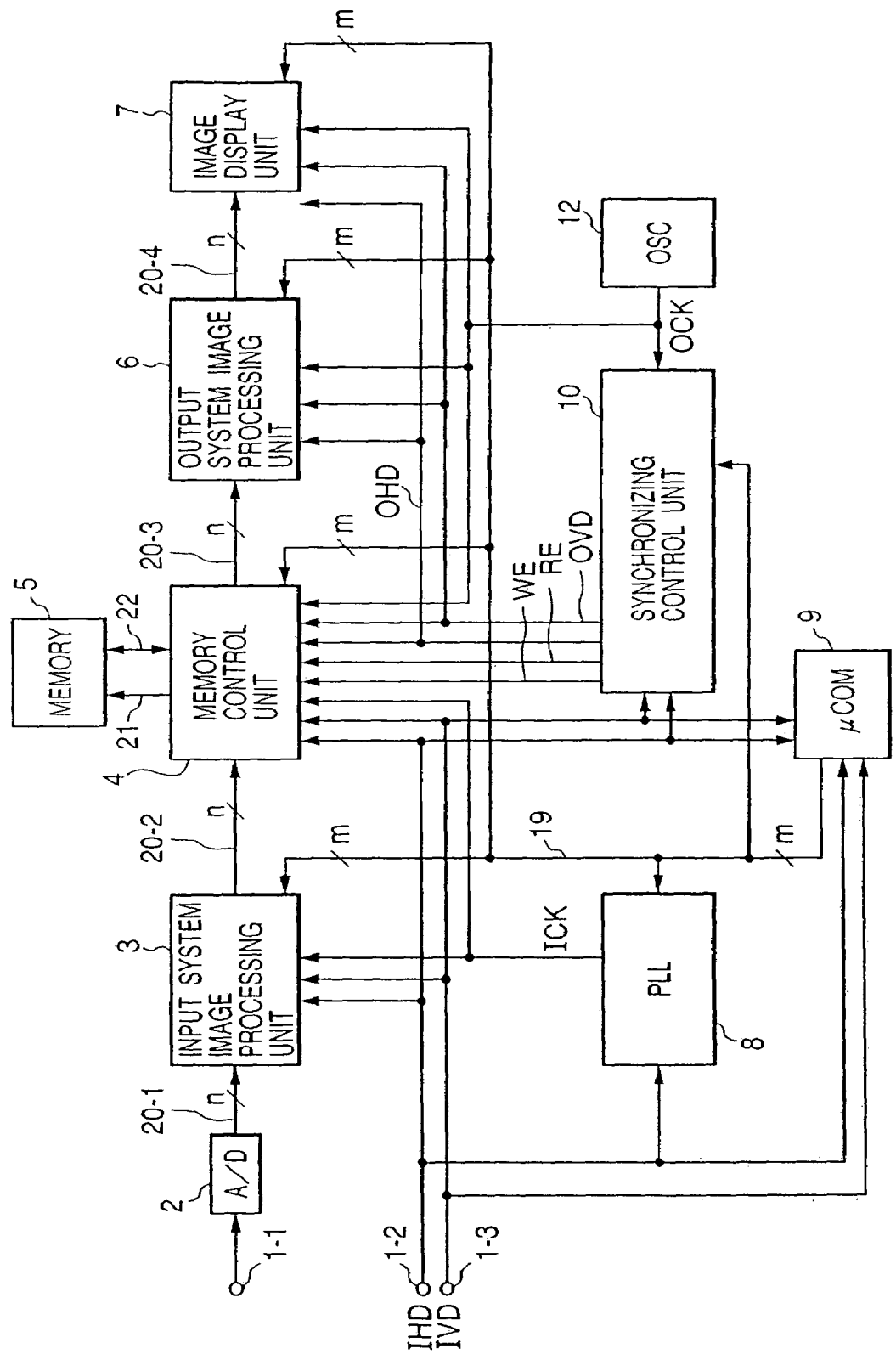
FIG. 1 is a block diagram of an image processing device according to a first embodiment of the present invention.

Referring to FIG. 1, there is shown a block diagram of assistance in explaining a first embodiment of the present invention. In FIG. 1, reference numerals 1-1, 1-2, and 1-3 designate an input terminal for analog image signals, an input horizontal synchronizing signal (IHD) input terminal, and an input vertical synchronizing signal (IVD) input terminal, respectively. An AD converter 2 converts an entered analog image signal to an n-bit digital signal. There are also shown an input system image processing unit 3, a memory control unit 4, a memory unit 5 for storing image data, an output system image processing unit 6, and an image display unit 7. Reference numerals 20-1, 20-2, 20-3, and 20-4 designate data buses for transmitting n-bit digital signals to respective units. Reference numerals 21 and 22 designate a control bus made of a memory control lines and address lines and memory data bus, respectively.

There are also shown a PLL circuit 8, a clock ICK synchronized with the input horizontal synchronizing signal IHD, an oscillator circuit 12 for generating output system clocks OCK, a microcomputer (µCOM) unit 9, and m control buses 19 for controlling respective units.

Figure 6:
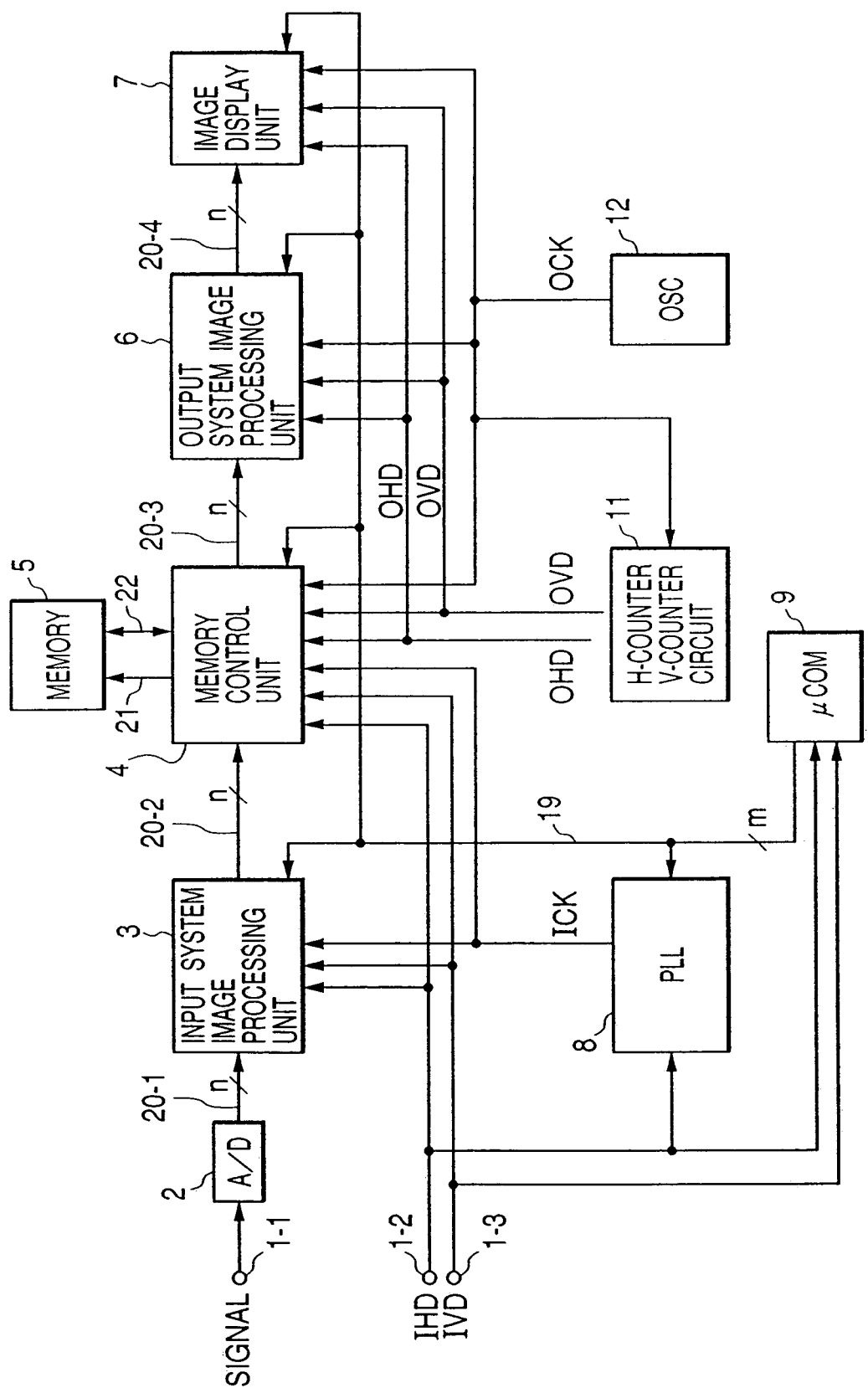
FIG. 6 is a block diagram of an image processing device of assistance in explaining a conventional example.
Figure 7:
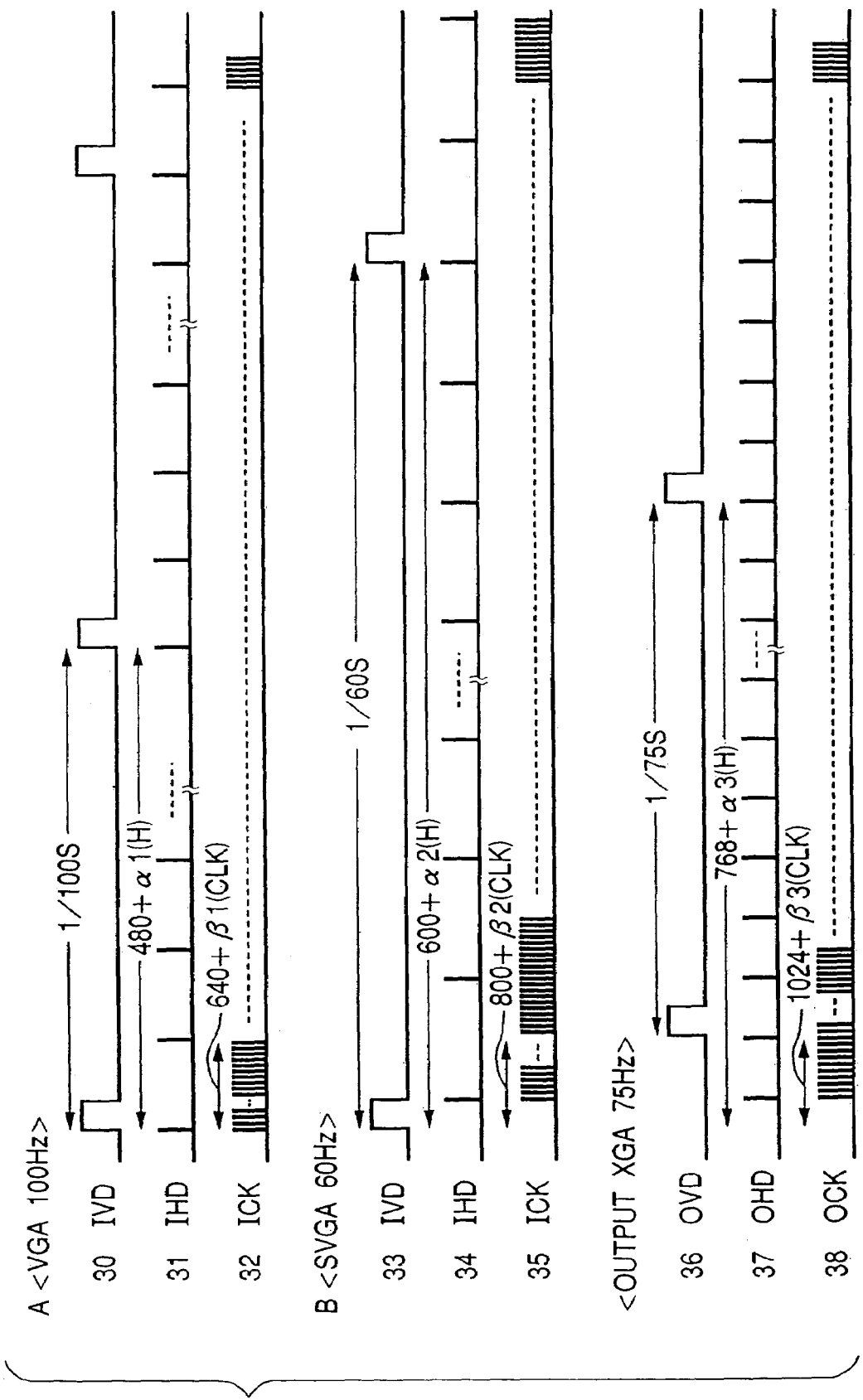
FIG. 7 is a timing chart illustrating an operation of the image processing device in the conventional example shown in FIG. 6.
Figure 11:
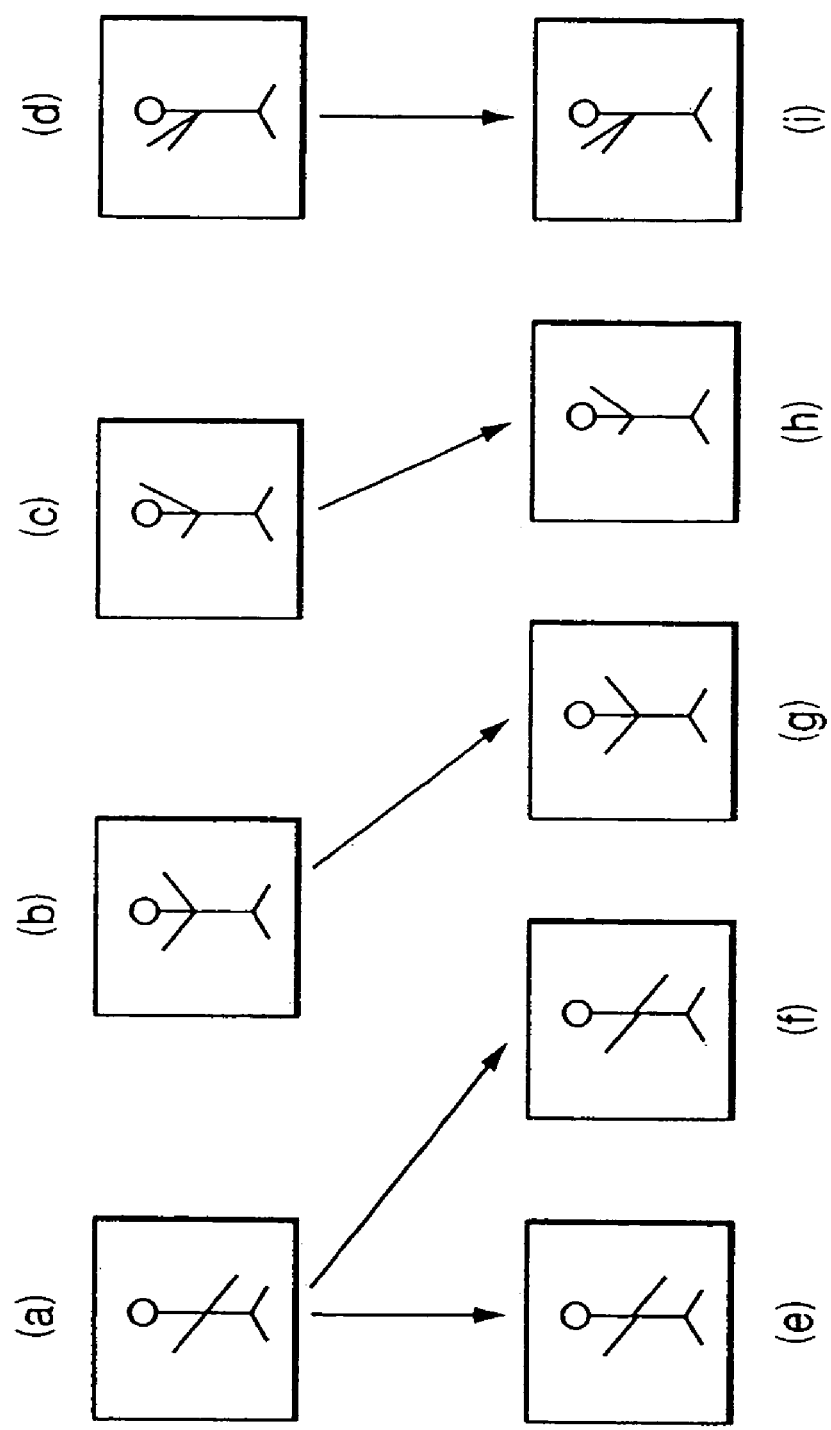
FIG. 11 is an explanatory diagram of a problem in a dynamic image in double buffering.
Figure 12:
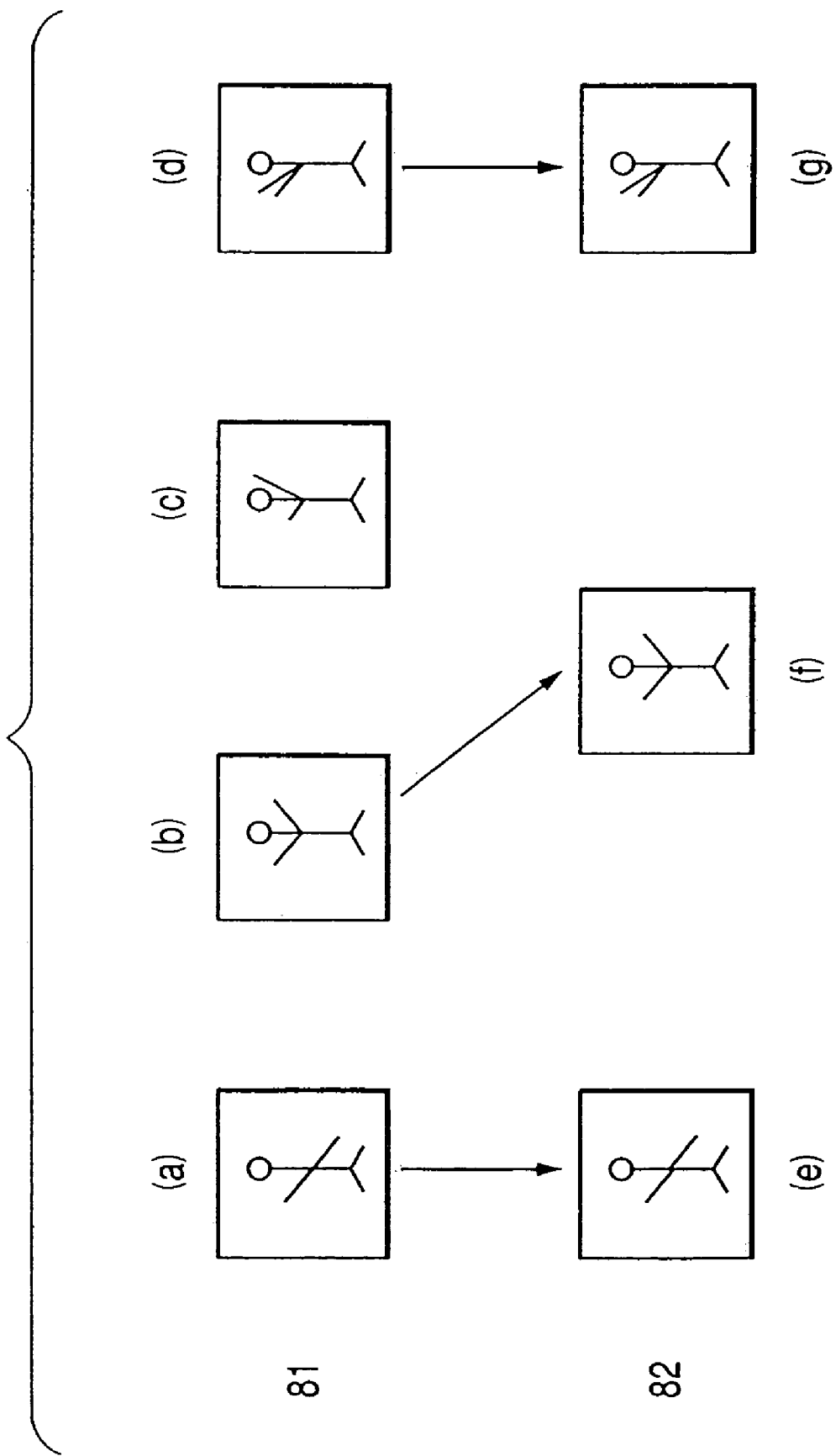
FIG. 12 is an explanatory diagram of a problem in a dynamic image in double buffering.
Figure 13:
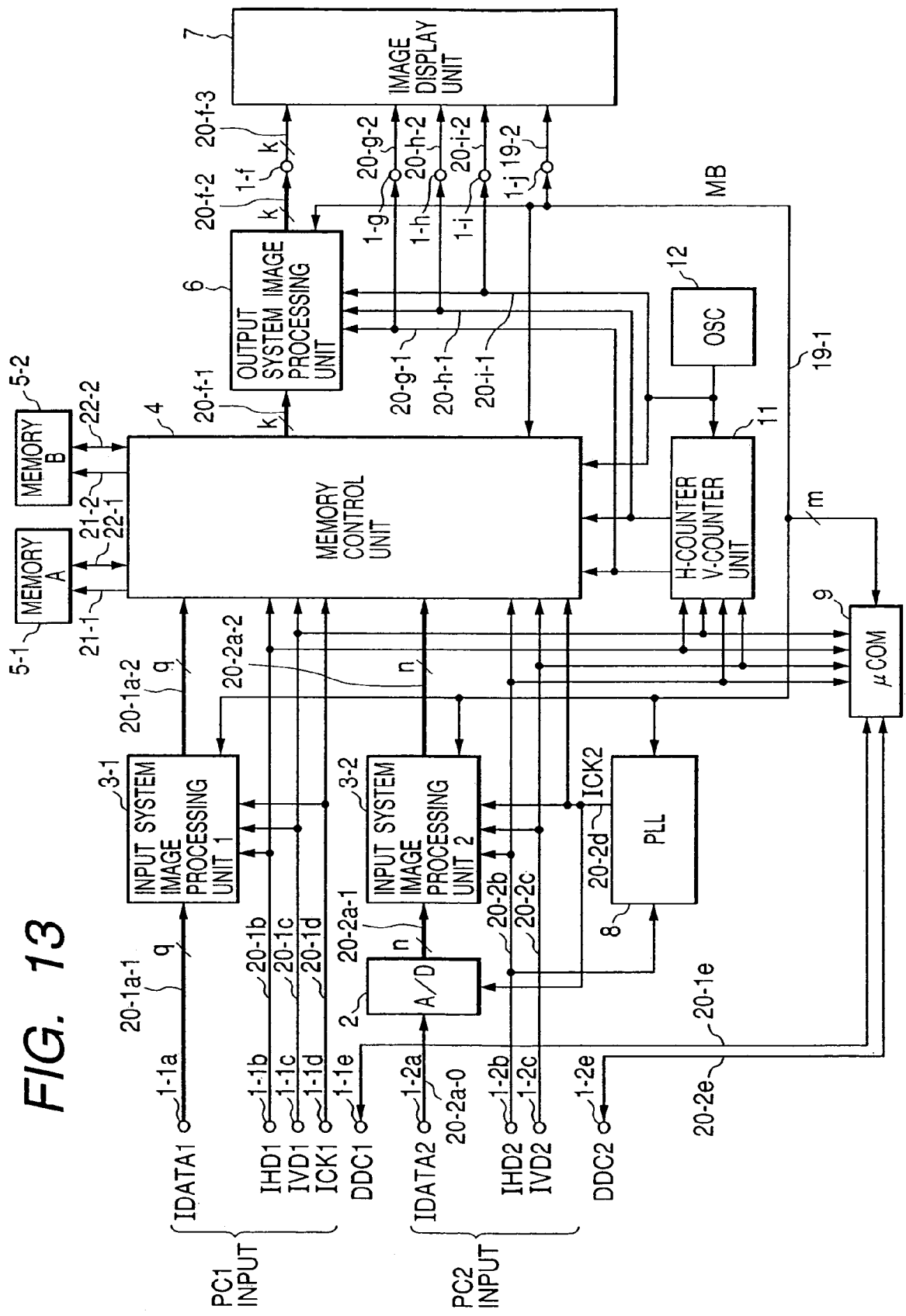
FIG. 13 is a block diagram of an image processing device of assistance in explaining a second conventional example.

Digital image signals are subjected to image quality adjustment or image reduction or other conversion in the input system image processing unit 3 before being stored in the memory unit 5 and then transferred to the memory control unit 4. In the memory control unit 4, image data is stored into the memory unit 5 at a timing corresponding to an input synchronizing signal (IHD, IVD) and an input system clock ICK, image data is read out from the memory unit 5 at a timing corresponding to an output system clock OCK, a horizontal synchronizing signal OHD, and a vertical synchronizing signal OVD, and the data is transferred to the output system image processing unit 6. In the image processing unit 6, an image quality is adjusted and image is converted with enlargement or other processing in the same manner as for a conventional example shown in FIG. 6.

In FIG. 1, there is shown a synchronizing control unit 10, which is a block for determining an output frame rate. Input synchronizing signals IHD, IVD, and output system clocks OCK are entered into this unit and it outputs output system horizontal synchronizing signals OHD, vertical synchronizing signals OVD, write field control signals WE, and readout field control signals RE. These controls are controlled by the microcomputer bus 19.

Figure 2:
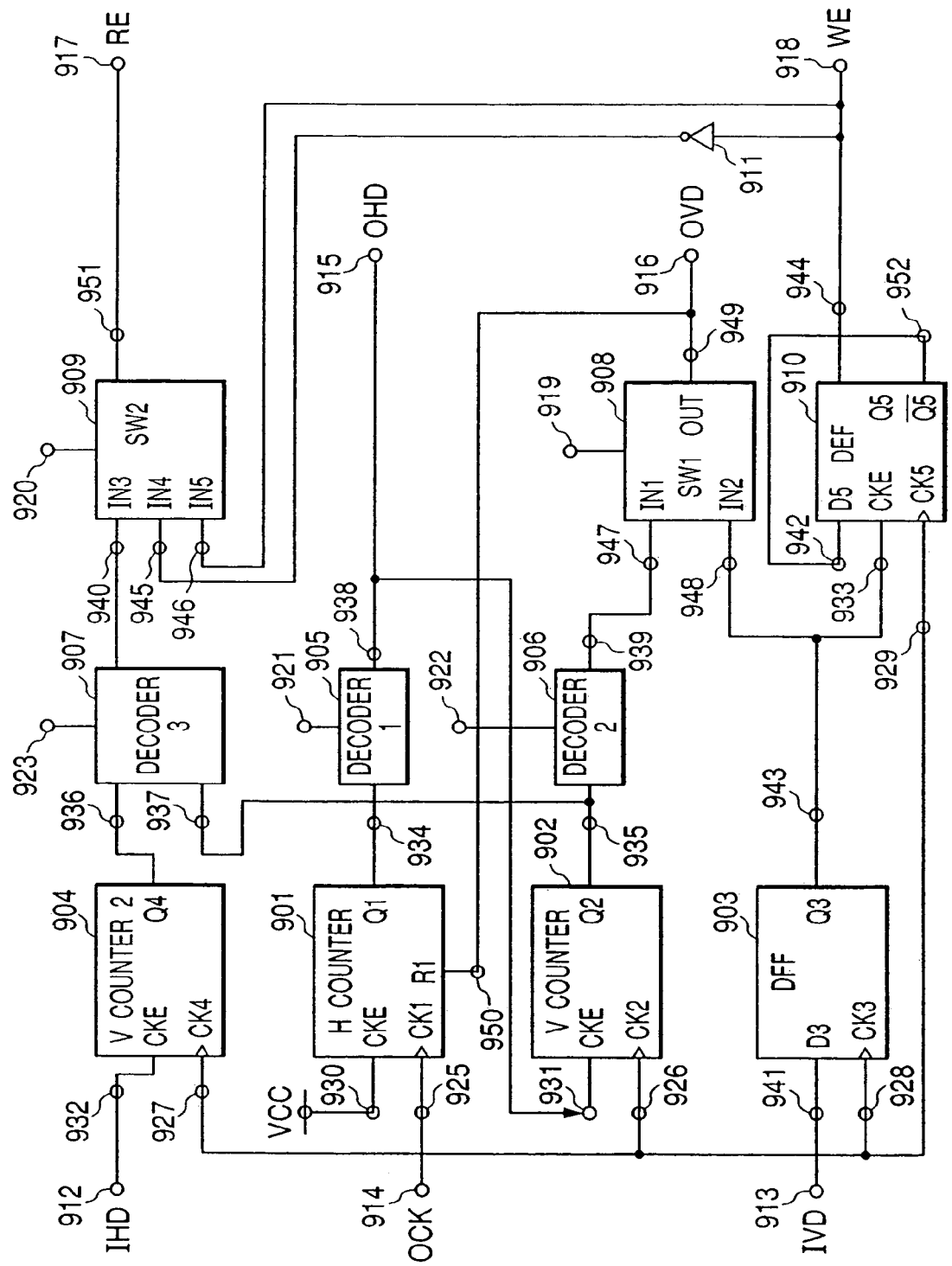
FIG. 2 is a block diagram of a synchronizing control unit in the device shown in FIG. 1.

Referring to FIG. 2, there is shown an example of a circuit configuration of the synchronizing control unit 10.

In FIG. 2, there are shown an H counter 901 for counting OCKs, a first V counter 902 for counting OHDs, a second V counter 904 for counting IHDs, and decoders 905, 906, and 907 for decoding respective outputs of the counters 901, 902, and 904 and generating arbitrary pulses. Reference numerals 903 and 910 designate D input flip-flops (D-FF) and 908 and 909 designate first and second switches (SW1 and SW2) for switching input pulses before outputting, respectively. An inverter 911 inverts a logic. Reference numerals 912, 913, and 914 designate input terminals for IHD, IVD, and OCK, and 915, 916, 917 and 918 designate output terminals for OHD, OVD, RE, and WE, respectively. In addition, there are shown input terminals 919 and 920 for signal lines for switching respective SW and input terminals 921, 922, and 923 for setting values to the first to third decoders.

Furthermore, there are shown clock input terminals 925, 926, and 927 for respective counters, clock enable terminals 930, 931, and 932 for respective counters, output terminals 934, 935, and 936 for respective counters, and a reset terminal 950 for the H counter. The output terminals 934, 935, 936, and 937 are also connected to input terminals for respective decoders, and output terminals for respective decoders are designated by 938, 939, and 940.

There are shown clock terminals 928 and 939 for D-FFs 903 and 910, a clock enable terminal 933, input terminals 941 and 942 for the D-FFs, non-inverted output terminals 943 and 944 for the D-FFs, and an inverted output terminal 952.

Reference numerals 947 and 948 designate input terminals IN1 and IN2 of the first switch and 949 designates an output terminal. Reference numerals 940, 945, and 946 designate input terminals IN3, IN4, and IN5 and 951 is an output terminal.

At this point, OCK is counted and decoded by the H counter 901 and the decoder 905 to generate OHD and to output it from the output terminal 915 and the generated OHD is counted an decoded by the first V counter 902 and the decoder 906 to output the result to an input terminal 947 of the first switch. On the other hand, the input IVD passes the D-FF 903 and is inputted to an input terminal 948 of the first switch 908. The input signals to the input terminals 947 and 948 are selected and switched according to an operation mode on the basis of a control signal from the microcomputer inputted to the terminal 919 and then one of them is outputted to the terminal 916 as OVD.

The output of the D-FF 903 is also inputted to the enable terminal 933 of the D-FF 910 and a memory write signal WE whose polarity is inverted whenever IVD is inputted to the terminal 933 is outputted to the terminal 918. In addition, the memory write signal WE and its inverted logical signal are inputted to the input terminals 945 and 946 of the second switch 909 as candidate signals of the memory readout signal. Furthermore, output results of both of the IHD counter 904 and the OHD counter 902 are decoded by the decoder 907 and the a signal determined by a relationship between them is also inputted to the input terminal 940 of the second switch 909 as a candidate signal of the memory readout signal. On the basis of a control signal from the microcomputer to the terminal 920, one of these three inputs is selected according to an operation mode and outputted from the terminal 917 as a memory readout signal RE.

Figure 3:
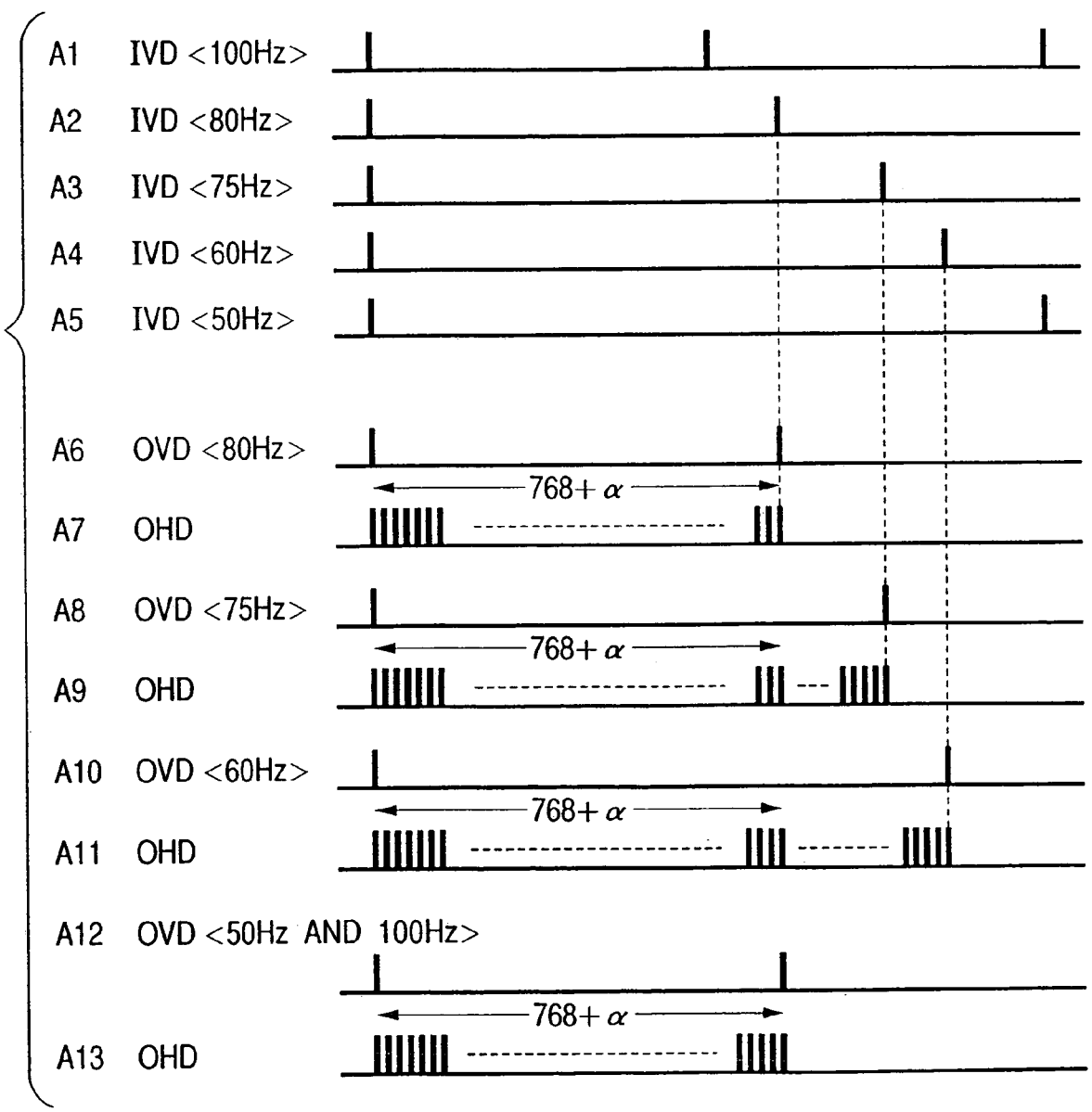
FIG. 3 is a timing chart of assistance in explaining an operation of the device shown in FIG. 1.

Table 1 shows a correspondence table between an operation mode for a input signal frequency and a signal output after switching between the first and second switches in this embodiment and FIG. 3 shows a timing chart for this operation.

TABLE 1

| Input vertical frequency | Output V Synchronization | Double buffering | SW1 | SW2 |
|---|---|---|---|---|
| f < 60 Hz | Not synchronized to input | ○ | IN1 | IN4 |
| 60 Hz ≦ f ≦ 80 Hz | Synchronized to input | X | IN2 | IN5 |
| 80 Hz < f | Not synchronized to input | ○ | IN1 | IN3 |

Table 1 shows whether an output vertical frequency is synchronized to an input signal relative to a range of a vertical frequency of the input signal, whether or not double buffering is to be performed, and signals for switching SW1 and SW2 before the output in FIG. 2 for achieving the operation.

In FIG. 3, there are shown input vertical synchronizing signals (IVD) A1, A2, A3, A4, and A5 at input vertical frequencies 100 Hz, 80 Hz, 75 Hz, 60 Hz, and 50 Hz, an output vertical synchronizing signal A6 and an output horizontal synchronizing signal A7 at an input frequency 80 Hz, an output vertical synchronizing signal A8 and an output horizontal synchronizing signal A9 at an input frequency 75 Hz, an output vertical synchronizing signal A10 and an output horizontal synchronizing signal A11 at an input frequency 60 Hz, and an output vertical synchronizing signal A12 and an output horizontal synchronizing signal A13 at input frequencies 50 Hz and 100 Hz.

In this embodiment, this invention is configured so as to select a mode for synchronizing an output vertical synchronizing signal OVD to an input vertical synchronizing signal IVD for an input signal having a vertical frequency within a range of 60 Hz to 80 Hz frequently used or a mode for generating an output vertical synchronizing signal independently of the input vertical synchronizing signal for other input signals.

Therefore, double buffering is not used (though it can be used) for input signals having vertical frequencies within the range of 60 Hz to 80 Hz, and an image quality without any passing-by, frame duplication, nor omission is achieved in dynamic images in a method of a synchronization with an input vertical synchronizing signal. In this operation, IN2 is selected for the first switch and IN5 (IN4 is possible) is selected for the second switch.

For input signals having a frequency less than 60 Hz, IN1 is selected for the SW1 switch to prevent flickering so as to improve a dynamic image quality with double buffering, asynchronously with inputs. If an input vertical frequency is lower than an output frequency, write scanning does not pass by memory readout scanning by using a memory region opposite to the write memory region as a readout field, and therefore IN4 is selected for the SW2 switch.

On the other hand, for input signals having a frequency 80 Hz or higher, IN1 is selected for SW1 to suppress an output system operation speed so as to improve a dynamic image quality with double buffering, asynchronously with inputs. If an input vertical frequency is higher than an output frequency, write scanning may pass by memory readout scanning even if a memory region opposite to the write memory region is used as a readout field, and therefore IN3 is selected for SW2 and a memory readout signal is output at such a timing that no passing-by will be caused by a relationship between the input IHD and the output OHD.

At this point, a frequency of the oscillator (OSC) in FIG. 1 is designed so as to match a clock frequency at XGA 80 Hz which is the highest vertical frequency of the output system. In other words, 1 field=1 V period=1S/80=12.5 mS, and therefore, for example, assuming 1 V=(768+α) H=808H, 1 H period=15.5 μS, and assuming 1 H=(1024+α) CLK=1344 CLK, 1 CLK=11.5 nS and a frequency of the oscillator 12 is 1/11.5 nS=87 MHz. If IVD having 80 Hz of A2 is input in FIG. 3, its output OVD is equal to IVD and IHD of 1 cyclic period of OVD is set to 808 (768+α=808).

If IHDs indicated by A3 and A4 having frequencies 75 Hz and 60 Hz are input, corresponding OHDs A8 and A9 have the same period as for the IHDs and periods of the OCK and the OHD for a period of the OVD are kept constantly, and therefore the number of OHDs for a period of the OVD is increased proportionally. For a period with an excess over 768+α=808, a display unit 7 is driven on the supposition that a blanking period will increase.

On the other hand, if an input IHD is A1 of 100 Hz or A5 of 50 Hz, an output vertical frequency is set asynchronously with an input, and therefore it is automatically transmitted in the same OVD or OHD period as for 80 Hz as shown by the OVD A12 or the OHD A13 and asynchronously with the input. The frequency band of 60 to 80 Hz is most widely prevailing via the current personal computers (PC), work stations (WS), or digital televisions (DTV) and video sources of dynamic images from televisions are transmitted within this range at 60 Hz in NTSC, thus the range is used very frequently and the highest priority given to dynamic images is very meaningful.

On the other hand, a flickering phenomenon in lower frequencies such as 50 Hz leads to a deterioration of an image quality which causes a screen to be very hard to see regardless of a discrimination between dynamic images and still images, and therefore by using temporarily a method which is good at dynamic images such as double buffering, prevention of flickering is combined with an improvement of the dynamic image quality.

For signals having higher vertical frequencies such as 100 Hz, taking seriously that an operation speed exceeding 100 MHz is hard on circuits, a method which is good at dynamic images such as double buffering is temporarily adopted to achieve a stable operation at a lower cost together with improving dynamic image qualities. Particularly, a display element such as an LCD or a PDP requires a high voltage of 10 and several volts to tens of volts for a driving voltage, and therefore if a speed per pixel is increased, a video signal system or a driver circuit requires a very high operating band or slew rate. Under the existing conditions, portions which cannot follow the driving at a high speed are divided to a plurality of parts for driving. Further increase of a speed of the output system, however, not only requires an increase of a cost due to changes to high-speed components, a development of new components, and a circuit change such as a change of the number of divisions, but reduces an operation margin of the circuit, thereby causing a trouble for a stable operation. This problem will be particularly serious for driving display elements having pixels several times as many as those under the existing conditions such as SXGA or UXGA. To cope with such an increase of pixels in the future, it is important to combine a reduction of a cost and a stable operation with an improvement of dynamic image qualities.

By using the configuration as described in this embodiment, the invention adopts a configuration which is good at dynamic images as the entire system operation so as to achieve operations having no problem on dynamic images within the vertical frequency band which is particularly used frequently and performs temporarily an operation effective to dynamic images in other vertical frequency bands to achieve a simple and inexpensive circuit configuration.

While double buffering is used for frequencies outside the frequently used vertical frequency band in this embodiment, the double buffering requires double memory regions and also control circuit portions for those and therefore it can be omitted as a function. As an embodiment of the present invention to provide a product at a reasonable price, it is also possible to synchronize a particular vertical frequency band to an input vertical frequency, on the other hand to determine frequencies outside the frequency band not to be so frequently used and to switch the operation to a simple asynchronous operation with the dynamic image quality not improved though the device operates as a product.

In addition, while it is selected whether or not an output system is synchronized with an input system on the basis of a vertical frequency of an input signal in this embodiment, the first embodiment of the present invention is characterized by a circuit for selecting whether or not the output system is synchronized with the input system, and therefore the switching can be based on another item of the input signal format, an operation mode of the system, or user settings or the like in addition to the vertical frequency of the input signal. In a second embodiment, an example is shown in which the selection is based on whether a dynamic image or a still image is used.

SECOND EMBODIMENT

While there has been described an example of switching whether or not an output system V synchronizing signal is synchronized with an input synchronizing signal according to a vertical frequency of an input in the first embodiment, there is shown an example of switching whether or not it is synchronized with the input synchronizing signal according to an operation purpose or a use in a second embodiment. A block diagram of the second embodiment is shown in FIG. 4.

Figure 5:
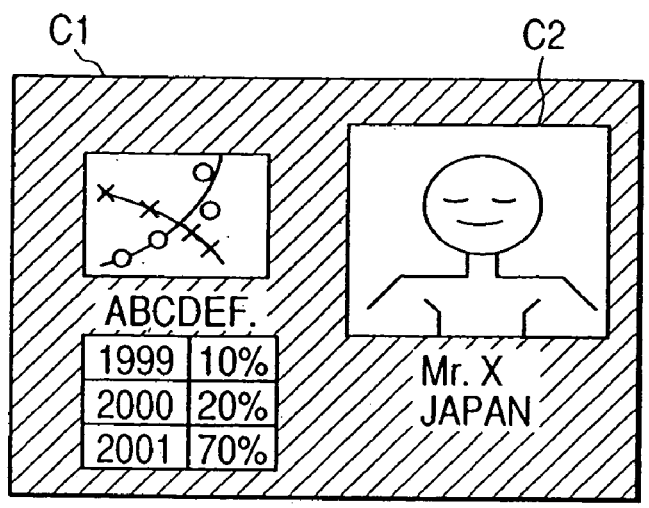
FIG. 5 is an example of an image display in the device shown in FIG. 4.
Figure 9:
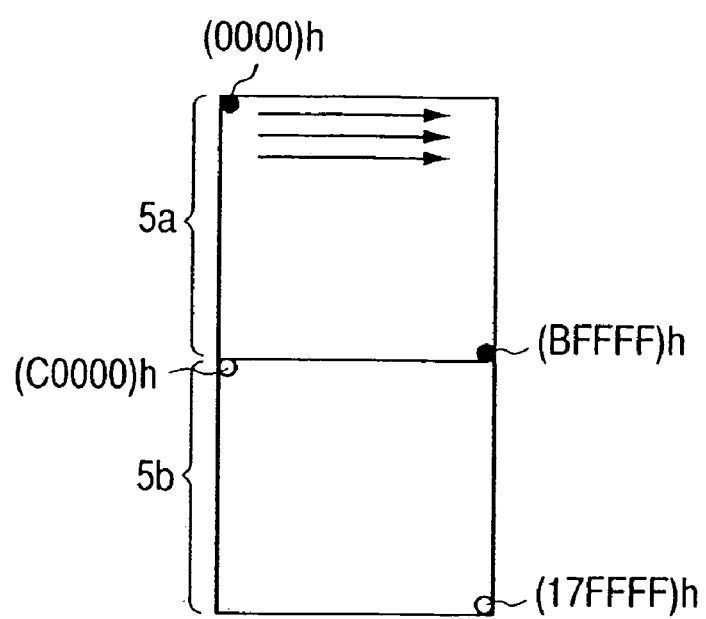
FIG. 9 is a diagram showing a memory region for double buffering.

In this embodiment, there are two input systems and they are synthesized in a memory control unit. In this circuit configuration a synthetic screen from different input sources is assumed such as, for example, an output screen of the PC displaying a graph or a table over the entire screen (C1) with a dynamic image of a TV phone or the like in a subscreen portion (C2) as shown in FIG. 5. In this condition, signals of both screens generally do not have any synchronous relationship. Additionally, there are various combinations of a dynamic image and a still image according to input sources to be connected.

Figure 4:
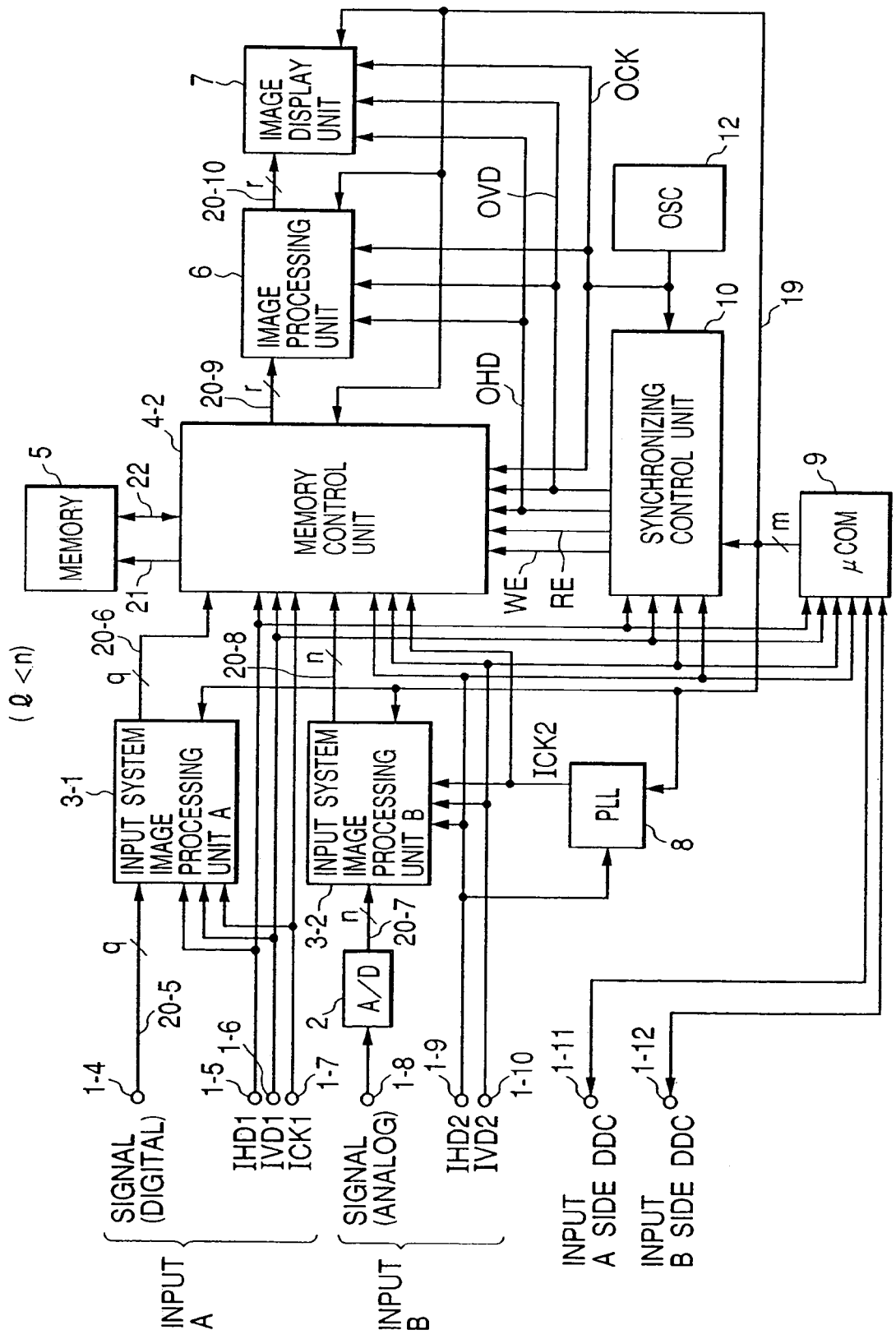
FIG. 4 is a block diagram of an image processing device according to a second embodiment of the present invention.

In FIG. 4, there are shown an input A system image processing unit 3-1, an input terminal 1-4 for q-bit digital image signals, an input terminal 1-5 for input horizontal synchronizing signals (IHD), an input terminal 1-6 for input vertical synchronizing signals (IVD1), an input terminal 1-7 for input signal synchronous clocks (ICK1), an input B system image processing unit 3-2, an input terminal 1-8 for analog image signals, an input terminal 1-9 for input horizontal synchronizing signals (IHD2), an input terminal 1-10 for input vertical synchronizing signals (IVD2), an AD converter 2 for converting a B system analog signal to an n-bit digital signal, a memory control unit 4-2, a memory unit 5 for storing image data, an output system image processing unit 6, an image display unit 7, data buses 20-5 and 20-6 for q-bit digital signals, data buses 20-7 and 20-8 for transmitting n-bit digital signals, data buses 20-9 and 20-10 for transmitting r-bit digital signals, a control bus 21 composed of memory control lines and address lines, and a memory data bus 22.

Furthermore, input A system and B system display data channel (DDC) terminals 1-11 and 1-12 transmit display information to input signal sources. The DDC is a communication standard between a computer display and a host system standardized by the Video Electronics Standards Association (VESA).

In addition, there are shown a PLL circuit 8, a clock ICK2 synchronous to the input B system horizontal synchronizing signal IHD2, an oscillator circuit 12 for generating output system clocks (OCK), a microcomputer (μCOM) unit 9, m control buses 19 for controlling respective units.

Digital image signals are subjected to image quality adjustment or image reduction or other conversion in the input system image processing unit 3-1 or 3-2 before being stored in the memory unit 5 and then transferred to the memory control unit 4-2. A motion is detected in the input system image processing units 3-1 and 3-2 and the results are transmitted to the microcomputer 9 via the buses 19 of the microcomputer. In the memory control unit 4, image data is stored into the memory unit 5 at a timing corresponding to an input synchronizing signal (IHD1, IHD2, IVD1, IVD2) and an input system clock ICK1 and ICK2, the image data is read out from the memory unit 5 at a timing corresponding to an output system clock OCK, a horizontal synchronizing signal OHD, and a vertical synchronizing signal OVD, and the data is transferred to the output system image processing unit 6. In the image processing unit 6, an image quality is adjusted and image is converted with enlargement or the like in the same manner as for the conventional example in FIG. 6.

In FIG. 4, there is shown a synchronizing control unit 10, which is a block for determining an output frame rate. Input synchronizing signals IHD1, IVD1, IHD2, IVD2, and an output system clock OCK18 are inputted to this unit and it outputs output system horizontal synchronizing signals OHD, vertical synchronizing signals OVD, write field control signals WE, and readout field control signals RE. These control operations are controlled by the microcomputer buses 19.

Next, an example of an operation of the synchronizing control unit 10 is shown in Table 2. In the same manner as for the first embodiment, the output vertical synchronizing signal is switched to be synchronous or asynchronous to an input by using a switch. It differs from the first embodiment in that there are two input systems and that a synchronization relationship is switched to another according to a condition of a dynamic image or of a still image of the two input source systems in addition to switching the synchronization relationship according to a frequency.

TABLE 2

| Operation mode | Output V Synchronization (OVD) |
| --- | --- |
| Dynamic image in input A | Synchronized to input IVD1 |
| Dynamic image in input B | Synchronized to input IVD2 |
| Dynamic images in both inputs A and B | Synchronized to signal having shorter period comparing IVD1 with IVD2 |
| Manual setting | Selecting whether or not the output is synchronized with IVD1 or IVD2 |

In response to the result of the detected motion in the above input image processing units 3-1 and 3-2, the operation mode is switched as shown in Table 2 according to a control signal from the microcomputer 9. If one is a dynamic image and the other is a still image, an OVD is synchronized with the input vertical synchronizing signal of the dynamic image. If a dynamic image is detected in both systems, an OVD is synchronized with a vertical synchronizing signal having a shorter period after comparing the IVD1 with the IVD2. If devices are arranged for fixed uses such as an A system for a PC and a B system for a TV output like a fixed TV conference system, it is possible to determine whether the OVD is manually synchronized with the IVD1 of the A system or with the IVD2 of the B system or the OVD is generated asynchronously with both of the A and B systems.

Furthermore in this embodiment, the following control is performed by using control lines for transmitting information in the DDC or other display side to input signal sources such as a PC. In other words, if only one system is operating and the other is not connected in the initial state, for example, if only the B system is connected and operating, the synchronizing control unit 10 sets the OVD to an operation as shown in Table 1 for the IVD2 in the same manner as for the first embodiment.

Next, if one system is connected later (system A in this example), the microcomputer requests a signal having the same vertical frequency as the current OVD period from an input signal source via the A system DDC terminal 1-11. The A system input signal source which has received it makes settings for a signal having the requested vertical frequency, by which both of the two input systems have the same frequency and it becomes possible to achieve output settings for both displays coping with dynamic images.

If a new A system does not accept the DDC, the microcomputer unit makes a judgment and re-sets an output synchronizing OVD as a setting synchronized with the IVD1 of the A system connected later, while requesting a signal having the same vertical frequency as the OVD period from the B system input signal source via the B system DDC terminal 1-12. The B system input signal source which has received it makes re-setting for the signal having the requested vertical frequency so that the two input systems have the same frequency.

By using this configuration, it becomes possible to achieve a simple and inexpensive circuit which is good at dynamic images while operating an output system with clocks for one system also in a system including input signals having a plurality of different frequencies.

THIRD EMBODIMENT

Figure 21:
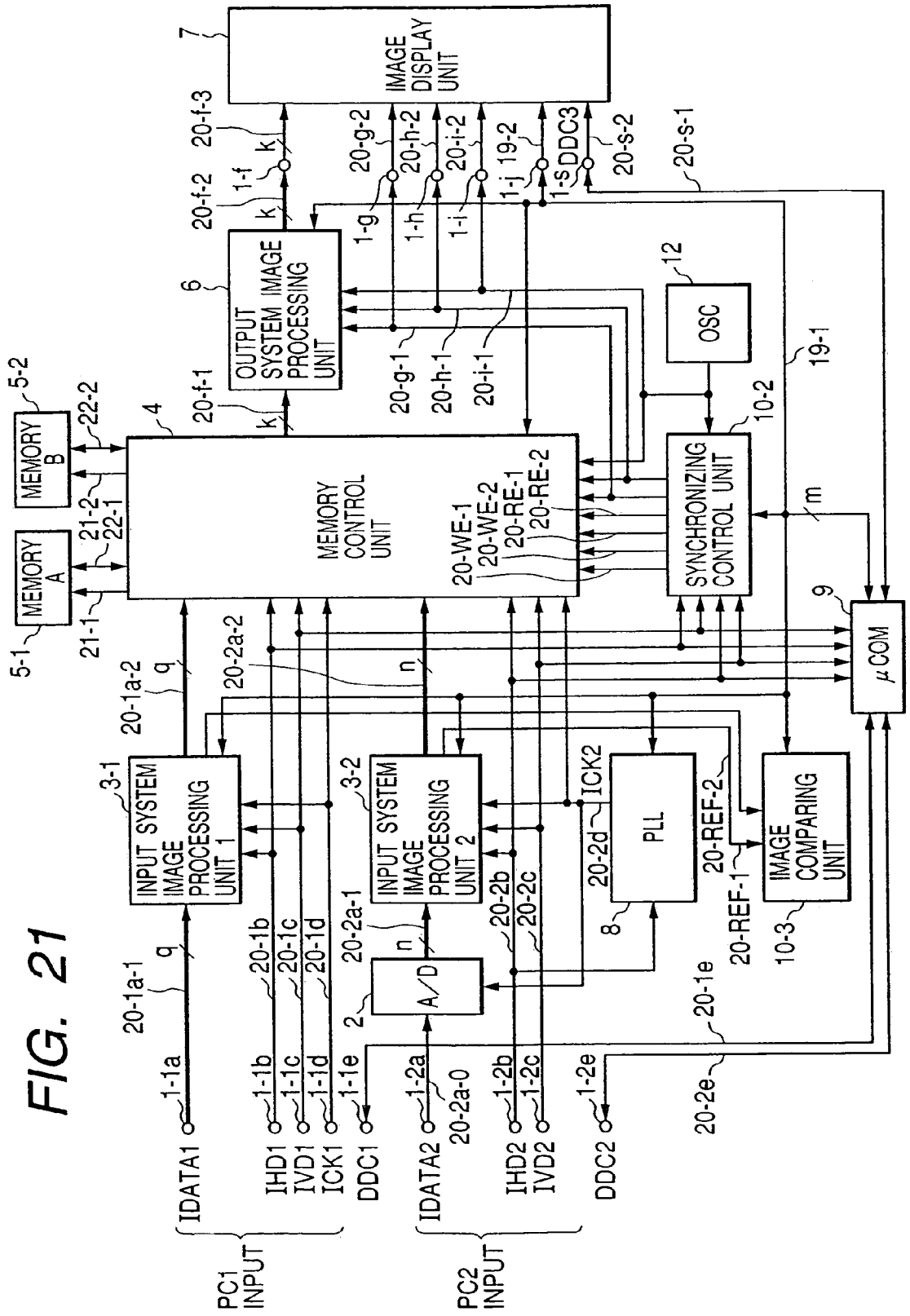
FIG. 21 is a block diagram of an image processing device according to a third or a fourth embodiment of the present invention.

Referring to FIG. 21, there is shown a block diagram of an image processing unit for an image display for displaying a multi-screen having two screens in an image display unit of one system with a synthesization by controlling outputs from frame memories, having PC inputs of two systems; digital computer image signal inputs of one system and analog computer image signal inputs of the other system, as a third embodiment of a display to which the present invention is applied.

In this diagram, there is shown an input terminal 1-1*a* for q-bit digital computer image signals (IDATA1) of the first system. While there must be three systems of red, blue, and green (RGB) intrinsically, the configuration is described here with one system for simplification of the description (the same shall apply hereinafter). There are shown an input terminal 1-1*b* for input horizontal synchronizing signals (IHD1), an input terminal 1-1*c* for input vertical synchronizing signals (IVD1), an input terminal 1-1*d* for image signal clocks (ICK1), an input-output terminal 1-1*e* for DDC signals (DDC1), data buses 20-1*a*-1 and 20-1*a*-2 for transmitting q-bit digital image signals to respective units, and signal lines 20-1*b*, 20-1*c*, 20-1*d*, and 20-1*e* for IHD1, IVD1, ICK1, and DDC1, respectively.

There are also shown an input terminal 1-2*a* for analog computer image signals (IDATA2) for the second system, an input terminal 1-2*b* for input horizontal synchronizing signals (IHD2), an input terminal 1-2*c* for input vertical synchronizing signals (IVD2), and an input-output terminal 1-2*e* for DDC signals (DDC2).

An AD converter 2 converts an analog image signal (IDATA2) to an n-bit digital signal. A PLL (phase locked loop) circuit 8 generates input system clocks (ICK2) in the PC2 side synchronized to a horizontal synchronizing signal (IHD2) inputted from the input terminal 1-2*b*.

There are shown an analog signal line 20-2*a*-0, n-bit digital signal lines 20-2*a*-1 and 20-2*a*-2, and signal lines 20-2*b*, 20-2*c*, 20-2*d*, and 20-2*e* for IHD2, IVD2, ICK2, and DDC2, respectively.

Reference numerals 3-1 and 3-2 indicate an input system image processing unit 1 connected to the PC1, and an input system image processing unit 2 connected to the PC2, respectively.

There are shown an image comparing unit 10-3 and signal lines 20-REF-1 and 20-REF-2 for comparing signals sampled for a comparison from image signals outputted from the input system image processing unit 1 and the input system image processing unit 2.

A memory control unit 4 stores image signals once inputted from the input image processing units of the two systems, synthesizes images in order to output them as a multi-screen display, and then outputs it to an output system image processing unit. Frame memories (memory A, memory B) 5-1 and 5-2 correspond to an input system PC1 and an input system PC2, respectively. There are shown control busses 21-1 and 21-2 for the memory A and the memory B, respectively, and data buses 22-1 and 22-2 for the memory A and the memory B, respectively.

There are also shown an output system image processing unit 6 and an image display unit 7 such as an LCD, a plasma display, or a CRT.

There are shown an input terminal 1-*f* of the image display unit for digital data (ODATA) of the image display unit, an input terminal 1-*g* of the image display unit for output horizontal synchronizing signals (OHD), an input terminal 1-*h* of the image display unit for output vertical synchronizing signals (OVD), an input terminal 1-*i* of the image display unit for output image signal clocks (OCK), an input terminal 1-*j* of the image display unit for a microcomputer bus (MB), an input-output terminal 1-*s* for DDC signals (DDC3) to the image display unit, signal lines 20-*s*-1 and 20-*s*-2 for the DDC3, and signal lines 20-*f*-1, 20-*f*-2, and 20-*f*-3 for k-bit digital image data (ODATA).

An oscillator circuit 12 generates output system clocks (OCK). Reference characters 20-*i*-1 and 20-*i*-2 indicate signal lines for OCK.

Reference numeral 10-2 indicates a synchronizing control unit, and reference characters 20-WE-1, 20-RE-1, 20-WE-2, and 20-RE-2 indicate a memory A write field control signal WE-A, a memory A readout field control signal RE-A, a memory B write field control signal WE-B, and a memory B readout field control signal RE-B, respectively. Reference characters 20-*g*-1 and 20-*g*-2 indicate signal lines for output system horizontal synchronizing signals (OHD) and 20-*h*-1 and 20-*h*-2 indicate signal lines for output system vertical synchronizing signals (OVD).

A microcomputer unit 9 control the system and microcomputer buses 19-1 and 19-2 are composed of control lines from the microcomputer to respective units and data lines.

Digital image signals inputted from the image input terminal 1-1*a* are subjected to image quality adjustment or image reducing conversion or other processing in the input system image processing unit 1 designated by 3-1 and then transferred to the memory control unit 4 before being stored in the memory unit A designated by 5-1. In addition, a signal for a comparison of the image qualities is selected from the input system image processing unit 1 by the microcomputer and then transmitted to an image comparing unit.

Analog image signals inputted from the image input terminal 1-2*a* are converted to digital data by the AD converter 2 synchronously with clocks generated by the PLL circuit 8. The digital image signals obtained in this manner are subjected to image quality adjustment or image reduction or other conversion in the input system image processing unit 2 designated by 3-2 and then transferred to the memory control unit 4 before being stored into the memory unit B designated by 5-2.

Furthermore, a signal for a comparison of image qualities is selected by the microcomputer from the input system image processing unit 2 and transmitted to the image comparing unit.

The memory control unit 4 stores image data into the memory unit A designated by 5-1 at a timing that a signal from IDATA1 corresponds to the input synchronizing signal (IDH1, IVD1) and the input system clock ICK1 and stores image data into the memory unit. B designated by 5-2 at a timing that a digital signal converted from IDATA2 corresponds to the input synchronizing signal (IHD2, IVD2) and the input system clock ICK2.

In this embodiment, after securing memory regions which can be used for double buffering for both of the memory unit A and the memory unit B, a write memory region and a readout memory region are switched to each other on the basis of a memory write signal and a readout signal (20-WE-1, 20-WE2, 20-RE-1, 20-RE-2) in the synchronizing control unit.

Furthermore, two pieces of image data are read out from the memory units 5-1 and 5-2 at a timing suitable for a predetermined image size and a relation of a display position synchronously with the output system clock OCK, the horizontal synchronizing signal OHD from the synchronizing control unit, and the vertical synchronizing signal OVD and then the data is transferred to the output system image unit 6.

In the image processing unit 6, image qualities are adjusted and images are converted with enlargement or the like. Finally these image data, synchronizing signals, and clocks are transmitted to the image display unit for an image display.

In this embodiment, the synchronizing control unit 10-2 generates an output synchronizing signal and a memory control signal appropriately for a frame rate selected for an output with switching selections. Input synchronizing signals IHD1, IHD2, IVD1, IVD2, and output system clocks OCK are entered into this unit and it outputs output system horizontal synchronizing signals OHD (20-*g*-1), vertical synchronizing signals OVD (20-*h*-1), memory A write field control signals WE-A (20-WE-1), memory A readout field control signals RE-A (20-RE-1), memory B write field control signals WE-B (20-WE-2), and memory B readout field control signals RE-B (20-RE-2). These controlling operations are controlled by the microcomputer bus 19-1.

In this embodiment, the image comparing unit 10-3 compares image qualities of respective input systems and outputs information for the microcomputer to control image qualities of the output systems and the input systems. A computation result of the comparison information obtained from the comparing signals 20-REF-1 and 20-REF-2 sampled for the comparison from the image signals outputted from the input system image processing unit 1 and the input system image processing unit 2 is transmitted to the microcomputer via the microcomputer bus 19-1.

In this embodiment, after input system IHD1, IHD2, IVD1, and IVD2 are entered in the microcomputer unit, operation timings of the input signals are compared with each other by using the synchronizing signals and also taking into consideration DDC3 or other communication paths and characteristics or conditions of the display unit given as the initial information, and an operation timing of the system is determined to control the synchronizing control unit and to control an operation timing of input signal sources via the DDC1 and the DDC2. As for the image quality control, inner image processing units (input system image processing unit 1, input system image processing unit 2, and output system image processing unit) are controlled in comparison with DDC3 or other communication paths and characteristics or conditions of the display unit given as the initial information in addition to a comparison of image quality characteristics of the input systems obtained from the image comparing unit and the image quality control is performed for input signal sources via the DDC1 and the DDC2.

By this operation, the operation timing and the image quality of the entire system are optimized according to the image qualities of the input systems and the output display unit and characteristics of dynamic images when a multi-screen is displayed by synthesizing input images having various formats and image quality characteristics of a plurality of input systems into a single screen.

Figure 22:
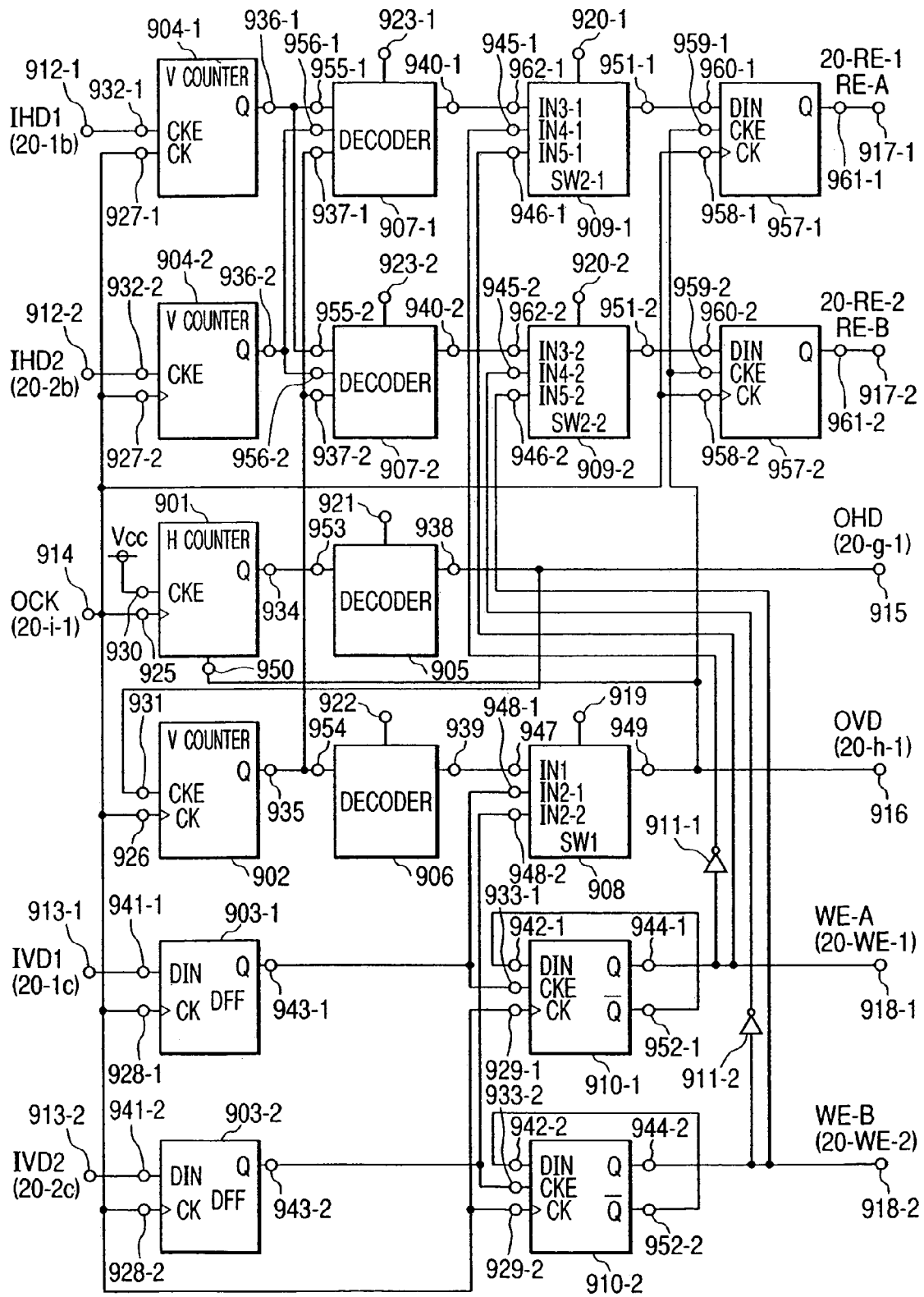
FIG. 22 is a block diagram of a synchronizing control unit in the device shown in FIG. 20.

FIG. 22 shows an example of a circuit configuration of the synchronizing control unit 10-2. Referring to FIG. 22, there are shown an H counter 901 for counting OCK, a first V counter 902 for counting OHD, a second V counter 904-1 for counting IHD1, and a third V counter 904-2 for counting IHD2.

There are also shown D input flip-flops (DFF) 903-1, 903-2, 910-1, 910-2, 957-1, and 957-2 and first, second third, and fourth decoders 905, 906, 907-1, and 907-2 for decoding respective counter outputs and generating arbitrary pulses. Furthermore, there are shown first (SW1), second (SW2-1), third (SW2-2) switches 908, 909-1, and 909-2 for switching input pulses before outputting and inverters 911-1 and 911-2 for inverting logic.

In addition, there are shown input terminals 912-1 and 912-2 for IHD1 and IHD2, input terminals 913-1 and 913-2 for IVD1 and IVD2, an input terminal 914 for OCK, an output terminal 915 for OHD, an output terminal 916 for OVD, output terminals 917-1 an d917-2 for RE-A and RE-B, respectively, and output terminals 918-1 and 918-2 for WE-A and WE-B, respectively. In addition, input terminals 919, 920-1, and 920-2 for signal lines are used to switch the first to third switches SWs among control buses of the microcomputer and input terminals 921, 922, 923-1, and 923-2 are used for control buses of the microcomputer to set values of the first to fourth decoders.

Furthermore, there are shown clock input terminals 925, 926, 927-1, and 927-2 for respective counters, clock enable terminals 930, 931, 932-1, and 932-2 for respective counters, and output terminals 934, 935, 936-1, and 936-2 for respective counters. Reference numeral 950 designates a reset terminal for an H counter. The output terminals 934, 935, 936-1, and 936-2 for respective counters are also connected to input terminals 953, 954, 955-1, 955-2, 956-1, 956-2, 937-1, and 937-2 and reference numerals 938, 939, 940-1, and 940-2 designate output terminals for respective decoders.

Reference numerals 928-1, 928-2, 929-1, 929-2, 958-1, and 958-2 designate clock terminals for respective DFFs, 933-1, 933-2, 959-1, and 959-2 designate clock enable terminals, 941-1, 941-2, 942-1, 942-2, 960-1, and 960-2 designate D input terminals, 943-1, 943-2, 944-1, 944-2, 961-1, and 961-2 designate DFF output terminals, and 952-1 and 952-2 designate inverted output terminals.

Reference numerals 947, 948-1, and 948-2 designate input terminals IN1, IN2-1, and IN2-2 for the first switch 908 and 949 designates an output terminal. Reference numerals 962-1, 945-1, and 946-1 designate input terminals IN3-1, IN4-1, and IN5-1 for the second switch (SW2-1) 909-1 and 951-1 designates an output terminal. Reference numerals 962-2, 945-2, and 946-2 are input terminals IN3-2, IN4-2, and IN5-2 for the third switch (SW2-2) 909-2 and 951-2 designates an output terminal.

The OCK clocks are counted and decoded by the H counter 901 and the decoder 905 to generate OHD and to output it from the terminal 915 and the generated OHD is counted and decoded by the first V counter 902 and the decoder 906 to output the result to the input terminal 947 for the first switch.

On the other hand, the input IVD1 passes the DFF 903-1 and is inputted to the input terminal 948-1 for the first switch. The input IVD2 passes the DFF 903-2 and is inputted to the input terminal 948-2 for the first switch. One of the signals inputted to the input terminals 947, 948-1, and 948-2 is selected for switching according to an operation mode on the basis of a control signal from the microcomputer of the terminal 919 and the selected signal is output as OVD to the terminal 916.

An output from the DFF 903-1 is also inputted to the enable terminal 933-1 for the DFF 910-1 and a memory write signal WE-A whose polarity is inverted whenever IVD1 is inputted to the terminal 933-1 is outputted to the terminal 918-1. An output from the DFF 903-2 is also inputted to the enable terminal 933-2 for the DFF 910-2 and a memory write signal WE-B whose polarity is inverted whenever IVD2 is inputted to the terminal 933-2 is outputted to the terminal 918-2.

The memory write signal WE-A and its inverted logical signal are inputted to the input terminals 945-1 and 946-1 for the second switch (SW2-1) 909-1 as candidate signals for a memory readout signal. Furthermore, signals from the output terminal 940-1 for the decoder 907-1, obtained by decoding values of an IHD1 counter 904-1 output, an IHD2 counter 904-2 output, and an OHD counter 902 output in a relationship determined by the control signal 923-1 from the microcomputer, are also inputted to the input terminal 962-1 for the second switch (SW2-1) 909-1 as candidate signals for the memory readout signal and then one is selected out of the three inputs according to an operation mode on the basis of a control signal from the microcomputer of the terminal 920-1. This result is latched by the DFF 957-1 at an OVD timing and is outputted from the terminal 917-1 as a memory readout signal RE-A.

Furthermore, the memory write signal WE-B and its inverted logical signal are inputted to the input terminals 945-2 and 946-2 for the third switch (SW2-2) 909-2 as candidate signals for a memory readout signal. In addition, signals from the output terminal 940-2 for the decoder 907-2, obtained by decoding values of an IHD1 counter 904-1 output, an IHD2 counter 904-2 output, and an OHD counter 902 output in a relationship determined by the control signal 923-2 from the microcomputer, are also inputted to the input terminal 962-2 for the third switch (SW2-2) 909-2 as candidate signals for the memory readout signal and then one is selected out of the three inputs according to an operation mode on the basis of a control signal from the microcomputer of the terminal 920-2. This result is latched by the DFF 957-2 at an OVD timing and is outputted from the terminal 917-2 as a memory readout signal RE-B.

Table 3 shows a correspondence table between an operation mode for a input signal frequency and a signal output after switching between respective switches in this embodiment. A timing chart for these conditions is the same as for FIG. 3 in the above.

TABLE 3

| | IN1 input vertical frequency | IN2 input vertical frequency | OVD output vertical synchronization | Memory A: Double buffering | Memory A: Double buffering | SW1 | SW2-1 | SW2-2 |
|---|---|---|---|---|---|---|---|---|
| (1) | fIN1 < 60 Hz | fIN2 < 60 Hz | Not synchronized to IN1 input Not synchronized to IN2 input | ◯ | ◯ | IN1 | IN4-1 | IN4-2 |
| (2) | fIN1 < 60 Hz | 60 Hz ≦ fIN2 ≦ 80 Hz | Not synchronized to IN1 input Synchronized to IN2 input | ◯ | Not required | IN2-2 | IN4-1 | IN5-2 |
| (3) | fIN1 < 60 Hz | 80 Hz < fIN2 | Not synchronized to IN1 input Not synchronized to IN2 input | ◯ | ◯ | IN1 | IN4-1 | IN3-2 or IN5-2 |

TABLE 3-continued

| | IN1 input vertical frequency | IN2 input vertical frequency | OVD output vertical synchronization | Memory A: Double buffering | Memory A: Double buffering | SW1 | SW2-1 | SW2-2 |
|---|---|---|---|---|---|---|---|---|
| (4) | 60 Hz ≦ fIN1 ≦ 80 Hz | fIN2 < 60 Hz | Synchronized to IN1 input Not synchronized to IN2 input | Not required | ○ | IN2-1 | IN5-1 | IN4-2 |
| (5) | 60 Hz ≦ fIN1 ≦ 80 Hz | 60 Hz ≦ fIN2 ≦ 80 Hz fIN1 < fIN2 | Synchronized to IN1 input Not synchronized to IN2 input | Not required | ○ | IN2-1 | IN5-1 | IN3-2 or IN5-2 |
| (6) | 60 Hz ≦ fIN1 ≦ 80 Hz | 60 Hz ≦ fIN2 ≦ 80 Hz fIN1 ≧ fIN2 | Synchronized to IN1 input Not synchronized to IN2 input | Not required | ○ | IN2-1 | IN5-1 | IN4-2 |
| (7) | 60 Hz ≦ fIN1 ≦ 80 Hz | 60 Hz ≦ fIN2 ≦ 80 Hz fIN1 ≦ fIN2 | Not synchronized to IN1 input Synchronized to IN2 input | ○ | Not required | IN2-2 | IN4-1 | IN5-2 |
| (8) | 60 Hz ≦ fIN1 ≦ 80 Hz | 60 Hz ≦ fIN2 ≦ 80 Hz fIN1 > fIN2 | Not synchronized to IN1 input Synchronized to IN2 input | ○ | Not required | IN2-2 | IN3-1 or IN5-1 | IN5-2 |
| (9) | 60 Hz ≦ fIN1 ≦ 80 Hz | 80 Hz < fIN2 | Synchronized to IN1 input Not synchronized to IN2 input | Not required | ○ | IN2-1 | IN5-1 | IN3-2 or IN5-2 |
| (10) | 80 Hz < fIN1 | fIN2 < 60 Hz | Not synchronized to IN1 input Not synchronized to IN2 input | ○ | ○ | IN1 | IN3-1 or IN5-1 | IN4-2 |
| (11) | 80 Hz < fIN1 | 60 Hz ≦ fIN2 ≦ 80 Hz | Not synchronized to IN1 input Synchronized to IN2 input | ○ | Not required | IN2-2 | IN3-1 or IN5-1 | IN5-2 |
| (12) | 80 Hz < fIN1 | 80 Hz < fIN2 | Not synchronized to IN1 input Not synchronized to IN2 input | ○ | ○ | IN1 | IN3-1 or IN5-1 | IN3-2 or IN5-2 |

Table 3 shows whether an output vertical frequency is synchronized to any input signal relative to a range of frequencies fIN1 and fIN2 for vertical synchronizing signals (IVD1, IVD2) for two system input signals, whether or not double buffering is to be performed, and signals for switching SW1, SW2-1, and SW2-2 before outputting in FIG. 21 for achieving the operation.

In FIG. 3, there are shown input vertical synchronizing signals IVD (IVD1 and IVD2) designated by A1, A2, A3, A4, and A5 at input vertical frequencies 100 Hz, 80 Hz, 75 Hz, 60 Hz, and 50 Hz, an output vertical synchronizing signal (OVD) A6 and an output horizontal synchronizing signal (OHD) A7 at an input frequency 80 Hz, an output vertical synchronizing signal (OVD) A8 and an output horizontal synchronizing signal (OHD) A9 at an input frequency 75 Hz, an output vertical synchronizing signal (OVD) A10 and an output horizontal synchronizing signal (OHD) A11 at an input frequency 60 Hz, and an output vertical synchronizing signal (OVD) A12 and an output horizontal synchronizing signal (QHD) A13 at input frequencies 50 Hz and 100 Hz.

In this embodiment, a screen good at dynamic images is displayed as a mode for synchronizing an output vertical synchronizing signal OVD to an input vertical synchronizing signal IVD1 or IVD2 for an input signal having a vertical frequency within a range of 60 Hz to 80 Hz used frequently. If both of the IVD1 and the IVD2 have vertical frequencies within the frequently used range of 60 Hz to 80 Hz, one is selected out of the inputs of the two systems so as to be given a priority for synchronization by judging the characteristics of input images with the microcomputer (for example, discriminating between a dynamic image and still image by means of the image comparing unit 10-3 in FIG. 21), by user settings, according to a proportion of display areas of input images on a display screen, or by taking the front screen if a plurality of window screens are opened on the display screen.

Therefore, double buffering need not be used (though it can be used) for input signals having vertical frequencies within the range of 60 Hz to 80 Hz, and an image quality without any passing-by, frame duplication, nor omission is achieved in dynamic images in a method of a synchronization with an input vertical synchronizing signal.

In synchronization with the IVD1 ((4), (5), (6), and (9) in Table 3), IN2-1 is selected for the SW1 and IN5-1 is selected for the SW2-1 switch for the synchronized system. In synchronization with the IVD2 ((2), (7), (8), and (11) in Table 3), IN2-2 is selected for the SW1 and IN5-2 is selected for the SW2-2 switch for the synchronized system.

For input signals having a vertical frequency less than 60 Hz ((1) to (3) in Table 3 for the IVD1 and (1), (4), and (10) for the IVD2), IN1 is selected for the SW1 switch to prevent flickering so as to improve a dynamic image quality with double buffering, and outputs are performed constantly at 80 Hz asynchronously with inputs. If an input vertical frequency is lower than an output frequency, write scanning does not pass by memory readout scanning by using a memory region opposite to the write memory region as a readout field, and therefore IN4 (IN4-1 or IN4-2) is selected for the SW2 (SW2-1 or SW2-2) switch.

On the other hand, if an input vertical frequency IVD (IVD1, IVD2) is 80 Hz or higher ((10) to (12) in Table 3 for the IVD1 and (3), (9), and (12) for the IVD2), IN1 is selected for SW1 to suppress an output system operation speed so as to improve a dynamic image quality with double buffering, and outputs are performed constantly at 80 Hz asynchronously with inputs. If an input vertical frequency is higher than an output frequency, write scanning may pass by memory readout scanning even if a memory region opposite to the write memory region is used as a readout field, and therefore IN3 (IN3-1 or IN3-2) is selected for SW2 (SW2-1 or SW2-2) and a memory readout signal is output at such a timing that no passing-by will be caused by a relationship between the input IVD1, IVD2 and the output OVD.

If both of the IVD1 and the IVD2 have vertical frequencies within the frequently used range of 60 Hz to 80 Hz, write scanning does not pass by memory readout scanning by using the memory region opposite to the write memory region as a readout field if an input vertical frequency is lower than the output system frequency in a system in a selected mode asynchronous with the output, and therefore IN4 (IN4-1 or IN4-2) is selected for the SW2 (SW2-1 or SW2-2). If the input vertical frequency is higher than the output system frequency to the contrary, write scanning may pass by memory readout scanning even if the memory region opposite to the write memory region is used as a readout field, and therefore IN3 (IN3-1 or IN3-2) is selected for SW2 (SW2-1 or SW2-2) and a memory readout signal is output at such a timing that no passing-by will be caused by a relationship between the input IVD1, IVD2 and the output OVD.

At this point, a frequency of the oscillator OSC 12 in FIG. 21 is designed so as to match a clock frequency at XGA 80 Hz which is the highest vertical frequency of the output system (For example, assuming 87 MHz, 1 field=1 V period=12.5 mS, 1 V=(768+α) H=808H, and assuming 1 H period=15.5 μS, 1 H=(1024+α) CLK=1344 CLK, 1 CLK=11.5 nS).

If IVD having 80 Hz indicated by A2 is input in FIG. 3, its output IVD equals to IVD and IHD in the duration is set to 808 (768+α=808).

If IHDs indicated by A3 and A4 having frequencies 75 Hz and 60 Hz are input, corresponding OHDs A8 and A9 have the same period as for the IHDs and periods of the OCK and the OHD in the duration are kept constantly, and therefore the number of OHDs for a period of the OVD is increased proportionally. For a period with an excess over 768+α=808, a display unit 7 is driven on the supposition that a blanking period will increase.

On the other hand, if an input IHD is A1 of 100 Hz or A5 of 50 Hz, an output vertical frequency is set asynchronously with an input, and therefore it is automatically transmitted in the same OVD or OHD period as for 80 Hz as shown by the OVD A12 or the OHD A13 and asynchronously with the input.

By using FIGS. 23 to 26, there are specifically shown examples of the operations. In FIGS. 23 to 26, there are shown (a) vertical synchronizing signal IVD1 of the input system 1, (b) memory A write signal WE-A generated by the circuit shown in FIG. 22, (c) vertical synchronizing signal IVD2 of the input system 2, (d) memory B write signal WE-B generated by the circuit shown in FIG. 22, (e) output vertical synchronizing signal OVD generated by the circuit shown in FIG. 22, (f) memory A readout signal RE-A generated by the circuit shown in FIG. 22, and (g) memory B readout signal RE-B generated by the circuit shown in FIG. 22. Ta1 to Ta9 indicate timings for rising from the low level to the high level of the output vertical synchronizing signals and the circuit in FIG. 22 samples WE-A and WE-B signal polarities at these timings so as to determine the RE-A and RE-B signal polarities.

Figure 23:
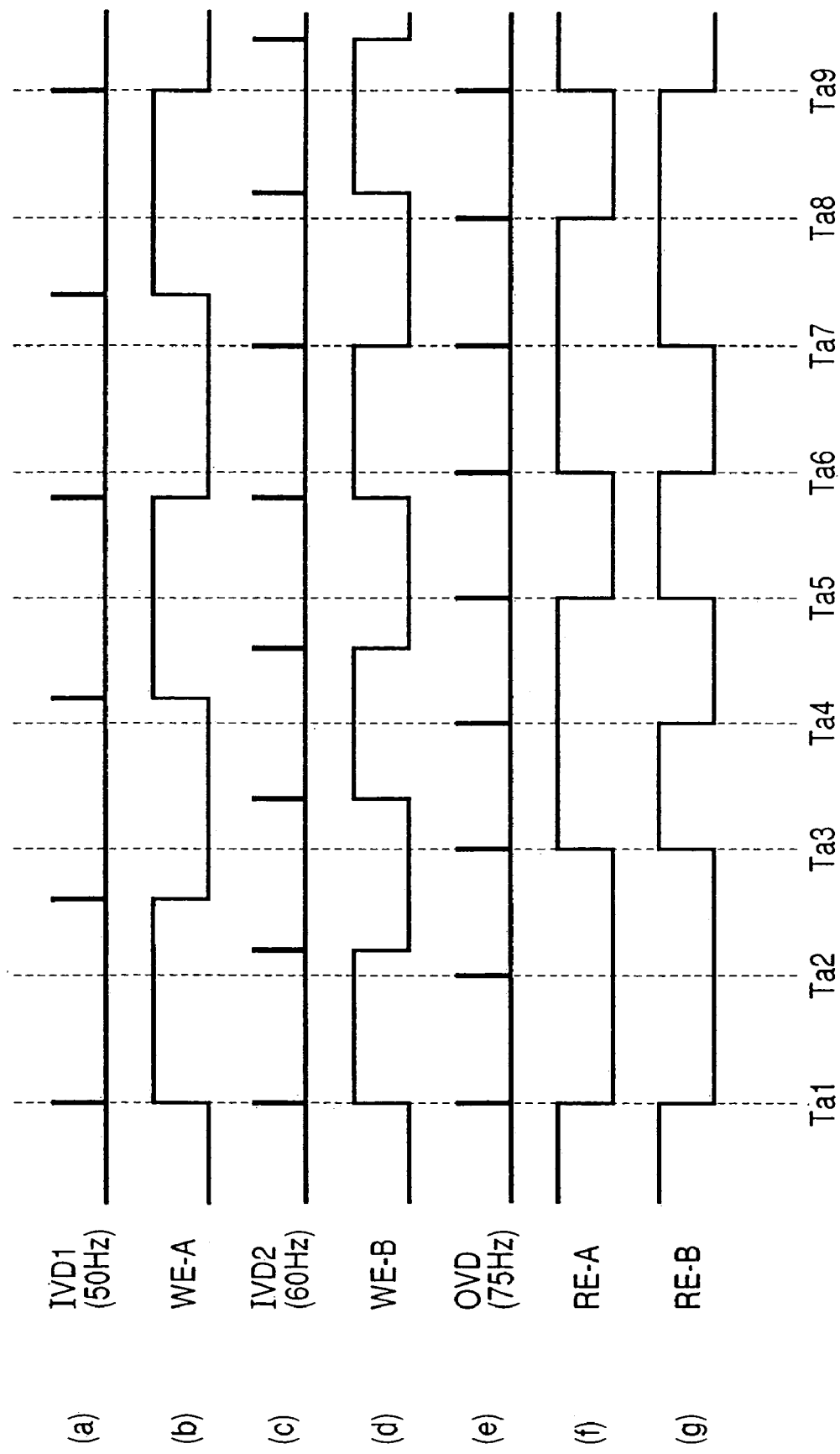
FIG. 23 is a timing chart of assistance in explaining an operation of the third embodiment of the present invention.

First, FIG. 23 shows a state previous to an optimization in this embodiment. For example, it is a state when the power is turned on or a state immediately before signals from the input systems 1 and 2 (PC1 input and PC2 input) are transmitted. Supposing that an operation range is from 50 Hz to 85 Hz for the image display unit of this image display and that a display unit having a vertical frequency of 75 Hz as a recommended operation timing is connected first, OVD is set to 75 Hz as an output. This diagram also shows inputs of a signal having a vertical frequency of 50 Hz as IVD1 and a signal having a vertical frequency of 60 Hz as IVD2 immediately after the connection. In this condition, an optimization is not performed yet in this circuit, but memories are driven according to respective frequencies and a display with double buffering is performed.

Figure 24:
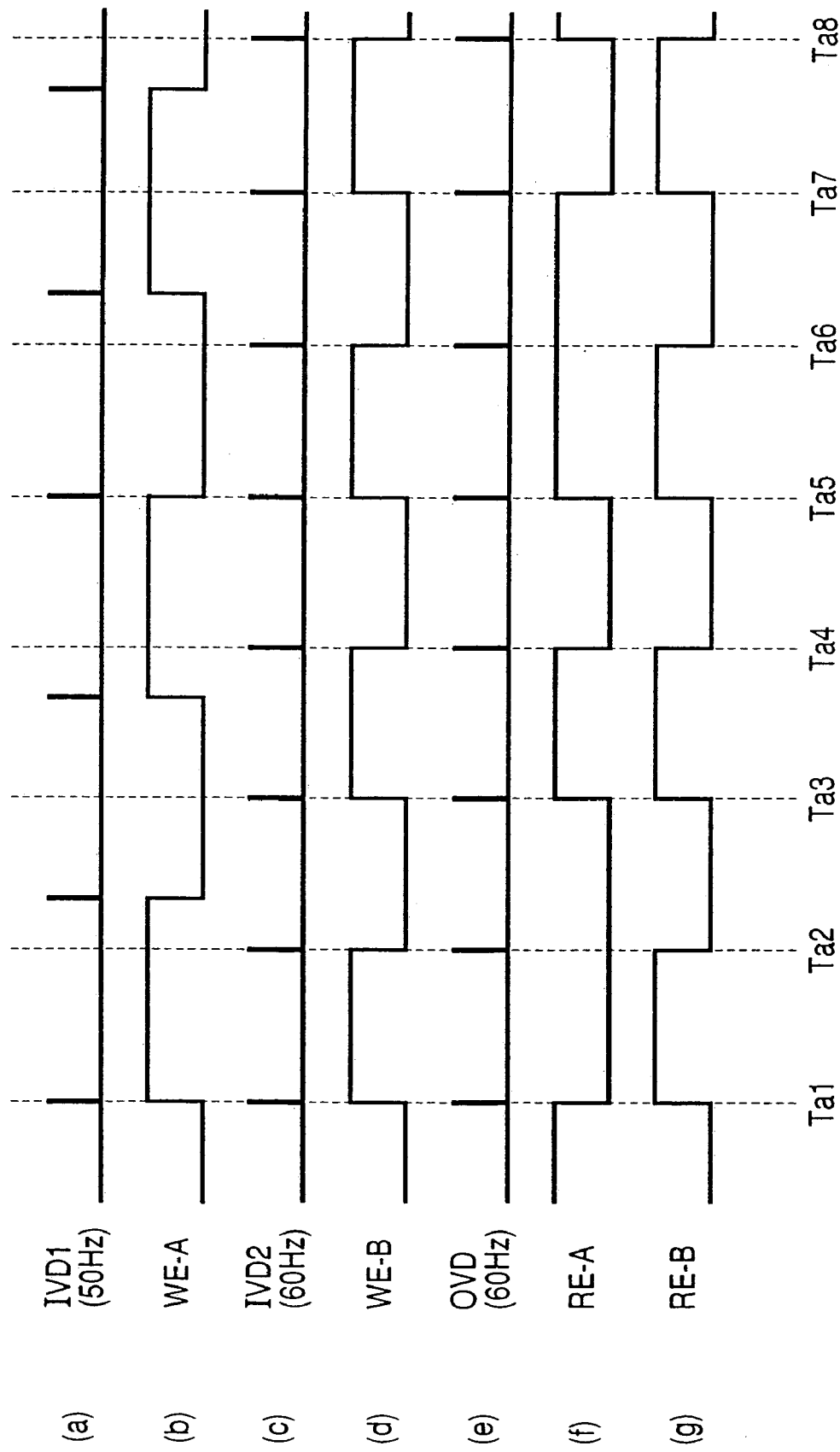
FIG. 24 is a timing chart of assistance in explaining an operation of the third embodiment of the present invention.

Next, FIG. 24 shows an operation as a first step performed when judging that a priority is to be given to a signal having a frequency of 60 Hz of the input system 2 in displaying dynamic images. As a method of selecting the operation, the microcomputer unit judges a synchronization of input signals of the two systems from the synchronizing signals IHD1, IHD2, IVD1, and IVD2 inputted to the microcomputer shown in FIG. 21 and then the operation of (2) in Table 3 is selected by referring to a table in the microcomputer unit as shown in Table 3 for a result of judging resolutions and vertical frequencies. Otherwise, the same operation is selected also when judging that the IVD2 system corresponds to a dynamic image generated by noninterlacing a TV-system interlaced signal such as NTSC for PCs and that the IVD1 system corresponds to a still image in the image comparing unit 10-3 in FIG. 21. For the SW1, SW2-1, and SW2-2 in FIG. 22, IN2-2, IN4-1, and IN5-2 are selected, respectively. By this operation, the output vertical synchronizing signal OVD is synchronized with the IVD2 as shown by (e) in FIG. 24. Accordingly, a dynamic image quality of the IVD2 system is secured and a smooth screen is achieved without a frame duplication nor a frame omission which is a defect of double buffering. In addition, the IVD1 system is converted from 50 Hz to 60 Hz, by which the display unit can avoid a deterioration of an image quality caused by flickering.

Figure 25:
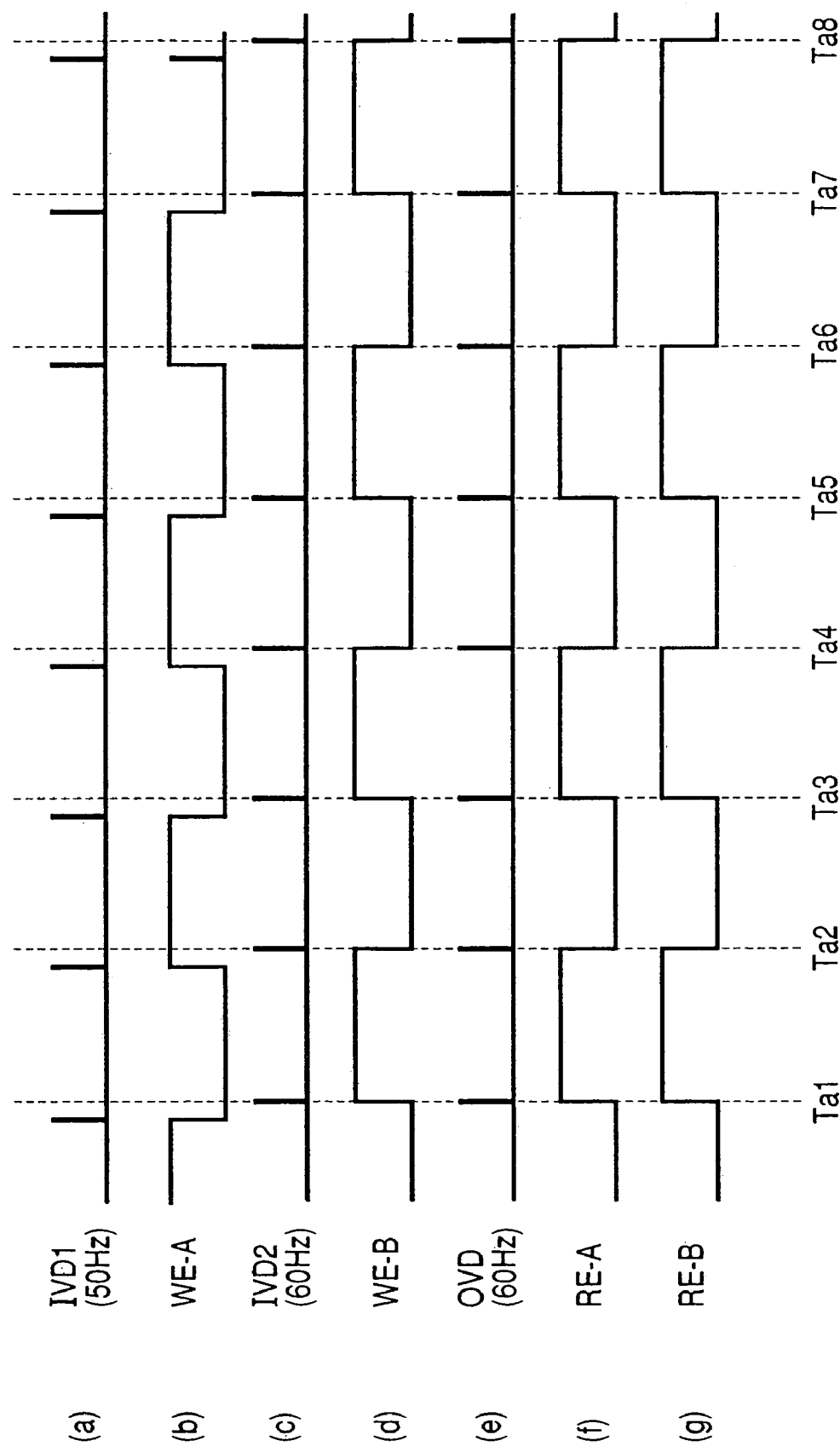
FIG. 25 is a timing chart of assistance in explaining an operation of the third embodiment of the present invention.

Furthermore, FIG. 25 shows an example of an operation as a second step performed when the microcomputer unit judges that a dynamic image quality of the IVD1 input system needs to be improved after detecting with the image comparing unit 10-3 in FIG. 21 that a video source of a dynamic image is sent from the IVD1 input system or when software of the microcomputer unit is designed so as tq set the dynamic image qualities of both systems to optimum conditions at all times in system settings. The microcomputer unit 9 in FIG. 21 requests a change of the vertical frequency from 50 Hz to 60 Hz of the IVD1 input signal source via the DDC1 and the IVD1 input signal source changes the vertical frequency setting to 60 Hz. With this change, the frequency of the IVD1 matches frequencies of the IVD2 and the OVD though a phase of the IVD1 does not match phases of the IVD2 and the OVD, and therefore a smooth screen is achieved without any frame duplication nor frame omission when using double buffering. Accordingly, it is possible to achieve a display in which a dynamic image quality is optimized in both systems.

Figure 26:
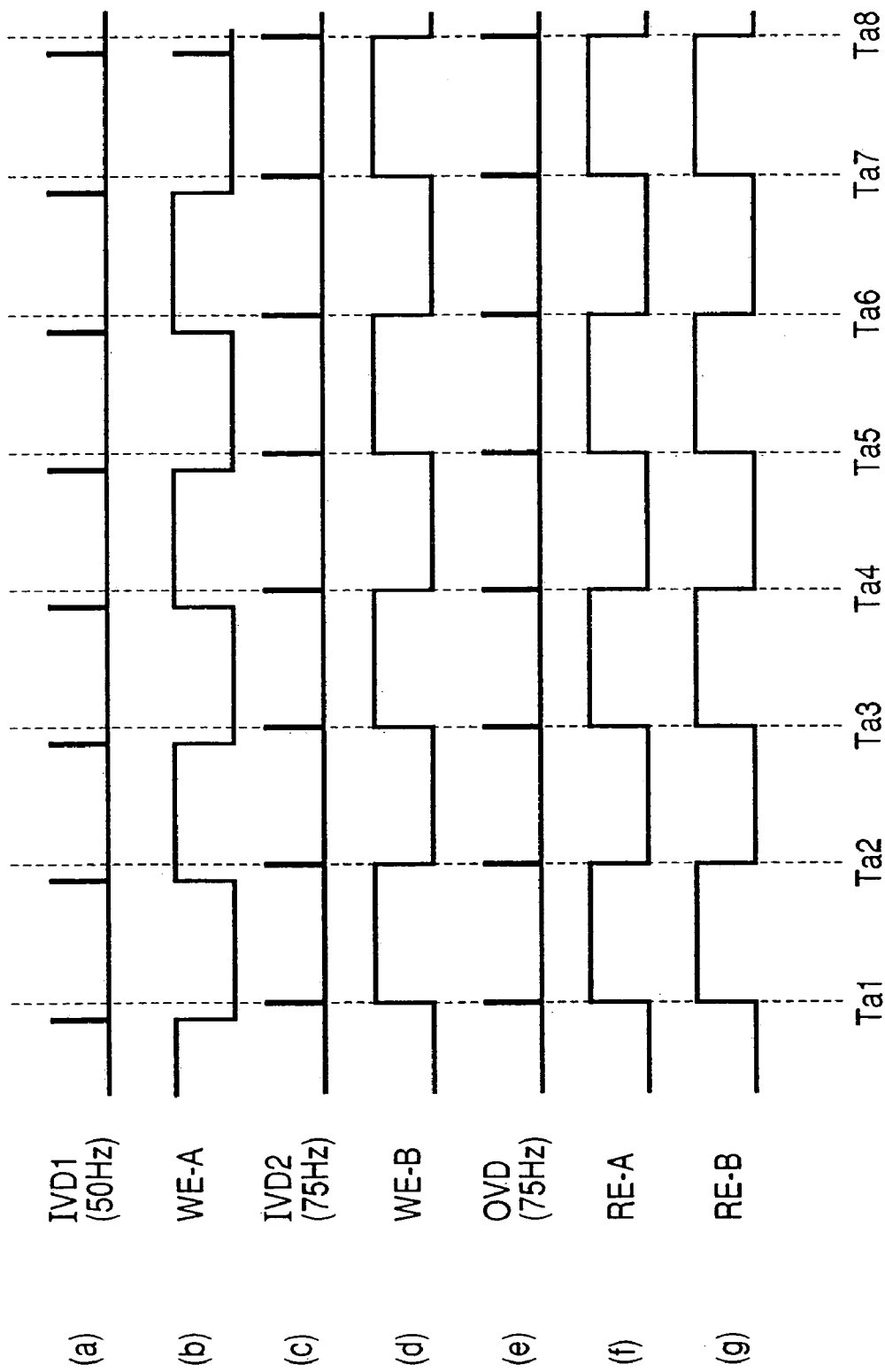
FIG. 26 is a timing chart of assistance in explaining an operation of the third embodiment of the present invention.

Furthermore, FIG. 26 shows an example of an operation as a third step when the image display unit is changed. For example, there is a case that a display whose operation range is variable between 50 Hz and 85 Hz is changed to a display whose operation range is variable between 70 Hz and 100 Hz by replacing a conventional rear-type projection display in a system with a plasma display or by replacing an old-type display with a new-type display.

In this case, the microcomputer unit in FIG. 21 detects that the system does not operate at 60 Hz judging from the operation range of the display connected anew via the DDC3 and then attempts to change an operating frequency of the output system to 70 Hz or higher. In addition, the microcomputer unit determines that a priority should be given particularly to a dynamic image quality of the IVD2 system rather than that of the IVD1 system from information on the DDC and an input image quality. Therefore, the microcomputer unit of this embodiment selects a candidate of a new vertical frequency whose period is close to a period (an update cycle time of a screen) of an original vertical frequency of the OVD2 and whose period ratio to the original one is a ratio of integers out of the range of frequencies which can be outputted (for example, it selects 75 Hz. A period ratio to the original period of 60 Hz is T (60 Hz): T (75 Hz)=5:4) and checks that the IVD2 system can operate at the vertical frequency as the most optimum frequency other than 60 Hz via the DDC communication of the IVD2 system. If the IVD2 system can operate at the frequency, the operating frequency of the IVD2 system is set to the vertical frequency 75 Hz selected anew and the vertical frequency of the image display unit is also set to 75 Hz which is synchronous with the IVD2 vertical synchronizing signal. Again, IN2-2, IN4-1, and IN5-2 are selected for the SW1, SW2-1, and SW2-2 in FIG. 22. By this operation, the output vertical synchronizing signal OVD is synchronized with the IVD2 as shown in FIG. 26. With this synchronization, the operating frequency of the IVD1 system is re-set to 75 Hz via the DDC1 to improve the dynamic image quality. Accordingly, the operations for both of the input system and the output system are changed to ones for 75 Hz.

As described in this embodiment, the frequency band of 60 to 80 Hz is most widely prevailing via the current personal computers (PC), work stations (WS), or digital televisions (DTV) and video sources of dynamic images from televisions are transmitted within this range at 60 Hz in NTSC, thus the range is used very frequently and the highest priority given to dynamic images is very meaningful.

On the other hand, a flickering phenomenon in lower frequencies such as 50 Hz leads to a deterioration of an image quality which causes a screen to be very hard to see regardless of a discrimination between dynamic images and still images, and therefore by using temporarily a method which is good at dynamic images such as double buffering, a prevention of flickering is combined with an improvement of the dynamic image quality.

For signals having higher vertical frequencies such as 100 Hz, taking seriously that an operation speed exceeding 100 MHz is hard on circuits, a method which is good at dynamic images such as double buffering is temporarily adopted to achieve a stable operation at a lower cost together with improving dynamic image qualities. Particularly, a display element such as an LCD or a PDP requires a high voltage of 10 and several volts to tens of volts for a driving voltage, and therefore if a speed per pixel is increased, a video signal system or a driver circuit requires a very high operating band or slew rate. Under the existing conditions, portions which cannot follow the driving at a high speed are divided to a plurality of parts for driving. Further increase of a speed of the output system, however, not only requires an increase of a cost due to changes to high-speed components, a development of new components, and a circuit change such as a change of the number of divisions, but reduces an operation margin of the circuit, thereby causing a trouble for a stable operation. This problem will be particularly serious for driving display elements having pixels several times as many as those under the existing conditions such as SXGA or UXGA. To cope with such an increase of pixels in the future, it is important to combine a reduction of a cost and a stable operation with an improvement of dynamic image qualities.

Furthermore, this invention makes it possible to select which input image has precedence over other inputs images of a plurality of systems to have a match of the vertical synchronization to secure a dynamic image quality since an output can be completely synchronized with only one vertical frequency of an input system among the plurality of systems in optimizing the vertical frequency, by which it is possible to achieve an inexpensive system which can flexibly cope with a change of an input system in which importance is attached to a dynamic image quality among the plurality of systems for some reason of application software or programs.

Further, by requesting a change of an input frequency of an input signal source via the DDC for an input system to which an output is not synchronized for the selected output synchronizing frequency so as to change the input frequency to one equal to the output frequency, the dynamic image qualities of a plurality of input systems are optimized for a display, by which it is possible to provide an inexpensive device which can adequately satisfy dynamic image qualities in a display having a multi-screen which displays images from various dynamic sources such as a digital TV, PC graphic game software, and a digital video.

Still further, even if an applicable operating frequency band is changed due to a change of an image display unit to a different type of a display (for example, a rear-type projection display to a plasma display), an inner output frequency selection range or selection method is changed on the basis of information on characteristics of the image display unit obtained via the DDC or other communications and contents requested of a plurality of input signal systems via the DDC are also changed, by which it is possible to achieve an optimum device which is inexpensive and flexible for a change of a future system change or system expansion and has an optimum dynamic quality.

While there are shown DDCs (DDC1, DDC2) as communication means from a device connected to a plurality of inputs and another DDC (DDC3) as communication means to an output image display in this embodiment, they are just shown as examples since the VESA standard (DDC ver. 3.0 issued on Dec. 15, 1997 at present) is most widely prevailing as means for communicating information of a display to a PC at present, and therefore arbitrary means can be used only if they are means for communicating information between image processing devices such as USB, IEEE 1394, conventional serial communication means, parallel communication means. Particularly the VESA standard has been revised one after another, but it is not assumed that a plurality of host devices (a signal generator or a PC) are connected to a display device as described in the present invention at present and there is no conception of an intervention between addresses. In addition, a communication time is limited to a start of the host (PC) side and therefore it cannot be used for the present invention directly. In this embodiment, as an example of a method of achieving the communication means, there are prepared DDC1, DDC2, and DDC3 of three systems of two-wire serial buses of I2C in the same communication line format as for the DDC and the data format conforms to the standard EDID (EDID ver. 3.0 issued on Nov. 13, 1997 at present) used for the DDC or the like. Accordingly, the DDC information is communicated using the plurality of input devices as hosts and the image processing device in this embodiment as a display. For a display device connected to the image processing device in this embodiment, the image processing device is treated as a host and the display device as a display to communicate the DDC information. An intervention between addresses of the plurality of input devices amd the display device and switching operations of the hosts are not prescribed in the original DDC, and therefore the microcomputer 9 in FIG. 21 in this embodiment controls the operation. In addition, the DDC does not prescribes detection and control operations for which a communication can be made at switching connections of devices as well as at a startup of the host, and therefore the microcomputer 9 in FIG. 21 in this embodiment is used for the operations. As described above, the present invention is achieved. It is the same in other embodiments.

While double buffering is used for frequencies outside the frequently used vertical frequency band used for the synchronization in this embodiment, the double buffering requires double memory regions and also control circuit portions for those and therefore double buffering can be omitted as a function since an increase of the number of input systems increases a cost. As an embodiment of the present invention to provide a product at a reasonable price, it is also possible to synchronize only a particular vertical frequency band to an input vertical frequency, on the other hand to determine frequencies outside the frequency band not to be so frequently used, to switch the operation to a simple asynchronous operation with the dynamic image quality not improved, and to select only a system having precedence for dynamic images among a plurality of input systems so as to secure a dynamic image quality.

In addition, while it is selected whether or not an output system is synchronized with an input system on the basis of a vertical frequency of an input signal in this embodiment, this embodiment of the present invention is characterized by a circuit for selecting an optimum operation mode and image quality characteristics on the basis of operation modes and image quality characteristics of a plurality of input systems, a circuit for determining an operation mode and image quality characteristics of the entire system on the basis of the operation mode and image quality characteristics of the output system including the display unit and operation modes and image quality characteristics of the plurality of input systems, and a circuit for requesting a change of an operation mode or image quality characteristics of an arbitrary input system based on the determination, and therefore the switching can be based on other items of the input signal format, image information sampled from the input image, a content of a input image signal, an operation mode of the system, a screen display proportion or arrangement conditions, user settings, a power saving mode or the like in addition to the vertical frequency of the input signal.

While a vertical frequency is used as an object to be switched focusing on a dynamic image quality in this embodiment, it is also applicable to other items of the input signal format for other image quality characteristics, for example, a resolution, a display position of an image, an image size, a hue, chromaticity, white balance, brightness, contrast, gray-scale level (gamma characteristic), a dynamic range or the like.

In a fourth embodiment, there is shown an example of gray-scale level as one of these conditions.

FOURTH EMBODIMENT

A fourth embodiment will be described below by using the same diagram FIG. 21 as for the third embodiment. A configuration of the components and operations in FIG. 21 are the same as for the third embodiment.

In this embodiment, an image comparing unit 10-3 compares image qualities of respective input systems with each other and a microcomputer outputs information used for controlling image qualities of an output system and the input systems. A computation result of the comparison information obtained from the comparing signals 20-REF-1 and 20-REF-2 sampled for the comparison from the image signals outputted from the input system image processing unit 1 and the input system image processing unit 2 is transmitted to the microcomputer via the microcomputer bus 19-1.

In this embodiment, in comparison with characteristics or conditions of the display unit given via the DDC3 or other communication paths or as the initial information in addition to the comparison of the image quality characteristics of the input systems obtained from the image comparing unit, inner image processing units (an input system image processing unit 1, an input system image processing unit 2 and an output system image processing unit) are controlled and image qualities of input signal sources are controlled via DDC1 and DDC2.

A main adjustment unit of image qualities is located in an output system image processing unit 6 and image quality adjustment units of input image processing units 3-1 and 3-2 exist as auxiliary units. This configuration is applied to prevent an increase of a bit error of an image; a system giving preference to an image quality has a configuration of bypassing the image quality adjustment unit of the input image processing unit and only by using an adjustment unit in an output system its characteristics are converted to ones suitable for the image display unit. For the other system, image qualities of the input image processing units are additionally adjusted so as to have the same image quality as for the system having precedence. Otherwise, for the system which does not have precedence, a request of changing image qualities of input signals is issued to input signal sources via the DDC instead of adjusting the image qualities in the input image processing units, by which the image qualities are adjusted so as to be the same as for the system having precedence.

Accordingly, the image quality of the entire system is optimized according to image quality characteristics of respective input systems and the output display unit when a multi-screen is displayed by synthesizing input images having various image quality characteristics of a plurality of input systems into a single screen.

By using FIGS. 27 to 29, an operation of this embodiment will be described below.

Figure 16:
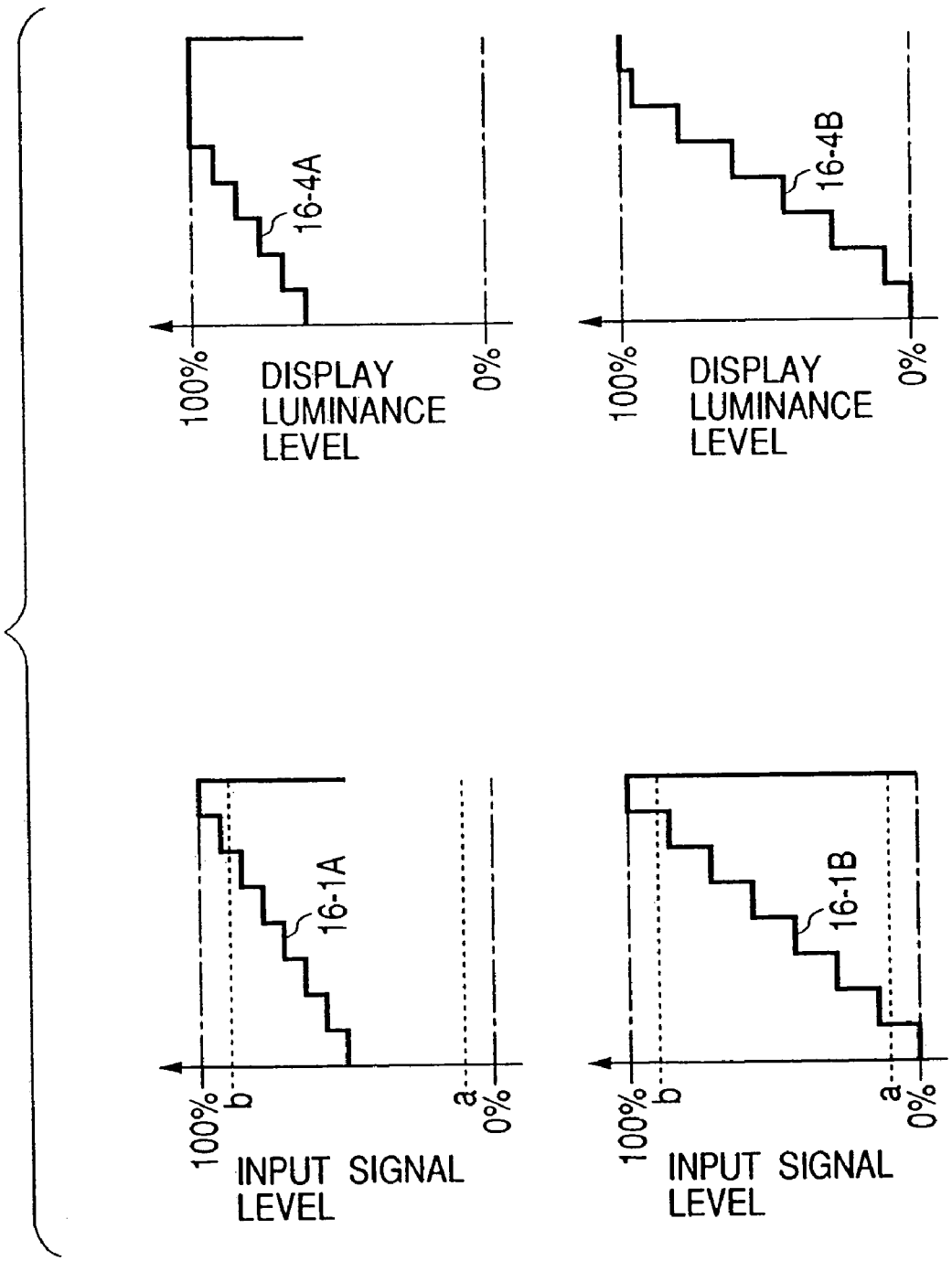
FIG. 16 is a diagram of assistance in explaining a problem related to gray-scale level of an image quality in the second conventional example.
Figure 17:
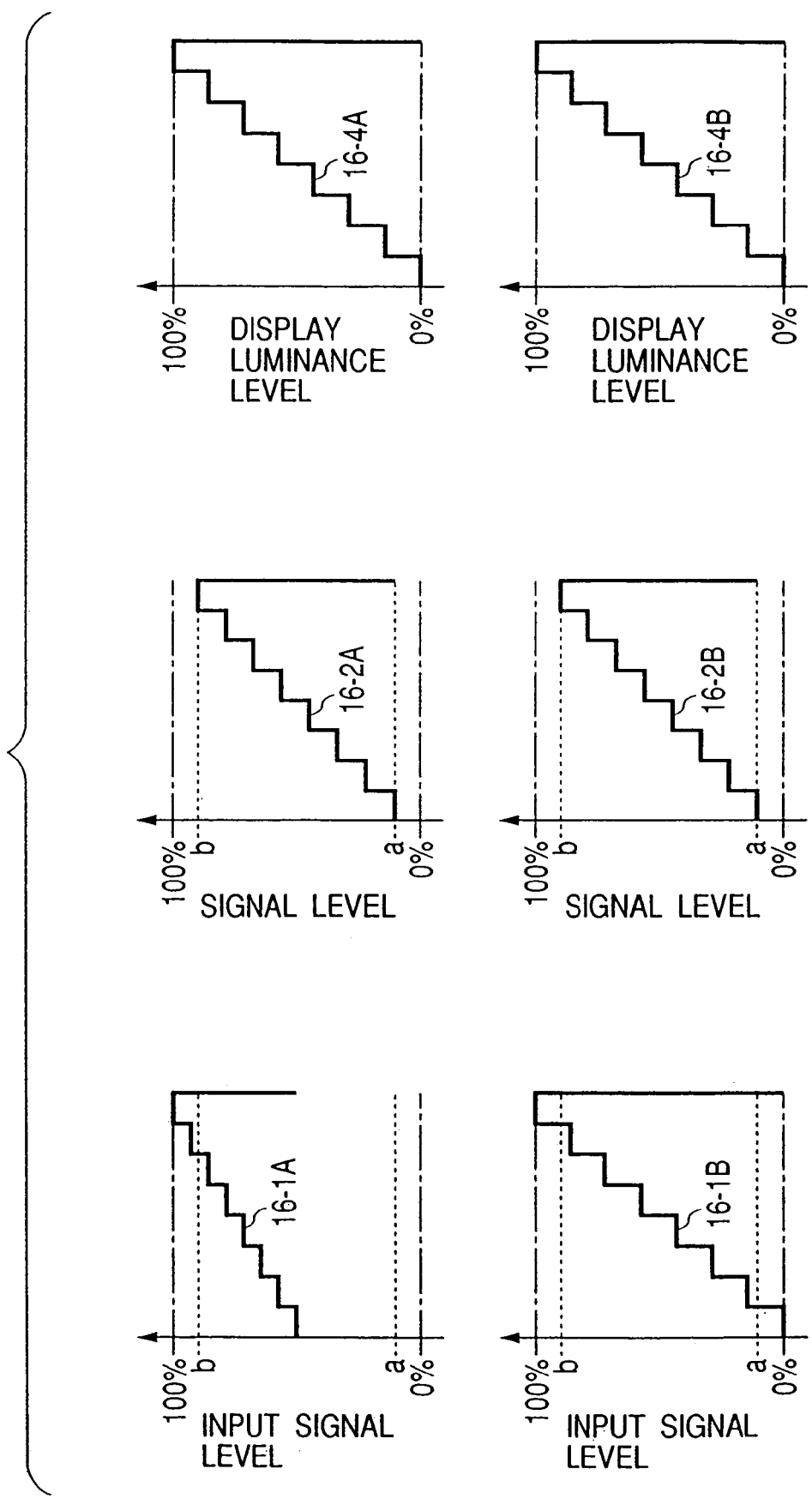
FIG. 17 is a diagram of assistance in explaining a problem related to gray-scale level of an image quality in the second conventional example.
Figure 18:
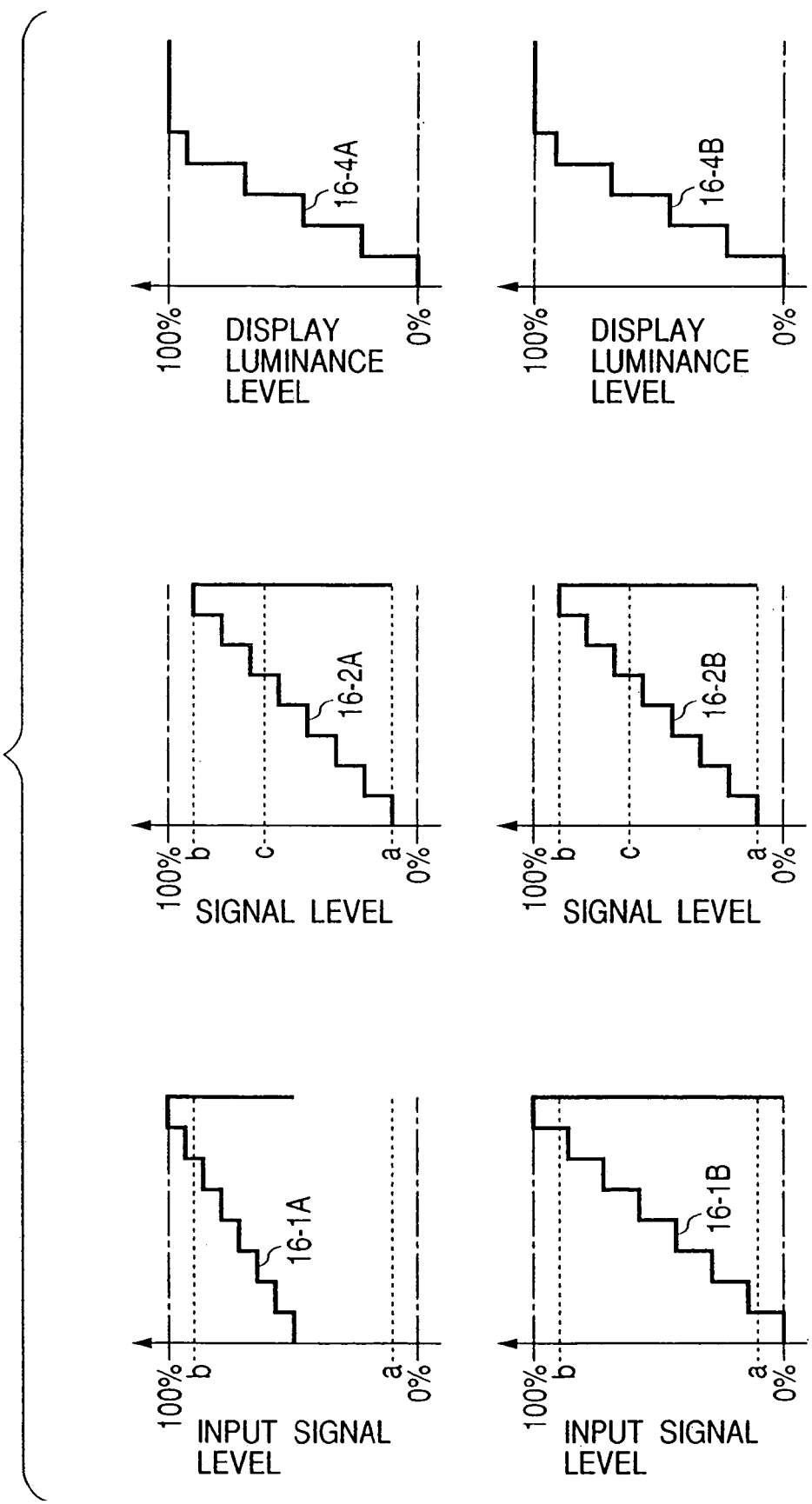
FIG. 18 is a diagram of assistance in explaining a problem related to gray-scale level of an image quality in the second conventional example.
Figure 19:
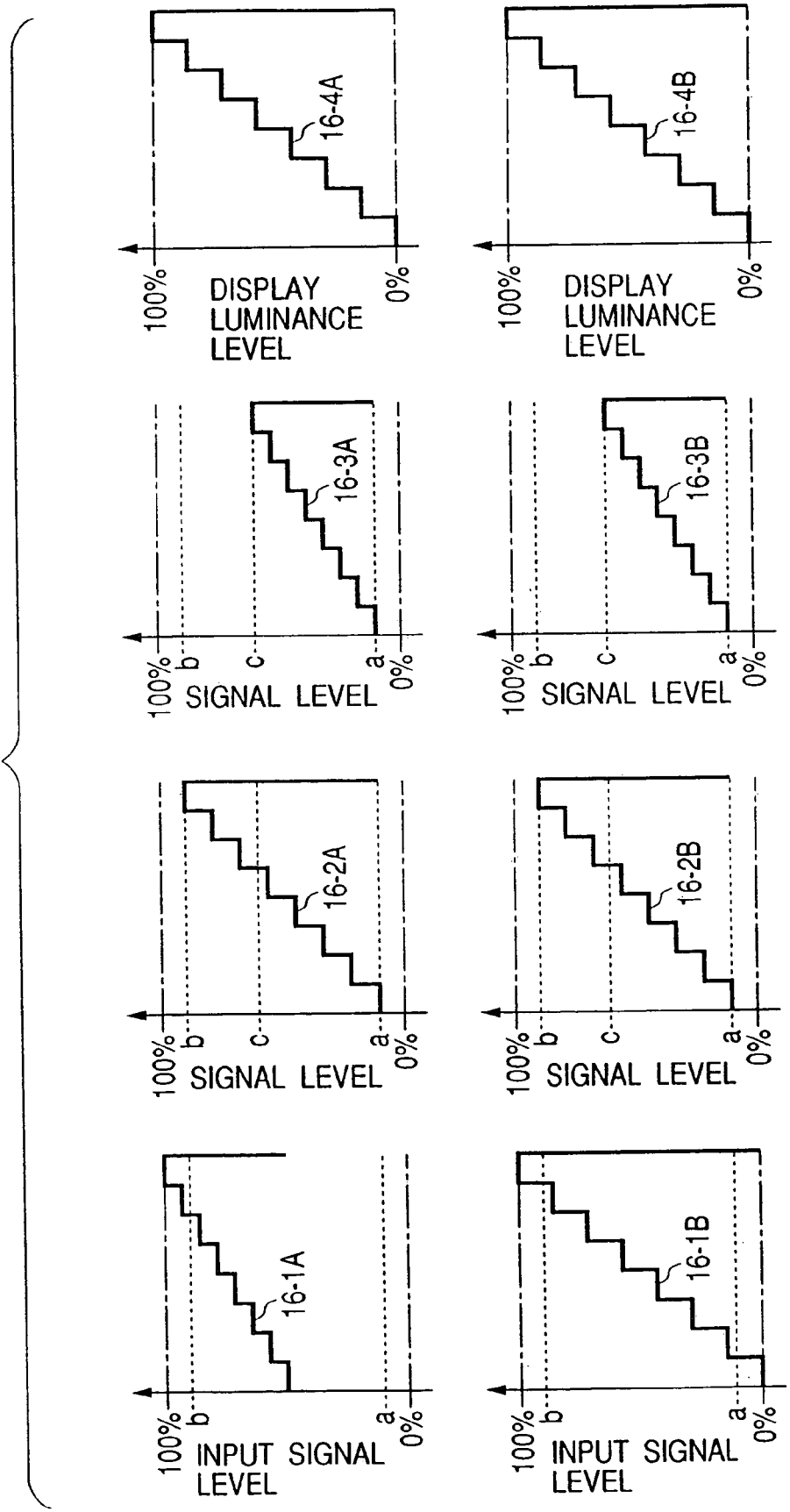
FIG. 19 is a diagram of assistance in explaining a problem related to gray-scale level of an image quality in the second conventional example.
Figure 20:
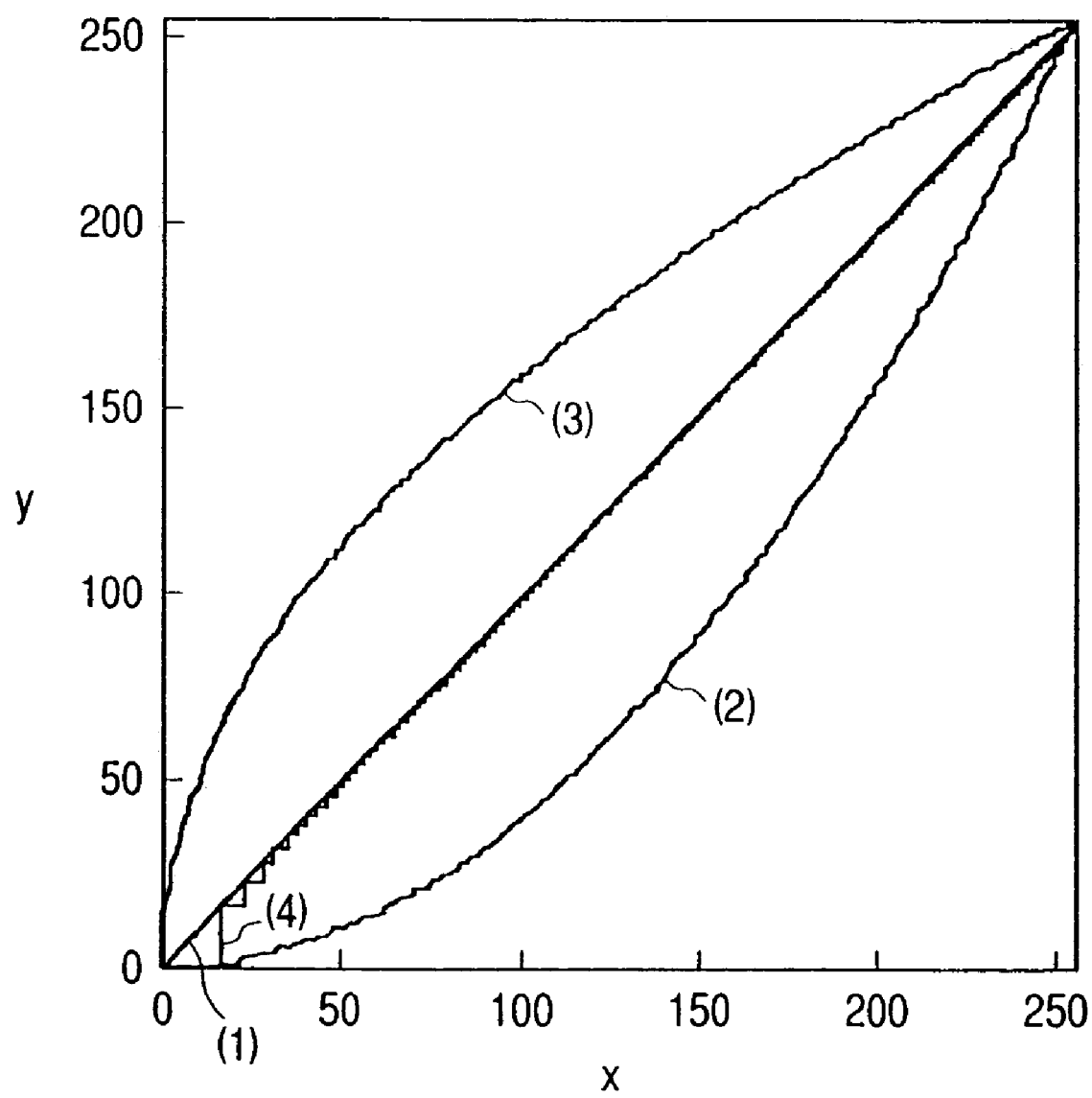
FIG. 20 is a conceptional diagram of assistance in explaining a bit error of gray-scale level in the second conventional example.
Figure 27:
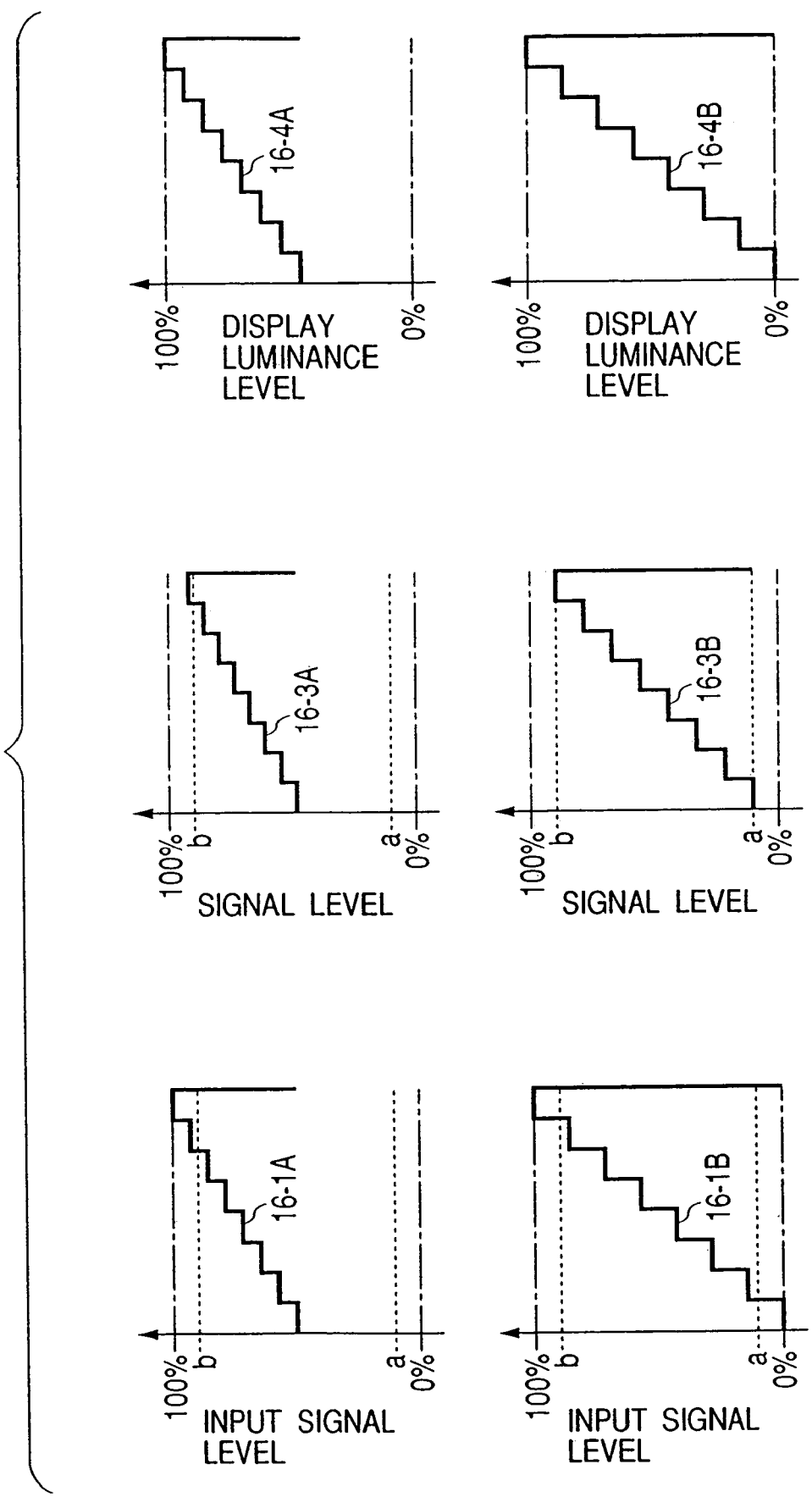
FIG. 27 is a diagram of assistance in explaining an operation for gray-scale level of an image quality of the fourth embodiment of the present invention.

Referring to FIG. 27, there are shown conditions in a first step of optimizing an image quality according to this embodiment. In these conditions, a display characteristic of the display unit is as shown by 15-1 in FIG. 15. In FIG. 27, 16-1A an d16-1B indicate signal levels inputted from two system inputs IDATA1 and IDATA2 and 16-3A and 16-3B indicate signal levels after passing an output image processing unit 6. Further, 16-4A and 16-4B indicate luminance levels of the display unit at this time.

In the first step, the microcomputer unit determines an input system whose image quality has priority over others on the basis of a result of the image comparing unit (10-3) obtained by comparing image quality information (20-REF-1, 20-REF-2) from the input system image processing unit 1 (3-1) and the input system image processing unit 2 (3-2) with each other and of input-output characteristics of the image display unit obtained via the DDC3 or from a table previously stored in a memory attached to the microcomputer unit. In this example, the microcomputer unit determines the input system 2 (IDATA2) should have priority. At this point, unlike the conventional example, characteristics for the display unit of an input signal of the system having the priority are converted not in an input system image quality processing unit but in an output system image quality processing unit at a time. A conversion coefficient is applied to the output system image processing unit by previously synthesizing characteristics of the input system 2 with the characteristics of the output system, by which the number of passing times of digital processing is reduced to half so as to decrease a bit error. The same conversion coefficient with synthesization is also applied to an image of the input system 1 at this time, and therefore an image quality of the input system 1 is not optimized as shown by 16-3A.

Figure 28:
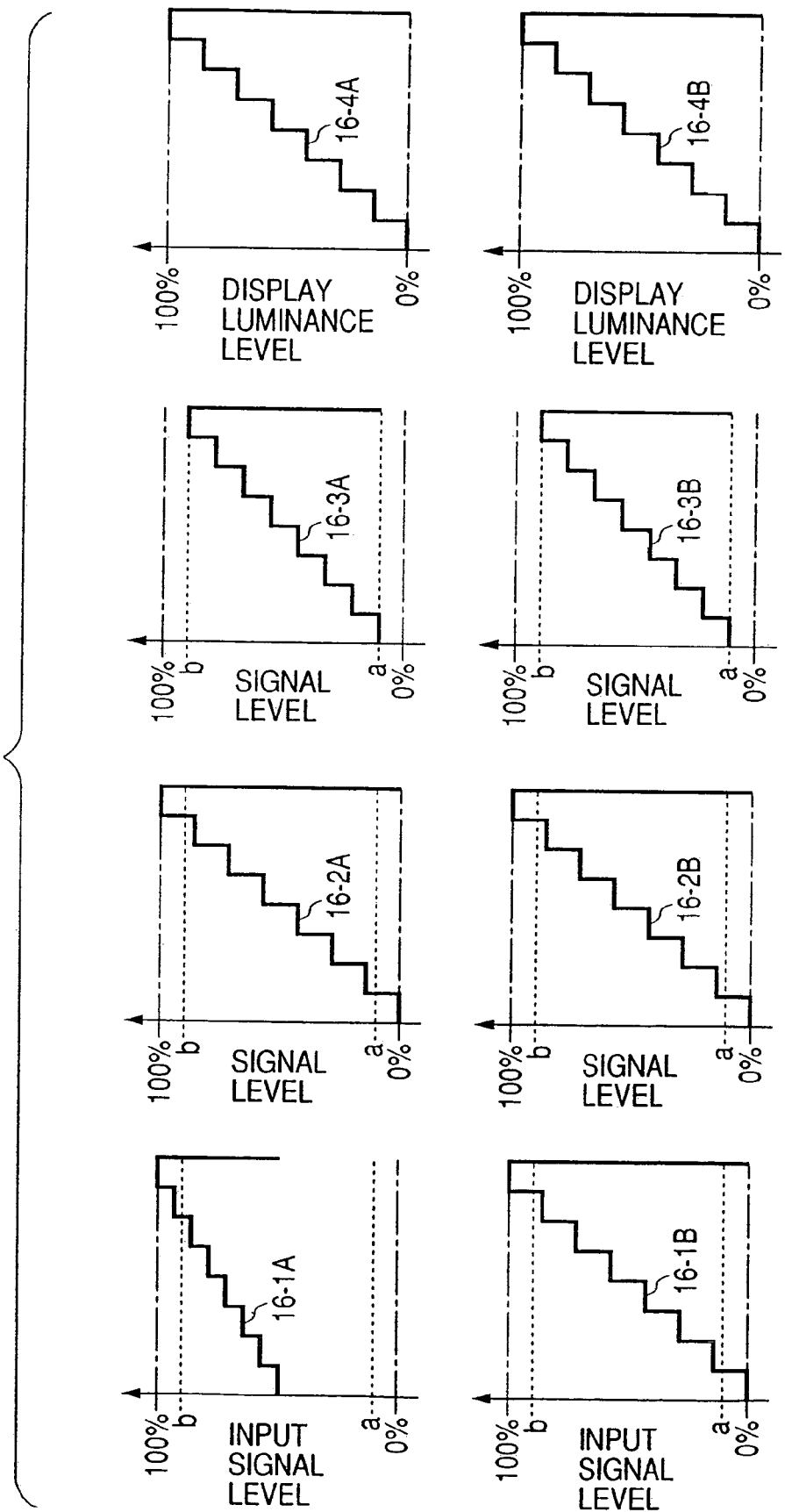
FIG. 28 is a diagram of assistance in explaining an operation for gray-scale level of an image quality of the fourth embodiment of the present invention.

Next, as an operation of a second step, FIG. 28 shows conditions after the microcomputer unit has optimized the image quality of the input 1 system not having priority. In FIG. 28, 16-1A and 16-1B indicate signal levels inputted from two system inputs IDATA1 and IDATA2 and 16-2A and 16-2B indicate signal levels after passing an input system image processing unit 2 (3-2). 16-3A and 16-3B indicate signal levels after passing the output image processing unit 6. Further, 16-4A and 16-4B indicate luminance levels of the display unit at this time.

In the second step, the IDATA1 system is adjusted for the IDATA2 system (16-1B to 16-4B) adjusted in the first step. The conversion characteristics of the output image processing unit 6 are determined with the input 2 (IDATA2) at this time, and therefore a difference of an input correction for the input 1 (IDATA1) for the characteristics is applied to the input image processing unit 1 (3-1). As a result, the signal level 16-2A after passing the input image processing unit 1 (3-1) is almost equal to the signal level 16-2B after passing the input image processing unit (3-2), and an image is output at the signal level 16-3A almost equal to the signal level 16-3B in the output image processing unit and displayed at the luminance level 16-4A almost equal to the luminance level 16-4B.

Although a bit error becomes large for a system having no priority as described above, its characteristics can be adjusted in the same manner as for the system having priority.

Figure 29:
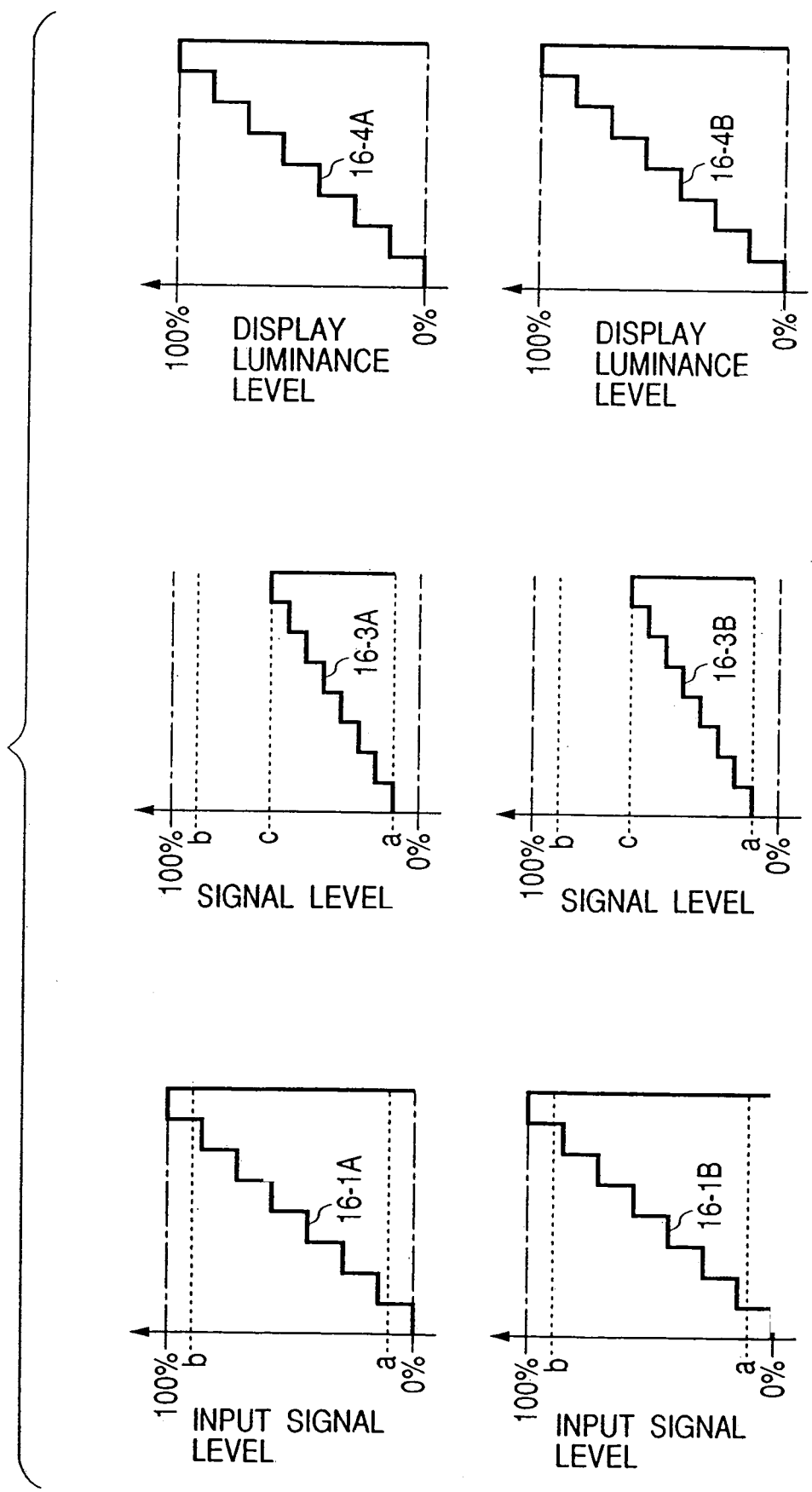
FIG. 29 is a diagram of assistance in explaining an operation for gray-scale level of an image quality of the fourth embodiment of the present invention.

Furthermore, as an operation in a third step, FIG. 29 shows conditions after the microcomputer unit has changed the characteristic of an image display unit 7 to one indicated by 15-2 in FIG. 15. In FIG. 29, 16-1A and 16-1B indicate signal levels inputted from two system inputs IDATA1 and IDATA2 and 16-3A and 16-3B indicate signal levels after passing the output image processing unit 6. Further, 16-4A and 16-4B indicate luminance levels of the display unit at this time.

Together with the change of the image display unit, the microcomputer unit reads again output characteristics of the image display unit after the change obtained via the DDC3 or from the table previously stored in the memory attached to the microcomputer unit. The microcomputer unit determines again an input system whose image quality has priority on the basis of this information and image quality information of respective input systems.

In this example, it is assumed that the input 2 (IDATA2) has been determined to have priority again. The conversion coefficient is applied to the output system image processing unit by synthesizing the characteristics of the input system 2 with the characteristics of a new output system on the microcomputer, and then an image is output at 16-3B. As a result, a luminance level is obtained (16-4B) with the display characteristics of the image display unit optimized. In the third step, further to decrease a bit error of the image quality for the input system 1, a conversion is omitted in the input signal processing unit for the input system 1 as performed in the second step, but a request is made for the input signal source 1 to make its signal amplitude and level match those of the input signal source 2 via the DDC1, so that the characteristics of the input signal of the input system 1 are the same as those of the input signal of the input system 2 in 16-1B as in 16-1A. By matching the signal levels of both of the input systems with each other in the input signal phase, the number of passing times of digital processing is reduced to half in both systems, by which a bit error is decreased.

As set forth hereinabove, after a comparison with characteristics and conditions of the display unit given via the DDC or other communication paths or as the initial information in addition to a comparison of image quality characteristics of input systems obtained from the image comparing unit, the inner image processing units (an input system image processing unit 1, an input system image processing unit 2, and an output system image processing unit) are controlled and an image quality of the input signal source is controlled via the DDC or other communication means, by which a high image quality display is achieved in a system having priority in an inexpensive and simple circuit configuration also in a multi-screen display on which images from a plurality of input signals are displayed on a single screen and it becomes possible to achieve a system satisfying a certain level of image qualities of other systems.

While a DC level and an amplitude of a signal are optimized for an image quality by using a gray scale signal giving an example for simplifying the description in this embodiment, this embodiment is also applicable to a nonlinear correction such as a degamma correction for canceling a gamma correction of correcting characteristics of a display element or for canceling a gamma correction on a video signal for a CRT, actually in the same manner. Additionally in the same manner relating to a discrepancy of white balance caused by differences in characteristics between red, blue, and green and characteristics of colors, a system can be optimized with an application of this embodiment by selecting an input system having priority to match balances of respective colors according to characteristics of an output system and by using auxiliary means for other systems or transmitting control signals to input signal sources therefor so as to satisfy a certain level for adjustment. As causes of uneven characteristics of colors, there are unevenness of gamma characteristics of liquid crystal elements for respective colors as in a three-panel projector having liquid crystal panels for red, blue, and green different from each other, unevenness of characteristics of optical elements for respective colors for separating a color to three primary colors in an optical system, and unevenness of characteristics of light emitting elements such as a back light, an LED, or a lamp and of signal processing systems for respective colors.

Particularly, the unevenness of the signal processing systems is sometimes unexpectedly large also in each signal source or in a processing system before signal data is transmitted to the signal source, and it often makes a color unique to its own device. This unevenness may be a result of an intentional adjustment of a manufacturer in order to make a vivid screen by intensifying a particular color or of an omission of adjustment man-hours in the signal processing systems for respective colors on manufacturing.

Furthermore, the unevenness caused by these intentional adjustment or reduction of man-hours is not limited to colors. Particularly together with a diversification of types of signal sources or transmission forms such as a graphic screen of a PC, a digital television, a TV conference image received via communications, image information received via internet, a graphic image of a TV game, and a digital video camera image received via a USB or an IEEE 1394, these differences in characteristics of devices are being increased. In addition, differences of display operations in resolutions, refresh rates of screens, or the like are diversified. On the other hand, display devices show a tendency to display images from these various input sources on the same screen, and therefore this embodiment will be more effective in this meaning.

While two systems of PCs are connected as a plurality of input signal sources in the third and fourth embodiments, there is described an application between these various devices in a fifth embodiment by giving an example.

FIFTH EMBODIMENT

Figures 30, 30A:
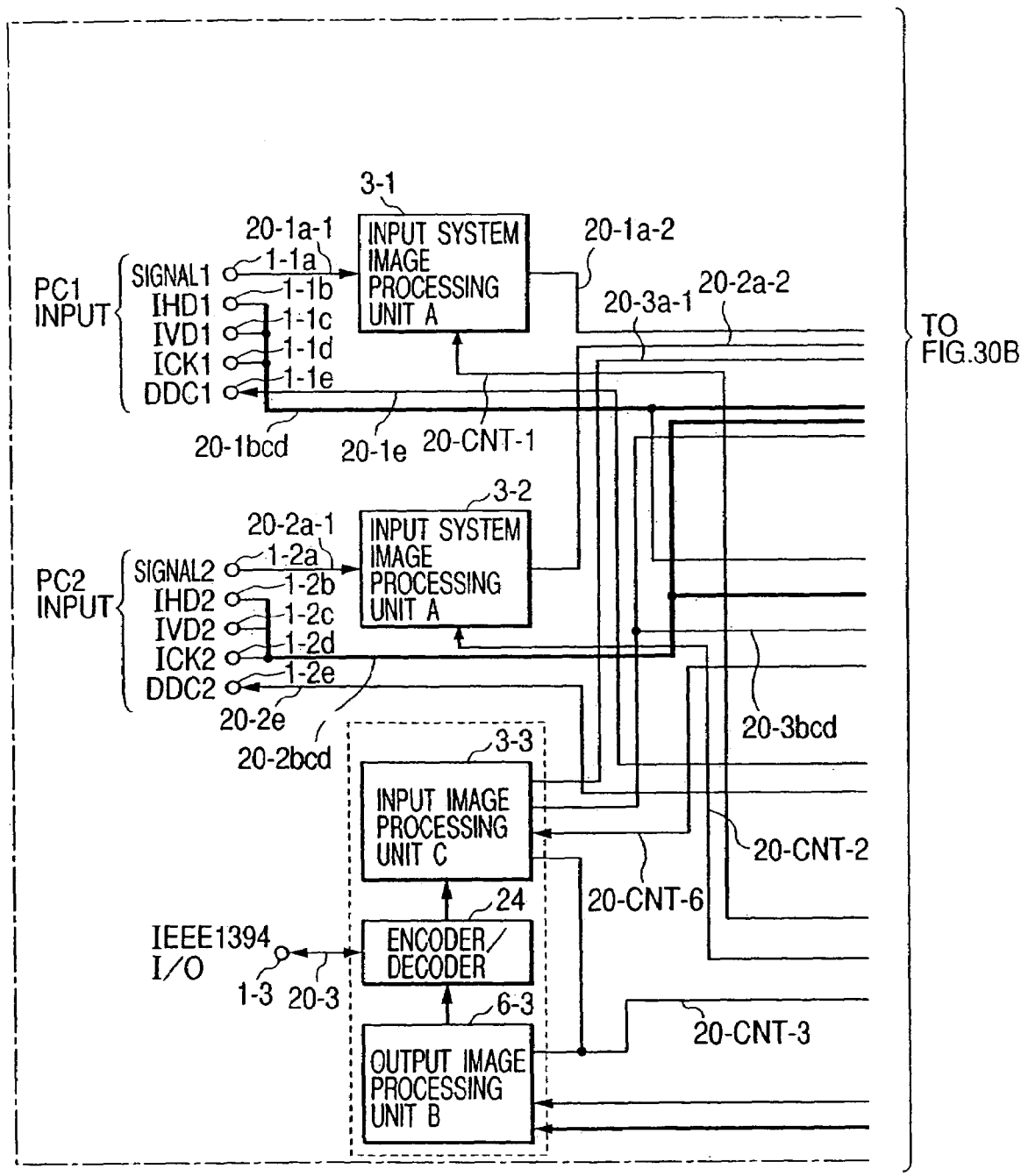
FIG. 30 is comprised of FIG. 30A and FIG. 30B showing block diagrams of an image processing device as a fifth embodiment of the present invention.

As a fifth embodiment, there is shown an example of a system in which an input-output circuit board for image processing is provided on a personal computer to display an image on a display device as an application example between various devices in FIG. 30. Relating to inputs, in addition to digital inputs of two systems for which an image processing circuit board is directly connected to other PCs, this system treats graphic images plotted by an application executed by a CPU in the PC mainframe, image information of a TV conference received via a communication IF, and signals of a DVD, a digital video, or a digital TV inputted via the IEEE 1394. In addition, the system can transmit output signals to an outside digital TV or a video recording server via the IEEE 1394 in addition to a display device directly connected to the image processing circuit board.

Figure 30B:
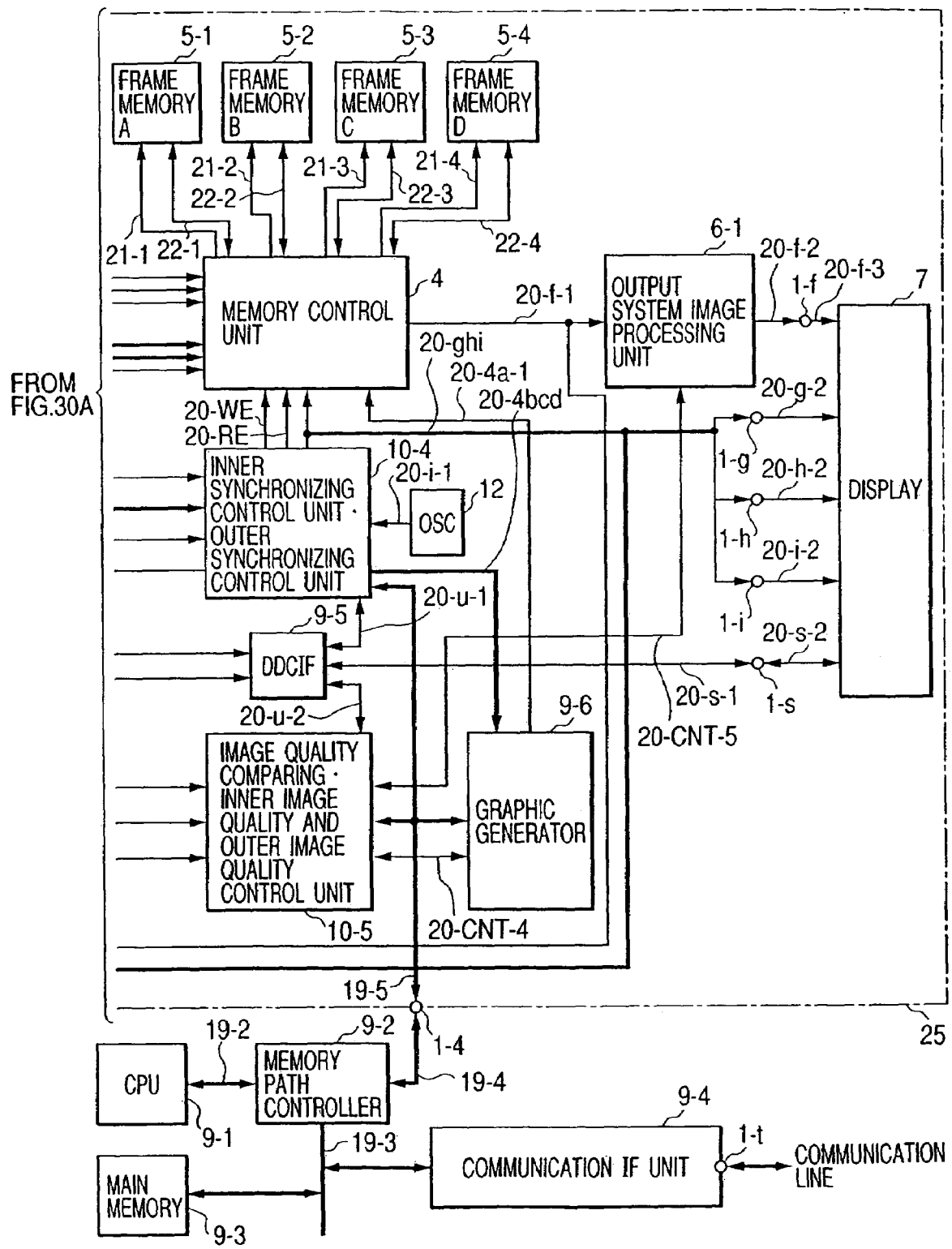
Figure 31A:
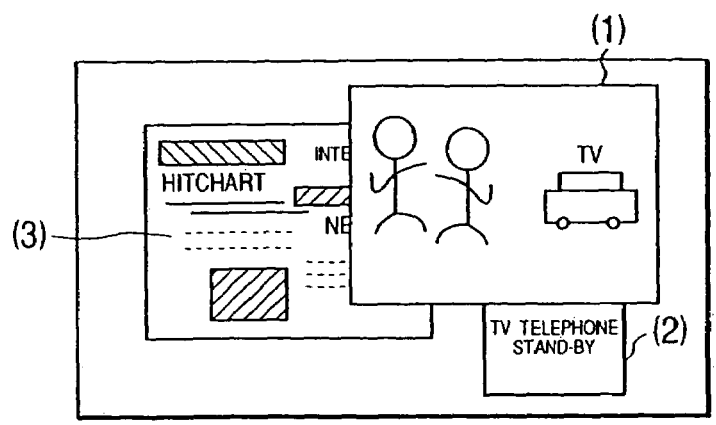
FIGS. 31A, 31B, 31C and 31D are conceptional diagrams of assistance in explaining an operation of the fifth embodiment of the present invention.
Figure 31B:
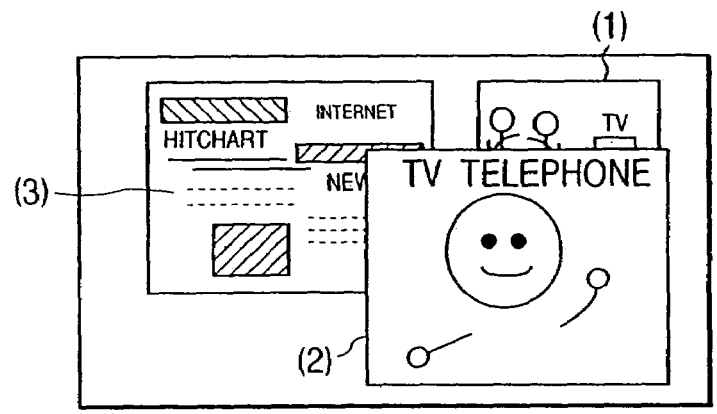
Figure 31C:
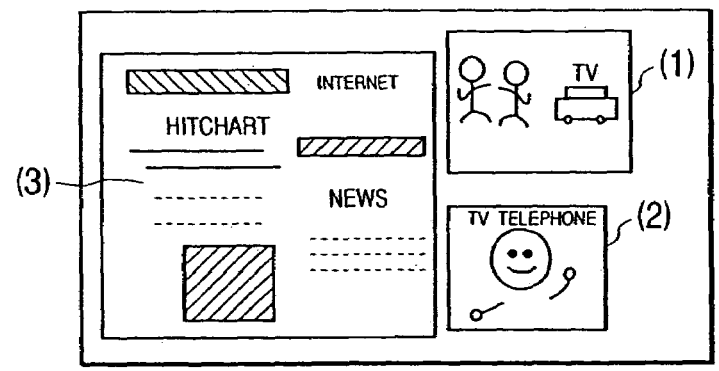
Figure 31D:
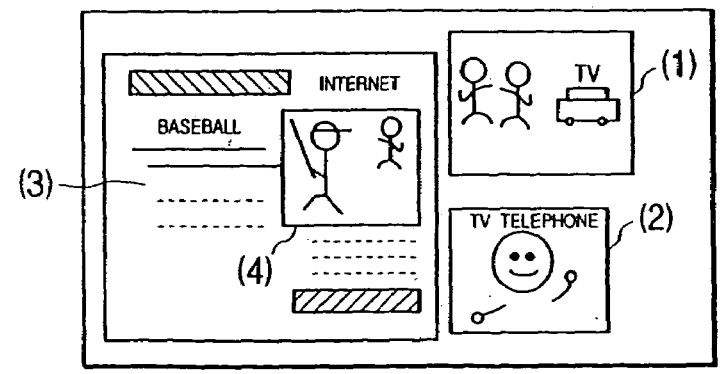

In FIGS. 30A and 30B, there are shown a central processing unit (CPU) 9-1 of a PC, a memory bus controller 9-2 for controlling buses controlled by memories in the vicinity of the CPU called a chip set or peripheral devices, a main memory 9-3 for the PC mainframe, a PC communication interface unit 9-4 connected to an outside communication line via a terminal 1-t, PC system control buses 19-2 and 19-3, and a graphic unit control bus 19-4. An image processing circuit board is located in an area enclosed by a long and short dash line designated by reference numeral 25, which is connected to the PC mainframe by means of the control bus 19-4 via the terminal 1-4.

Furthermore, there are shown an input terminal 1-1a for q-bit digital image signals (IDATA1) as inputs of a first system, an input terminal 1-1b for input horizontal synchronizing signals (IHD1), an input terminal 1-1c for input vertical synchronizing signals (IVD1), an input terminal 1-1d for image signal clocks (ICK1), an input-output terminal 1-1e for DDC signals (DDC1), and data buses 20-1a-1 and 20-1a-2 for transmitting n-bit digital image signals to respective units. 20-1bcd designates IHD1, IVD1, and ICK1 signal lines and 20-1e designates a DDC1 signal line.

There are shown an input terminal 1-2a for n-bit digital image signals (IDATA2) as inputs of the second system, an input terminal 1-2b for input horizontal synchronizing signals (IHD2), an input terminal 1-2c for input vertical synchronizing signals (IVD2), an input terminal 1-2d for image signal clocks (ICK2), an input-output terminal 1-2e for DDC signals (DDC2), and data buses 20-2a-1 and 20-2a-2 for transmitting n-bit digital image signals to respective units. 20-2bcd designates IHD2, IVD2, and ICK2 signal lines and 20-2e designates a DDC2 signal line.

Reference numerals 3-1 and 3-2 designate an image processing unit A of an input system 1 and an image processing unit B of an input system 2, respectively.

An input-output terminal 1-3 for the IEEE 1394 functions as an input of the third system and as an external output. There are shown an IEEE 1394 processing block 23 and an encoder concurrently used as a decoder 24 for converting and inverting an IEEE 1394 signal to a video signal and a synchronizing signal to be treated inside. Further, reference numerals 3-3 and 6-3 designate an image processing unit C for an inputted IEEE 1394 image and an output system image processing unit B before an output as an IEEE 1394 signal, respectively.

There are also shown an IEEE 1394 signal line 20-3, an r-bit digital image signal after conversion 20-3a-1, and signal lines 20-3bcd for synchronizing signals or CLKs regenerated from IEEE 1394 signals.

As inputs of a fourth system, there are graphic information generated by a PC application program from the graphic control bus 19-4 via the terminal 1-4 and image information inputted to the PC via a communication line from an external device. Reference numeral 9-6 designates a graphic generation control unit D for outputting graphic data on the basis of the above information and 20-4a-1 designates signal lines for v-bit graphic data. Reference numeral 20-4bcd designates signal lines for synchronizing signals and clocks for these graphic images. An internal bus 19-5 for controlling graphics is connected to the external bus 19-4, and the entire control of this image processing board is shared between the CPU of the PC mainframe and the graphic generation control unit via this bus.

A memory control unit 4 stores image signals inputted from four systems in total of three input image processing units 3-1, 3-2, and 3-3 and a graphic generation control unit 9-6 in a memory once, synthesizes images in order to output them as a multi-screen display, and then outputs it to an output system image processing unit. Reference numerals 5-1, 5-2, 5-3, and 5-4 designate frame memories (memory A, memory B, memory C, and memory D) corresponding to an input system 1, an input system 2, and input system 3, and a graphic generation unit, respectively. Reference numerals 21-1, 21-2, 21-3, 21-4 designate control buses for the memories A, B, C, and D, respectively, and 22-1, 22-2, 22-3, and 22-4 designate data buses for the memories A, B, C, and D, respectively.

Further 6-1 and 7 designate an output system image processing unit A and an image display unit for an LCD, a plasma display, or a CRT, respectively.

There are shown an image display unit input terminal 1-f for k-bit digital data (ODATA) of the image display unit, an image display unit input terminal 1-g for output horizontal synchronizing signals (OHD), an image display unit input terminal 1-h for output vertical synchronizing signals (OVD), an image display unit input terminal 1-i for output image signal clocks (OCK), signal lines 20-f-1, 20-f-2, and 20-f-3 for k-bit digital image data (ODATA), signal lines 20-g-2, 20-h-2, and 20-i-2 for horizontal synchronizing signals, vertical synchronizing signals, and clocks to an external display, an input-output terminal 1-s for DDC signals (DDC3) to the image display unit, and signal lines 20-s-1 and 20-s-2 for the DDC3.

An oscillating unit 12 generates output system clocks (OCK). Reference numeral 20-i-1 designates an OCK signal line. The oscillating unit 12 comprises a crystal or other oscillator circuit and a phase locked loop (PLL) circuit.

There are also shown internal and external synchronizing control units 10-4, write field control signals 20-WE for the memories A to D, readout field control signals 20-RE for the memories A to D, and signal lines 20-ghi for output system horizontal synchronizing signals, vertical synchronizing signals, and clocks. A control line 20-CNT-6 is used for controlling synchronizing signals and clocks of an IEEE 1394 signal processing block 23.

Reference numeral 10-5 designates an image comparing unit and inner and outer image quality control units. Signal lines 20-CNT-1 and 20-CNT-2 comprise data lines for image sampling information from input system image processing units A and B and control lines for controlling image qualities of the input system image processing units A and B. Signal lines 20-CNT-3 comprise data lines for image sampling information from an input system image processing unit C and an output system image processing unit B in the IEEE 1394 signal processing block 23 and control lines for controlling image qualities of the input system image processing unit C and the output system image processing unit B. Signal lines 20-CNT-4 comprise data lines for image sampling information from the graphic generation control unit and control lines for controlling image qualities of the graphic generation and control unit. Signal lines 20-CNT-5 comprise data, lines for image sampling information from the output system image processing unit A and control lines for controlling image qualities of the output system image processing unit A.

Furthermore, a DDC interface 9-5 provides a linkage between the inner and outer synchronizing control units (10-4) and inner and outer image quality control units (10-5) for transmitting or receiving input DDC signals, DDC1 and DDC2, and a DDC signal of the image display unit, DDC3. Reference characters 20-*u*-1 and 20-*u*-2 designate a data line and a control line between the inner and outer synchronizing control units (10-4) and the DDC interface unit and between the inner and outer image quality control units (10-5) and the DDC interface unit, respectively.

Digital image signals inputted from the input terminal 1-1*a* for an image are subjected to image quality adjustment, image reducing conversion, or other processing in the input system image processing unit A designated by 3-1 before being stored in the memory unit A designated by 5-1 and then transferred to the memory control unit 4. Additionally, a signal for comparing image qualities is transmitted from the input system image processing unit A to the image comparing unit. Further, synchronizing signals and clocks are transmitted to the inner and outer synchronizing control units 10-4.

Digital image signals inputted from the input terminal 1-2*a* for an image are subjected to image quality adjustment, image reducing conversion, or other processing in the input system image processing unit B designated by 3-2 before being stored in the memory unit B designated by 5-2 and then transferred to the memory control unit 4. Additionally, a signal for comparing image qualities is transmitted from the input system image processing unit B to the image comparing unit. Further, synchronizing signals and clocks are transmitted to the inner and outer synchronizing control units 10-4.

IEEE 1394 signals inputted from the IEEE 1394 input-output terminal 1-3 are converted to image signals and synchronizing signals which can be treated inside. They are subjected to image quality adjustment, image reducing conversion, or other processing in the input system image processing unit C designated by 3-3 before being stored in the memory unit C designated by 5-3 and then transferred to the memory control unit 4. Additionally, a signal for comparing image qualities is transmitted from the input system image processing unit C to the image comparing unit.

Furthermore, if the signals are externally output as an IEEE 1394 signals, image information in the output image processing unit B is also sent out to the image comparing unit. The synchronizing signals and clocks are transmitted to the inner and outer synchronizing control units 10-4.

The graphic generation and control unit 9-6 receives inputs of the synchronizing signals and clocks generated by the inner and outer synchronizing control units (10-4) according to specifications of application software or graphic driver software, generates graphic signals, and transfers them to the memory control unit 4 so as to be stored in the memory unit D designated by 5-4. At this time, the image qualities are controlled by the inner and outer image quality control unit (10-5).

In the memory control unit, signals are read out from memories A to D on the basis of the output system synchronizing signals and clocks generated by the inner and outer synchronizing control units (10-4) and then the are synthesized. At this time, the image information in the output system image processing unit A is also sent out to the image comparing unit (10-5).

In this embodiment, all of the memory units A to D secure their memory regions which can be used for double buffering, so as to select one of the write and readout memory regions switching between them via control lines (20-WE, 20-RE) for memory write signals and readout signals in the synchronizing control unit.

Furthermore, image data of the four systems are read out from the memory units at a timing appropriately for a predetermined image size and a relationship of a display position and synchronously with the output system clock OCK, the horizontal synchronizing signal OHD, and the vertical synchronizing signal OVD from the inner and outer synchronizing control units, and then the data is transferred to the output system image unit 6-1.

In the image processing unit 6-1, the image quality is adjusted and the image is converted with enlargement or others. Finally, the image data, the synchronizing signals, and the clock are transmitted to the image display unit 7 for displaying the image.

Also in this embodiment, the operation of the entire system can be optimized by selecting an input system in which priority is given to dynamic images in the same manner as fro the third embodiment in the inner and outer synchronizing control units 10-4. The inner and outer synchronizing control units receives inputs of synchronizing signals and clocks of the input system 1, the input system 2, and the input system 3. The DDC interface unit is connected to the DDCs of the input system 1, the input system 2 and image display unit. Further, contents of requests for image display operations from the application software executed by the graphic generation control unit or communications via the internal bus 19-5. Furthermore, image characteristics information are obtained in the image sampling information of the input systems 1 to 3 from the image quality comparing unit 10-5. On the basis of the above information, the inner and outer synchronizing control units generates memory control signals, output system synchronizing signals, and clocks so as to achieve an output system operation appropriate for a dynamic image of the input system which should have priority judging operation timings of the input four systems, dynamic image quality characteristics of the image, and operation characteristics of the image display unit. Synchronizing signals and clocks for graphic generation display unit are transmitted at timings synchronous with an output. If operations need to be optimized for the input systems 1 and 2, a request for changing operations of the input signal sources is issued to the input systems 1 and 2 via communication means such as the DDC. For the input system 3, a request signal is converted to an IEEE 1394 signal in the encoder and decoder unit 24 via the control line 20-CNT-6 and this signal is used to control a device of the signal source via the IEEE 1394, by which the operation of the input signal source is changed.

Also in this embodiment, the image quality of the entire system can be optimized by selecting an input system in which priority is given to the image quality in the same manner as for the fourth embodiment in the inner and outer image quality control units 10-5. The inner and outer image quality control units receives inputs of image information sampled from the input system image processing units A to C and inputs of image information sampled from the graphic generation and control unit. Additionally, it receives inputs of image sampling information from the output system image processing unit A and display characteristics obtained via the DDC interface from the image display unit 7. Further, it receives inputs of image sampling information from the output system image processing unit B and display characteristics of another display connected with the IEEE 1394 obtained via the IEEE 1394. On the basis of the above information, the inner and outer image quality control unit controls the output system image processing unit A or the output system image processing unit B so as to achieve image quality characteristics appropriate for the input system which should have priority judging the image quality characteristics of the input four systems, image quality display characteristics of the image display unit 7, and image quality display characteristics of another display connected via the, IEEE 1394. If the image qualities need to be optimized for other input systems, image qualities are adjusted by image processing units of the input systems. Otherwise, for the input systems 1 and 2, a request of changing the image qualities is issued to the input signal sources via communication means such as the DDC. For the input system 3, a request signal is converted to an IEEE 1394 signal by the encoder and decoder unit 24 through the control line 20-CNT-6 and this signal is used to control a device of the signal source via the IEEE 1394, by which the image quality of the signal from the input signal source is changed.

While the entire system is optimized by selecting the input system having priority in this embodiment, it is apparent that the judgment for the optimization may be executed by software such as application software or graphic control driver software in the graphic generation control unit 9-6 or the CPU 9-1 as well as by hardware such as blocks of the inner and outer synchronizing control units 10-4, the inner and outer image quality control units 10-5.

Accordingly, when input images having various formats and image quality characteristics of a plurality of input systems are synthesized to a single screen for a multi-screen display, an operation timing and an image quality of the entire system are optimized according to image qualities of input systems and the output display unit and dynamic image characteristics.

While a matching among input systems is considered in this embodiment, actually signals from signal sources are not always outputs from a single kind of signal sources. For example, the IEEE 1394 is connected to a plurality of devices such as a DVD, a digital video, direct broadcasting by satellite, a cable TV, and a set-top box for ground-wave broadcasting or the like. This embodiment is applicable with a plurality of image information mixed in an input considered as an input from an input signal source, and therefore the entire system can be optimized in the dynamic image quality and the image quality characteristics by selecting a signal having priority out of signals from the plurality of devices inputted from the IEEE 1394 terminals or the like and signals of other input systems being treated as equals.

The input image having priority is selected not only according to image sampling information or an image signal format, but according to a use or type of the input image or arrangement conditions of respective images on the display screen with an automatic setting or a user setting. For example, in this embodiment, there is shown a screen on which respective input video signals are synthesized for a display as shown in FIG. 31A to FIG. 31D and Table 4.

TABLE 4

Input system having the highest priority of operation to arrangement conditions (Example)

| | | Input systems displaying concurrently | | |
|---|---|---|---|---|
| | | (1) TV screen | (2) TV phone | (3) Internet screen |
| Input system having the highest priority for arrangement | (a) TV program | ○ | | |
| | (b) TV phone | | ○ | |
| | (c) Internet still image | ○ | | |
| | (d) Internet dynamic image | | | ○ |

In columns in Table 4, there are shown uses or types of signals from respective signal input sources. This table lists examples of inputs of (1) a digital TV signal via the IEEE 1394, (2) a TV phone via the communication IF, and (3) an internet image from an external PC input. In the rows in Table 4, there are shown images selected by an automatic setting or by arrangement conditions such as, for example, an arrangement on the front of the screen as the most noticeable display according to uses of users viewing the display. Items (a) to (d) in Table 4 correspond to FIG. 31A to FIG. 31D. Mark ○ indicates an input signal source preferentially selected by the circuit in this embodiment according to uses or types of signals of the input source and arrangement conditions thereof.

In FIG. 31A to FIG. 31D and Table 4, a digital TV screen is arranged first on the front of the display screen in (a). In this condition, besides an internet screen is displayed as a subscreen on the image display unit, though it is not the most noticeable display and a still image is mainly displayed. While a TV phone image is also inputted, it is not in a reception condition. Therefore, the synchronizing control unit and the image quality control unit select signals for the digital TV as an input system having priority to optimize the system operation.

A TV phone screen is arranged on the front of the display screen in (b). In this condition, besides an internet screen is displayed as a subscreen on the image display unit, though it is not the most noticeable display and a still image is mainly displayed. While an image of the digital TV screen is also inputted, it is only a small display currently. Therefore, the synchronizing control unit and the image quality control unit select signals for the TV phone screen as an input system having priority to optimize the system operation.

An internet screen is arranged on the front of the display screen in (c). In this condition, a digital TV screen is displayed as a subscreen on the image display unit besides the internet screen. While a TV phone screen is also inputted, it is only a small display currently. Therefore, the synchronizing control unit and the image quality control unit select signals for the digital TV screen as an input system having priority to optimize the system operation. It is because it is determined that the digital TV should have priority for the input since the internet screen displays mainly a still image though the internet screen is arranged on the front of the screen as the arrangement condition.

On the other hand, an internet screen is also arranged on the front of the display screen in (d), and besides a digital TV screen and a TV phone screen are also inputted. This display screen differs from the display screen (c) in that a video image of a dynamic image information distributed on the internet screen is displayed on a small window (4). Therefore, the synchronizing control unit and the image quality control unit select signals for the internet screen as an input system having priority to optimize the system operation. It is because it is determined that the internet screen has priority over the digital TV screen since the internet screen is arranged on the front of the entire screen as arrangement conditions and also it has a dynamic image as a main constituent.

In this manner, the system operation is optimized for a signal source having priority according to arrangement conditions depending upon a subject view selected by a user and its content of the signals. In addition, a user can preserve setting conditions in these input signals and arrangement conditions in the system memory unit in FIGS. 30A and 30B, by which an optimum relationship between his or her various types of video equipment and the image display unit can be stored in the image processing device in this embodiment.

As set forth hereinabove, according to a first aspect of the present invention, there is provided a simple and inexpensive image processing device which performs an operation having no problem on dynamic images particularly in a frequently-used vertical frequency band in a configuration of the entire system which is good at dynamic images by selecting whether or not an output system is synchronized to a vertical synchronizing signal of an input system with enabling switching therebetween according to a format of an input signal such as a vertical frequency and further performs a stable operation in other vertical frequency bands by achieving a configuration which is good at dynamic images temporarily and solving problems on image qualities with securing an operation margin. For signal processing uses requiring pixels several times as many as those under the existing conditions such as UXGA in the future, it becomes possible to achieve a circuit easily which is inexpensive and good at dynamic images in the same configuration. In addition, also in a system in which input signals are mixed having a plurality of different frequencies, an output system can be selected to be synchronous or asynchronous to a vertical synchronizing signal of a plurality of input systems and a vertical frequency of an arbitrary input signal source can be set by using the result, by which the output system can be operated with a clock of a system and a synchronizing relationship between the plurality of input systems and the output is optimized, by which the entire system can be configured as a circuit good at dynamic images and inexpensive.

According to second and third aspects of the present invention, there is provided an image processing device for a multi-screen display for displaying input images from input signal sources on an identical screen, wherein an input signal having priority is selected by comparing input signal formats or characteristics and display contents of input systems with characteristics of an image display unit to set an operation mode and image quality characteristics of the image display unit. In addition, for input systems other than the preferential system, operations and image qualities are readjusted to those suitable for the applied operation mode and image characteristics of the image display unit. Otherwise, for input signal sources, a request is outputted to the input signal sources so as to change settings of the operations and image qualities suitable for the applied operation mode and image quality characteristics of the image display unit via communication means such as the DDC or the IEEE 1394. Accordingly, it becomes possible to achieve an inexpensive image processing device with the flexibly optimized dynamic image quality and image quality characteristics also for a plurality of input signals.

Furthermore, the optimization is achieved for a change of an image display device or changes of its characteristics, taking into consideration characteristics of input signals.

Specifically, in a configuration in which it is possible to select whether or not an output system is synchronized to a vertical synchronizing signal of each input system, an input system whose dynamic image quality has priority is selected according to input signal formats such as a vertical frequency and contents of input signal motion components and the output system is synchronized to the vertical synchronizing signal, by which the dynamic image quality of the preferential system is optimized. Also for other input systems, operation modes are adjusted to those for double buffering or the like in the selected operation modes or a request is outputted to the input signal sources so as to change settings of the operations and image qualities suitable for the applied operation mode and image characteristics of the image display unit via communication means such as the DDC. Accordingly, it becomes possible to achieve a simple and inexpensive circuit in a configuration of the entire system which is good at dynamic images with an optimized synchronizing relationship between a plurality of input systems and an output while an output system is operated with a clock of a single system.

Furthermore, an input system whose display image quality has priority is selected according to input signal formats, image quality characteristics, and display contents, and image quality characteristics of the preferential input system are synthesized with image quality characteristics of the output system so as to be applied to the output image adjustment unit, thereby achieving an image quality having a small bit error for the preferential system. In addition, for other input systems, an auxiliary adjustment is performed in the input image adjustment unit for the preset output image adjustment or a request is outputted to the input signal sources so as to change settings of the image quality adjustment suitable for the applied output image adjustment of the image display unit via communication means such as the DDC. Accordingly, it becomes possible to achieve a simple and inexpensive circuit which unifies the image quality of the entire system by optimizing an image quality relationship between image quality differences among a plurality of input systems and an image quality of an output system.

What is claimed is:

1. An image processing device comprising:
   a signal input unit for inputting a plurality of video signals through a plurality of communication units from a plurality of systems;
   an input system including image processing units for adjusting image qualities of the plurality of the systems;
   a memory unit for storing the plurality of video signals;
   a memory control unit for synthesizing the plurality of video signals stored in the memory unit to produce a synthesized signal;
   an output system including an image processing unit for adjusting an image quality of the synthesized signal and outputting an adjusted synthesized signal;
   an image quality control unit for controlling the image processing units of the input system and the image processing unit of the output system to output an image display signal;

a first request unit for outputting a request for setting or re-setting inputted image signals to signal sources, which input signals to the image processing units of the input system; and a second request unit for outputting a request, to a signal source that has not been selected, for changing characteristics of an inputted image to a correction characteristic synthesized with a correction characteristic for a display characteristic of an image display unit connected to the image quality control unit selected from correction characteristics for inputted images of the plurality of systems, wherein the image quality control unit selects one of the correction characteristics for the inputted images of the plurality of systems and converts it to a correction characteristic synthesized with a correction characteristic for a display characteristic of an image display unit for batch-processing in the output system.

2. An image processing device according to claim 1, wherein the image quality control unit selects one of the correction characteristics for the images of the plurality of systems by using image quality information sampled by the image processing units of the input system and converts the selected correction characteristic to a correction characteristic synthesized with the correction characteristic for the display characteristic of the image display unit for batch-processing in the output system.

3. An image processing device according to claim 1, wherein the image quality control unit selects one of the correction characteristics for the images of the plurality of systems according to a purpose for a use of an output image and converts the selected correction characteristic to a correction characteristic synthesized with the correction characteristic for the display characteristic of the image display unit for batch-processing in the output system.

4. An image processing device according to claim 1, wherein the image quality control unit selects one of the correction characteristics for the images of the plurality of systems according to uses or types of the plurality of video signals and converts the selected correction characteristic to a correction characteristic synthesized with the correction characteristic for the display characteristic of the image display unit for batch-processing in the output system.

* * * * *

UNITED STATES PATENT AND TRADEMARK OFFICE
CERTIFICATE OF CORRECTION

PATENT NO. : 7,079,129 B2
APPLICATION NO. : 10/948343
DATED : July 18, 2006
INVENTOR(S) : Kazuyuki Shigeta It is certified that error appears in the above-identified patent and that said Letters Patent is hereby corrected as shown below:

On Title Page
Item [56] REFERENCES CITED

U.S. Patent Documents
    "5,398,078 A 3/1995 Masuda et al." should read
        --5,389,078 A 3/1995 Masuda et al.--.

COLUMN 3

Line 22, "20-f3" should read --20-f-3--.

COLUMN 5

Line 21, "during" should read --while--.
    Line 29, "images" should read --images which--.

COLUMN 6

Line 21, "passing by" should read --passing-by--.
    Line 33, "as" should read --is--.

COLUMN 8

Line 51, "in put" should read --input--.

COLUMN 9

Line 7, "an" should be deleted.

COLUMN 10

Line 8, "screens," should read --screen,--.

UNITED STATES PATENT AND TRADEMARK OFFICE
CERTIFICATE OF CORRECTION

PATENT NO. : 7,079,129 B2
APPLICATION NO. : 10/948343
DATED : July 18, 2006
INVENTOR(S) : Kazuyuki Shigeta It is certified that error appears in the above-identified patent and that said Letters Patent is hereby corrected as shown below:

COLUMN 11

Line 3, "units" should read --unit--.
    Line 6, "screens," should read --screen,--.
    Line 7, "units," should read --unit,--.
    Line 14, "conditions" should read --condition--.
    Line 26, "signals" should read --signal--.
    Line 32, "signals" should read --signal--.
    Line 52, "screens," should read --screen,--.
    Line 66, "system" should read --systems--.

COLUMN 13

Line 51, "of a memory" should read --of memory--.

COLUMN 14

Line 54, "an" should read --and--.

COLUMN 15

Line 5, "the" should be deleted.

COLUMN 21

Line 21, "control" should read --controls--.
    Line 51, "unit." should read --unit--.
    Line 60, "20-WE2," should read --20-WE-2,--.

COLUMN 23

Line 10, "an d917-2" should read --and 917-2--.

COLUMN 28

Line 25, "tq" should read --to--.

COLUMN 29

Line 54, "inputs" should read --input--.

UNITED STATES PATENT AND TRADEMARK OFFICE
CERTIFICATE OF CORRECTION

PATENT NO. : 7,079,129 B2
APPLICATION NO. : 10/948343
DATED : July 18, 2006
INVENTOR(S) : Kazuyuki Shigeta It is certified that error appears in the above-identified patent and that said Letters Patent is hereby corrected as shown below:

COLUMN 30

Line 53, "amd" should read --and--.
Line 57, "prescribes" should read --prescribe--.

COLUMN 32

Line 36, "an d16-1B" should read --and 16-1B--.

COLUMN 34

Line 48, "these" should read --this--.

COLUMN 37

Line 52, "an" should be deleted.

COLUMN 38

Line 2, "the" should read --they--.
Line 28, "fro" should read --for--.
Line 30, "receives" should read --receive--.
Line 41, "generates" should read --generate--.
Line 64, "receives" should read --receive--.

UNITED STATES PATENT AND TRADEMARK OFFICE
CERTIFICATE OF CORRECTION

PATENT NO. : 7,079,129 B2
APPLICATION NO. : 10/948343
DATED : July 18, 2006
INVENTOR(S) : Kazuyuki Shigeta It is certified that error appears in the above-identified patent and that said Letters Patent is hereby corrected as shown below:

<u>COLUMN 39</u>

Line 16, "the," should read --the--.
Line 47, "sources." should read --source.--.

Signed and Sealed this

Twentieth Day of February, 2007

JON W. DUDAS
*Director of the United States Patent and Trademark Office*